United States Patent
Shin et al.

(10) Patent No.: US 10,644,903 B2
(45) Date of Patent: May 5, 2020

(54) METHOD AND APPARATUS FOR MEASURING CHANNEL IN MOBILE COMMUNICATION SYSTEM

(71) Applicant: Samsung Electronics Co., Ltd., Suwon-si, Gyeonggi-do (KR)

(72) Inventors: Cheol-Kyu Shin, Suwon-si (KR); Youn-Sun Kim, Seongnam-si (KR); Hoon-Dong Noh, Suwon-si (KR); Young-Woo Kwak, Suwon-si (KR); Jin-Young Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/742,229

(22) PCT Filed: Jul. 6, 2016

(86) PCT No.: PCT/KR2016/007332
§ 371 (c)(1),
(2) Date: Jan. 5, 2018

(87) PCT Pub. No.: WO2017/007240
PCT Pub. Date: Jan. 12, 2017

(65) Prior Publication Data
US 2018/0205577 A1    Jul. 19, 2018

Related U.S. Application Data

(60) Provisional application No. 62/188,968, filed on Jul. 6, 2015, provisional application No. 62/193,849, filed
(Continued)

(51) Int. Cl.
*H04L 25/02* (2006.01)
*H04B 17/24* (2015.01)
(Continued)

(52) U.S. Cl.
CPC ....... *H04L 25/0224* (2013.01); *H04B 7/0469* (2013.01); *H04B 7/0478* (2013.01);
(Continued)

(58) Field of Classification Search
CPC . H04L 25/0224; H04L 5/0048; H04L 5/0053; H04L 5/0023; H04B 17/24;
(Continued)

(56) References Cited

U.S. PATENT DOCUMENTS

| | | | |
|---|---|---|---|
| 2006/0205355 A1* | 9/2006 | Laroia | H04L 1/00 455/66.1 |
| 2011/0158190 A1* | 6/2011 | Kuwahara | H04B 7/0617 370/329 |

(Continued)

FOREIGN PATENT DOCUMENTS

| | | |
|---|---|---|
| EP | 2 773 051 A2 | 9/2014 |
| KR | 10-2014-0018190 A | 2/2014 |
| KR | 10-2014-0144261 A | 12/2014 |

OTHER PUBLICATIONS

Park'817 with U.S. Appl. No. 61/145,654, filed Apr. 10, 2015, hereinafter Prov'654 (Year: 2015).*

(Continued)

*Primary Examiner* — Wutchung Chu
(74) *Attorney, Agent, or Firm* — Jefferson IP Law, LLP

(57) ABSTRACT

The present disclosure relates to a 5G or pre-5G communication system for supporting a data transmission rate higher than a 4G communication system such as LTE. A method proposed in an embodiment of the present disclosure is a method for measuring a channel in a mobile communication system, comprising the: receiving, from a base station, configuration information for measuring a channel by using a reference signal; receiving the reference signal from the base station; measuring the channel by using the reference
(Continued)

signal on the basis of the configuration information; and transmitting information on the measured channel to the base station, wherein the configuration information comprises at least one from among information related to time for measuring the channel and information related to a number of ports with respect to the reference signal.

20 Claims, 35 Drawing Sheets

Related U.S. Application Data on Jul. 17, 2015, provisional application No. 62/202,416, filed on Aug. 7, 2015, provisional application No. 62/214,569, filed on Sep. 4, 2015, provisional application No. 62/240,270, filed on Oct. 12, 2015, provisional application No. 62/245,538, filed on Oct. 23, 2015, provisional application No. 62/311,622, filed on Mar. 22, 2016.

(51) Int. Cl.
| | |
|---|---|
| *H04B 7/0456* | (2017.01) |
| *H04B 7/06* | (2006.01) |
| *H04L 5/00* | (2006.01) |
| *H04W 24/10* | (2009.01) |
| *H04W 72/04* | (2009.01) |

(52) U.S. Cl.
CPC ........... *H04B 7/065* (2013.01); *H04B 7/0626* (2013.01); *H04B 7/0632* (2013.01); *H04B 17/24* (2015.01); *H04L 5/005* (2013.01); *H04L 5/0023* (2013.01); *H04L 5/0048* (2013.01); *H04L 5/0091* (2013.01); *H04W 24/10* (2013.01); *H04W 72/042* (2013.01); *H04B 7/063* (2013.01)

(58) Field of Classification Search
CPC .. H04B 7/0469; H04B 7/0478; H04B 7/0626; H04B 7/0632; H04B 7/065; H04B 7/063; H04B 7/0623; H04B 7/0634; H04B 7/04; H04B 7/0413; H04W 24/10; H04W 72/042; H04W 72/0446
See application file for complete search history.

(56) References Cited

U.S. PATENT DOCUMENTS

| | | | |
|---|---|---|---|
| 2011/0305161 A1 | 12/2011 | Ekpenyong et al. | |
| 2012/0213113 A1* | 8/2012 | Zhao | H04B 7/0626 370/252 |
| 2013/0012252 A1* | 1/2013 | Suzuki | H04W 52/325 455/509 |
| 2013/0163499 A1 | 6/2013 | Cheng et al. | |
| 2013/0215838 A1* | 8/2013 | Aiba | H04W 72/1231 370/329 |
| 2013/0258964 A1* | 10/2013 | Nam | H04W 72/046 370/329 |
| 2013/0258965 A1 | 10/2013 | Geirhofer et al. | |
| 2014/0146778 A1* | 5/2014 | Wang | H04B 7/0626 370/329 |
| 2014/0162717 A1* | 6/2014 | Liu | H04W 52/146 455/522 |
| 2014/0177683 A1 | 6/2014 | Krishnamurthy et al. | |
| 2014/0192761 A1* | 7/2014 | Inoue | H04B 7/0456 370/329 |
| 2014/0221038 A1* | 8/2014 | Nakashima | H04W 52/242 455/522 |
| 2014/0269454 A1* | 9/2014 | Papasakellariou | H04L 5/1469 370/280 |
| 2015/0063287 A1* | 3/2015 | Mazzarese | H04W 24/10 370/329 |
| 2015/0189574 A1* | 7/2015 | Ng | H04W 24/08 370/252 |
| 2015/0215905 A1* | 7/2015 | Park | H04B 7/0473 370/329 |
| 2015/0222347 A1* | 8/2015 | Xia | H04B 7/024 370/329 |
| 2016/0112173 A1* | 4/2016 | Wang | H04L 5/0048 370/329 |
| 2016/0142189 A1* | 5/2016 | Shin | H04B 7/0626 370/329 |
| 2016/0164588 A1* | 6/2016 | Chen | H04B 7/0469 375/267 |
| 2016/0309376 A1* | 10/2016 | Liu | H04W 36/0055 |
| 2017/0026100 A1* | 1/2017 | Wang | H04W 72/12 |
| 2017/0317798 A1* | 11/2017 | Kim | H04W 72/12 |
| 2017/0373743 A1* | 12/2017 | Park | H04B 7/0626 |
| 2018/0034525 A1* | 2/2018 | Park | H04L 5/00 |
| 2018/0102817 A1* | 4/2018 | Park | H04B 7/04 |
| 2018/0115357 A1* | 4/2018 | Park | H04B 7/04 |
| 2018/0184459 A1* | 6/2018 | Kim | H04L 5/00 |

OTHER PUBLICATIONS

LG Electronics et al., "WF on CSI-RS enhancements", 3GPP TSG RAN WG1 No. 81, R1-153596, May 25-29, 2015, Fukuoka, Japan.
LG Electronics; Discussion on Specification Impacts for Beamformed CSI RS Nased Schemes, R1-152750; May 25-29, 2015; Fukuoka, Japan; XP050973174.
European Office Action dated Apr. 18, 2019; Application #: 16 821 646.3-1215; Ref. #: P18795WOEP.
LG Electronics: "Beamformed CSI-RS related enhancements based on the identified approaches", 3GPP Draft; R1-154274, vol. RAN WG1, No. Beijing, China; 20150824-20150828 Aug. 15, 2015 (Aug. 15, 2015), XP050994317.
LG Electronics: "CSI process and CSI-RS configurations for supporting EBF/FD-MIMO", 3GPP Draft; R1-154272, vol. RAN WG1, No. Beijing, China; 20150824-20150828 Aug. 15, 2015 (Aug. 15, 2015), XP050994315.
European Office Action dated Jan. 29, 2020, issued in European Application No. 16821646.3-1215.

* cited by examiner

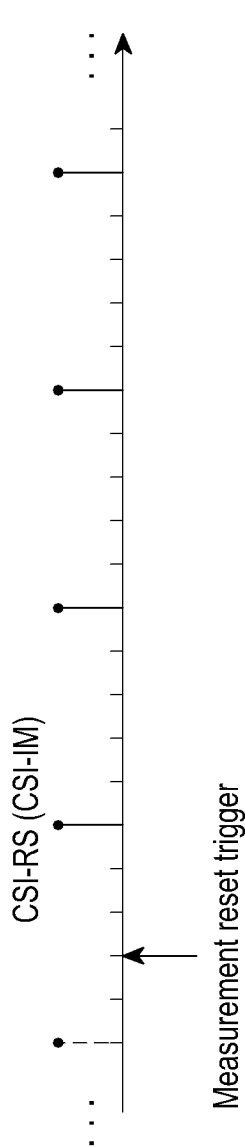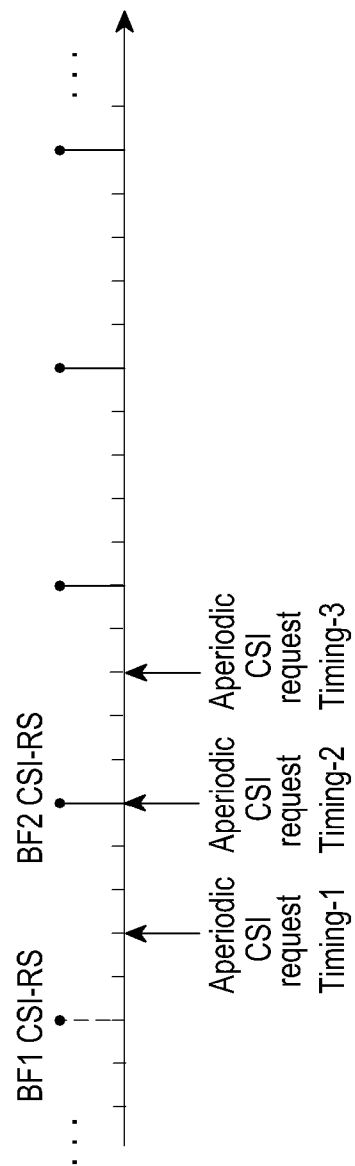

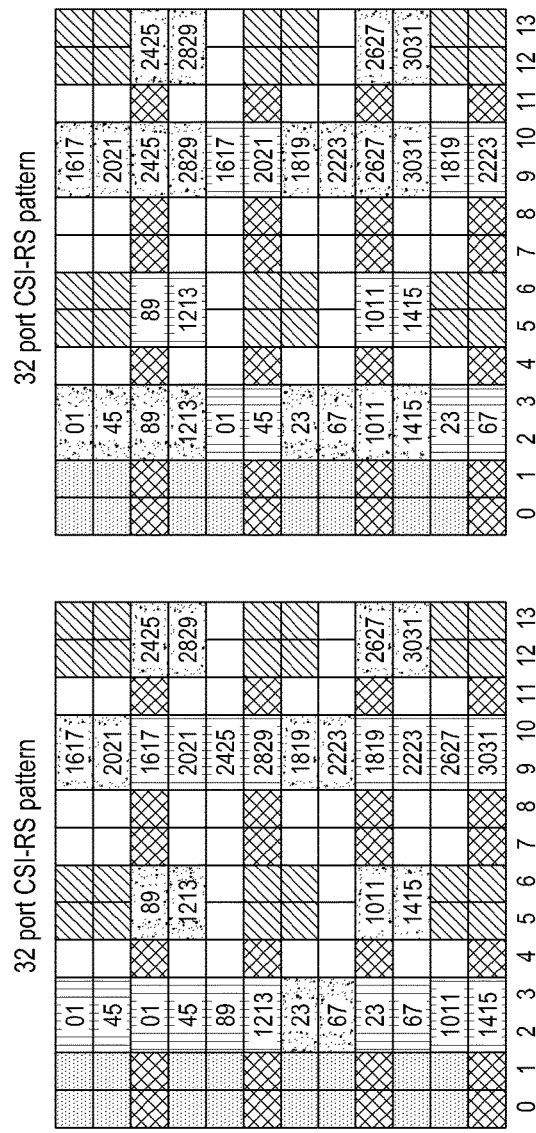
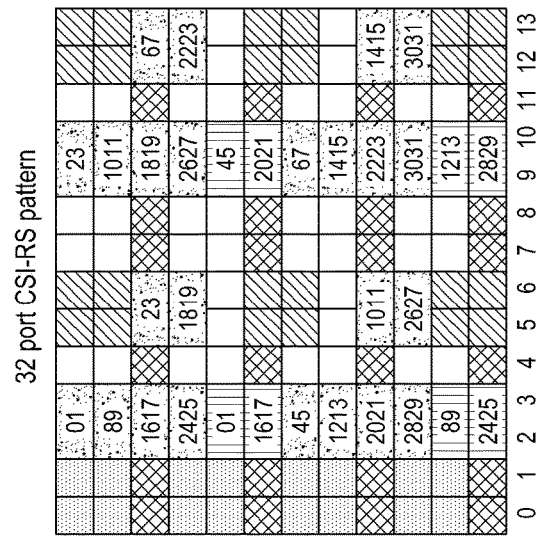
FIG.40

METHOD AND APPARATUS FOR MEASURING CHANNEL IN MOBILE COMMUNICATION SYSTEM

CROSS-REFERENCE TO RELATED APPLICATION(S)

This application is a U.S. National Stage application under 35 U.S.C. § 371 of an International application filed on Jul. 6, 2016 and assigned application number PCT/KR2016/007332, which claimed the benefit of U.S. provisional patent applications filed on Jul. 6, 2015 and assigned application No. 62/188,968, filed on Jul. 17, 2015 and assigned application No. 62/193,849, filed on Aug. 7, 2015 and assigned application No. 62/202,416, filed on Sep. 4, 2015 and assigned application No. 62/214,569, filed on Oct. 12, 2015 and assigned application No. 62/240,270, filed on Oct. 23, 2015 and assigned application No. 62/245,538, and filed on Mar. 22, 2016 and assigned application No. 62/311,622, the entire disclosure of which is hereby incorporated by reference.

TECHNICAL FIELD

The disclosure relates to methods and apparatuses for measuring a channel using a reference signal in a mobile communication system.

BACKGROUND ART

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Such schemes mostly operate based on the channel status information between the base station (eNB: evolved Node B, BS: base station) and the terminal (UE: user equipment, MS: mobile station). Accordingly, the base station or the UE is required to measure the channel state.

DETAILED DESCRIPTION OF THE INVENTION

Technical Problem

An embodiment of the disclosure relates to a method and apparatus for measuring a channel using a reference signal in a mobile communication system.

Another embodiment of the disclosure relates to a method and apparatus for measuring a channel using a reference signal based on configuration information about a channel measurement for supporting multiple reference signal ports.

Technical Solution

As proposed in an embodiment of the present disclosure, a method for measuring a channel in a mobile communication system comprises the steps of receiving configuration information for channel measurement using a reference signal from a base station, receiving the reference signal from the base station, measuring the channel using the reference signal based on the configuration information, and transmitting information about the measured channel to the base station, wherein the configuration information includes at least one of information about a time for the channel measurement and information about the number of ports for the reference signal.

As proposed in an embodiment of the present disclosure, an apparatus for measuring a channel in a mobile communication system comprises a transceiver transmitting and receiving data and a controller receiving configuration information for channel measurement using a reference signal from a base station, controlling the transceiver to receive the reference signal, measuring a channel using the reference signal based on the configuration information, and controlling the transceiver to transmit information about the measured channel to the base station, wherein the configuration information includes at least one of information about a time for the channel measurement and information about the number of ports for the reference signal.

As proposed in another embodiment of the present disclosure, a method for measuring a channel in a mobile communication system comprises the steps of transmitting configuration information for channel measurement to a UE using a reference signal, transmitting the reference signal to the UE, and receiving information about a channel measured using the reference signal based on the configuration information from the UE, wherein the configuration information includes at least one of information about a time for the channel measurement and information about the number of ports for the reference signal.

As proposed in another embodiment of the present disclosure, an apparatus for measuring a channel in a mobile communication system comprises a transceiver transmitting and receiving data and a controller transmitting configuration information for channel measurement using a reference signal to a UE, transmitting the reference signal to the UE, and controlling the transceiver to receive information about a channel measured using the reference signal based on the configuration information from the UE, wherein the configuration information includes at least one of information about a time for the channel measurement and information about the number of ports for the reference signal.

Other aspects, advantages, and core features of the present disclosure will be apparent to one of ordinary skill in the art from the following detailed description taken in conjunction with the accompanying drawings and disclosing preferred embodiments of the present disclosure.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

BRIEF DESCRIPTION OF THE DRAWINGS

FIGS. 4 to 8 are views illustrating example of feedback timings at which a UE performs feedback;

FIGS. 9 to 11 are views illustrating an example of configuring a measurement reset trigger through an aperiodic CSI request according to a first-first embodiment of the present disclosure;

FIG. 31 is a view illustrating a CSI-RS pattern obtained by changing the position of the port of the CSI-RS pattern of FIG. 29;

FIG. 32 is a view illustrating an example of supporting 12 CSI-RS ports using REs used as a PDSCH as well as existing CSI-RS REs in a mobile communication system according to a second-sixth embodiment of the present disclosure;

FIG. 33 is a view illustrating a CSI-RS pattern designed based on the first method according to the second-sixth embodiment of the present disclosure;

FIG. 34 is a view illustrating a CSI-RS pattern obtained by changing the position of the port of the CSI-RS pattern of FIG. 33;

FIG. 37 is a view illustrating a CSI-RS pattern obtained by changing the position of the port of the CSI-RS pattern of FIG. 35;

FIG. 38 is a view illustrating an example of supporting 32 CSI-RS ports using REs used as a PDSCH as well as existing CSI-RS REs in a mobile communication system according to a second-eighth embodiment of the present disclosure;

FIG. 40 is a view illustrating CSI-RS patterns for 32 ports configured based on the second-eighth embodiment of the present disclosure;

It should be noted that the same or similar reference denotations may be used to refer to the same or similar elements, features, or structures throughout the drawings.

MODE FOR CARRYING OUT THE INVENTION

Figure 1:
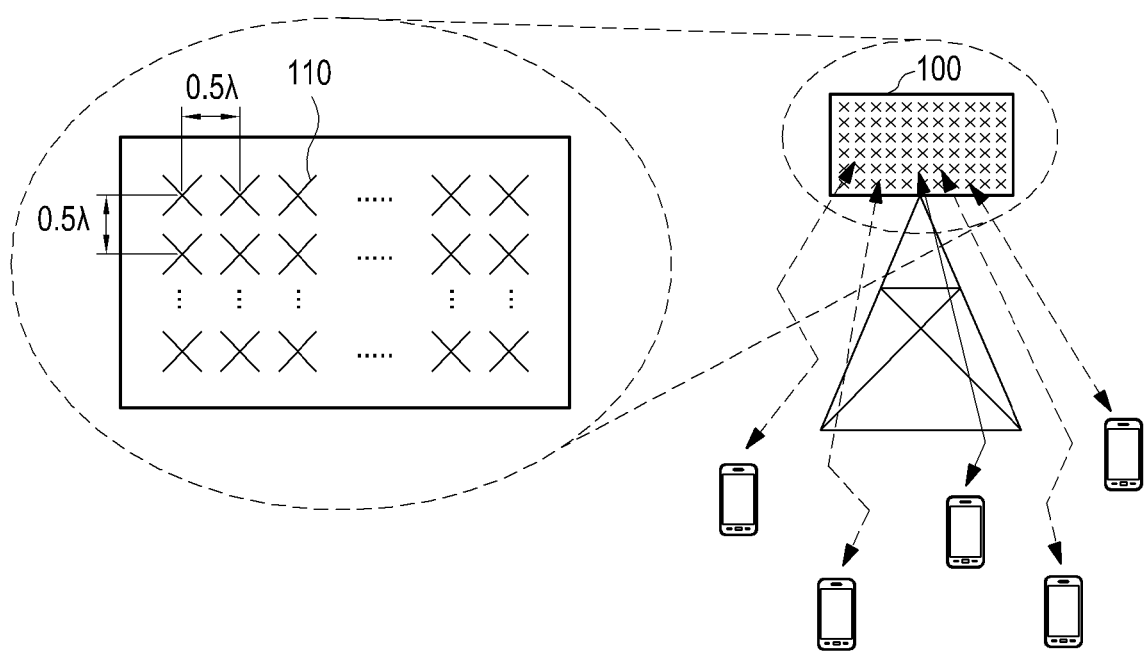
FIG. 1 is a view briefly illustrating a configuration of an FD-MIMO system.

The following detailed description taken in conjunction with the accompanying drawings is provided for a comprehensive understanding of various embodiments of the present disclosure which are defined by the appended claims or equivalents thereof. However, various particular matters set forth below in the detailed description should be regarded simply as examples. Hence, it should be appreciated by one of ordinary skill in the art that various changes or modifications may be made to the embodiments without departing from the spirit or scope of the present disclosure. Known functions and components related to the present disclosure may be excluded from the description for clarity and brevity.

The terms and words used herein should not be interpreted as limited to their literal meanings, and it should be noted that they are rather provided merely for a clear and consistent understanding of the present disclosure. Thus, it is apparent to one of ordinary skill in the art that the detailed description of various embodiments of the present disclosure is intended for description purposes alone, but not for limiting the subject matter of the present disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

First, a first embodiment of the present disclosure relates to a method for configuring configuration information for measuring wireless channel quality by a UE in a wireless mobile communication system adopting a multiple access scheme using multiple carriers such as orthogonal frequency division multiple access (OFDMA) and communicating the same.

Current mobile communication systems are evolving to high-speed, high-quality wireless packet data communication systems to provide data services and multimedia services beyond the initial versions that have provided voice-centered services. To that end, various standardization organizations, such as the 3GPP, the 3GPP2, and the Institute of Electrical and Electronics Engineers (IEEE), proceed with standardization of post-third generation mobile communication systems adopting multicarrier-based multiple access schemes. Recently, a diversity of mobile communication standards including the 3GPP long term evolution (LTE), the 3GPP2 ultra mobile broadband (UMB), and the IEEE 802.16m, have been developed to support high-rate, high-quality wireless packet data transmission services based on multiple access schemes.

LTE, UMB, 802.16m, and other existing 3G evolved mobile communication systems are based on multi-carrier multiple access schemes and feature adopting multiple antennas for MIMO and use of various techniques, such as adaptive modulation and coding (AMC) and channel sensitive scheduling to enhance transmission efficiency. The above-enumerated techniques enhance system capability by, e.g., concentrating transmit power coming from several antennas depending on channel quality, adjusting the amount of data transmitted, or selectively transmitting data to the user with a good channel quality to bring up with better transmission efficiency.

Such schemes mostly operate based on the channel status information between the base station (eNB: evolved Node B, BS: base station) and the terminal (UE: user equipment, MS: mobile station). Accordingly, the base station or the UE is required to measure the channel status between the eNB and the UE. To that end, a channel status indication reference signal (CSI-RS) is used. The eNB means a downlink transmission and uplink reception device positioned in a predetermined place, and one eNB performs communication on multiple cells. A plurality of eNBs are geographically dispersed in one mobile communication system, and each eNB performs communication on the plurality of cells.

The LTE/LTE-A or other existing 3rd or 4th generation mobile communication systems utilize the MIMO technique in which transmission is performed using a plurality of transmit/receive antennas in order to increase system capability and data transmission rate. The MIMO technique makes use of a plurality of transmit/receive antennas to spatially separate and transmit a plurality of information streams. As such, spatially separating and transmitting a plurality of information streams is called spatial multiplexing. Generally, the number of information streams to which spatial multiplexing may be applied varies depending on the number of antennas of the transmitter and receiver. In general, the number of information streams to which spatial multiplexing may apply is referred to as the rank of the corresponding transmission. The MIMO technique supported by the LTE/LTE-A release 11 and its predecessors supports spatial multiplexing for the case where there are eight transmit antennas and eight receive antennas and supports up to rank-8. Further, the FD-MIMO system considered in LTE-A release 13 corresponds to the case where the existing LTE/LTE-A MIMO technique evolves to support eight more, i.e., 32 or more.

FIG. 1 briefly illustrates a configuration of an FD-MIMO system.

Referring to FIG. 1, a transmission device in a base station transmits wireless signals via eight or more transmit antennas. The plurality of transmit antennas are arranged to maintain a minimum distance therebetween as indicated by reference number 110. The base station performs transmission to a plurality of UEs through the set 100 of multiple antennas and using high-order multi-user MIMO (MU-MIMO). The high order MU-MIMO is to allocate spatially separated transmission beams to multiple UEs using the transmit antennas included in the base station for data transmission. The high order MU-MIMO is achieved using the same time and frequency resources and benefits significantly enhancing the system capability.

Generally, MIMO is classified into single user MIMO (SU-MIMO) for transmitting multiple data streams spatially multiplexed to a single UE and MU-MIMO for simultaneously transmitting a plurality of data streams spatially multiplexed to a plurality of UEs. By the SU-MIMO, a plurality of data streams spatially multiplexed are transmitted to one UE, while by the MU-MIMO a plurality of data streams spatially multiplexed are transmitted to a plurality of UEs. By the MU-MIMO, the base station transmits a plurality of data streams, and each UE receives one or more of the plurality of data streams transmitted from the base station. The MU-MIMO is useful especially when the transmit antennas of the base station is more in number than the receive antennas of the UE. In the SU-MIMO, the maximum number of data streams that may be spatially multiplexed is limited by min(NTx, NRx). Here, $N_{Tx}$ is the number of transmit antennas of the base station, and $N_{Rx}$ is the number of receive antennas of the UE. By contrast, in the MU-MIMO, the maximum number of data streams that may be spatially multiplexed is limited by min(NTx, $N_{MS}$, NRx). Here, $N_{MS}$ corresponds to the number of UEs.

The FD-MIMO system is predicted to experience more frequent high-order MU-MIMO transmission. Thus, in order to effectively implement the FD-MIMO system, the UE needs to exactly measure the channel status and interference magnitude and transmit effective channel status information to the base station using the same. The base station receiving the channel status information determines whether to perform SU-MIMO on a particular UE or MU-MIMO on multiple UEs, at what data transmission rate to perform transmission, or the precoding to apply using the channel status information in connection with downlink transmission.

Figure 2:
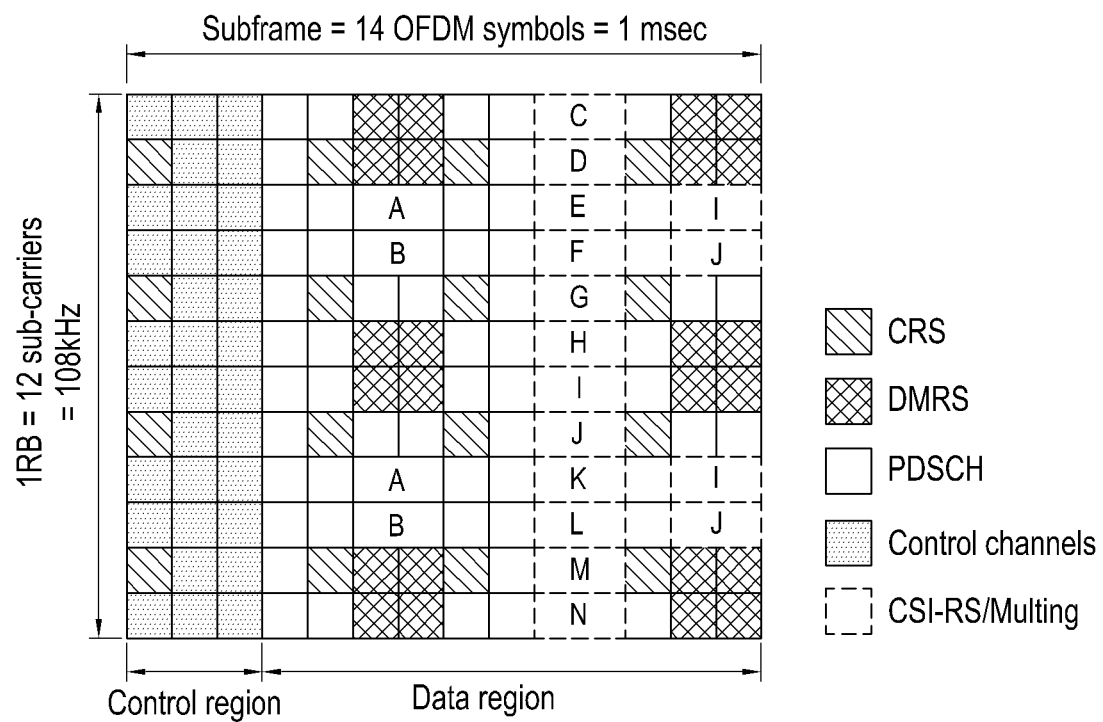
FIG. 2 is a view illustrating an example of a second electronic device schedulable on downlink in an LTE/LTE-A system.

FIG. 2 illustrates an example of a second electronic device schedulable on downlink in an LTE/LTE-A system.

Referring to FIG. 2, the radio resource schedulable on downlink in the LTE/LTE-A system consists of one subframe on the time axis and one resource block (RB) on the frequency axis. The radio resource includes 12 subcarriers in the frequency domain and 14 OFDM symbols in the time domain, totaling 168 unique frequencies and time positions. In the LTE/LTE-A, each unique frequency and time position shown in FIG. 2 is called a resource element (RE).

A plurality of different types of signals that follow may be transmitted through the radio resource shown in FIG. 2.

1. Cell specific RS (CRS): a reference signal that is periodically transmitted for all the UEs belonging to one cell and that may be shared by a plurality of UEs.

2. Demodulation reference signal (DMRS): a reference signal transmitted for a particular UE. This signal is transmitted only when data is transmitted to the corresponding UE. A DMRS may consist of a total of eight DMRS ports. In LTE/LTE-A, port 7 to port 14 correspond to DMRS ports, and each port maintains orthogonality not to interfere with each other using code division multiplexing (CDM) or frequency division multiplexing (FDM).

3. Physical downlink shared channel (PDSCH): a data channel transmitted on downlink, used for a base station to transmit traffic to a UE, and transmitted via an RE where no reference signal is transmitted in the data region of FIG. 2.

4. Channel status information reference signal (CSI-RS): a reference signal transmitted for UEs belonging to one cell and used to measure the channel status. A plurality of CSI-RSs may be transmitted in one cell. In the LTE-A system, one CSI-RS may correspond to one, two, four, or eight antenna ports.

5. Zero power CSI-RS: this means that no actual transmission in the position where the CSI-RS is transmitted.

6. Interference measurement resource (IMR): this corresponds to the position where the CSI-RS is transmitted. One or more of A, B, C, D, E, F, G, H, I, and J of FIG. 2 may be set as the IMR. The UE performs interference measurement assuming that all the signals received through the REs set as IMRs are interference signals.

7. Other control channels: other control channels include, e.g., physical hybrid-automatic request for repetition indicator channel (PHICH), physical control format indicator channel (PCFICH), and physical downlink control channel (PDCCH). These channels are used to transmit positive responses (ACKs)/negative responses (NACKs) to operate the HARQ for uplink data transmission or to provide control information necessary for the UE to receive the PDSCH.

Besides the signals, the LTE-A system may set a muting so that CSI-RS transmitted from another base station may be received without interfering with the UEs in the cell. The muting may apply at the position where a CSI-RS may be transmitted. Generally, the UE skips the corresponding radio resource and receives a traffic signal. The muting in the LTE-A system is also called zero-power CSI-RS. By the nature of muting, muting applies likewise at the position of the CSI-RS because no transmit power is transmitted.

Referring to FIG. 2, the CSI-RS may be transmitted using some of the positions denoted with A, B, C, D, E, E, F, G, H, I, and J depending on the number of antennas transmitting the CSI-RS. Further, the muting may also apply to some of the positions denoted with A, B, C, D, E, E, F, G, H, I, and J. In particular, the CSI-RS may be transmitted via two, four, or eight REs depending on the number of transmit antenna ports. In case the number of antenna ports is two, the CSI-RS is transmitted through a half of a particular pattern of FIG. 2, in case the number of antenna ports is four, the CSI-RS is transmitted through the overall particular pattern, and in case the number of antenna ports is eight, the CSI-RS is transmitted via two patterns. By contrast, the muting is carried out always in each single pattern. That is, the muting, although applicable to a plurality of patterns, cannot apply to part of one pattern in case it does not overlap the position of the CSI-RS. However, only if the muting overlaps at position the CSI-RS, it may apply only to part of one pattern.

Further, each of A, B, C, D, E, F, G, H, I, and J of FIG. 2 may be set as an IMR. In case an IMR is set for a particular UE, the UE assumes that signals received through the REs belonging to the set IMR are interference signals. The purpose of the IMR is to enable the UE to measure the magnitude of interference. That is, the UE determines the strength of interference by measuring the strength of signals received through the REs belonging to the IMR set thereto.

Figure 3:
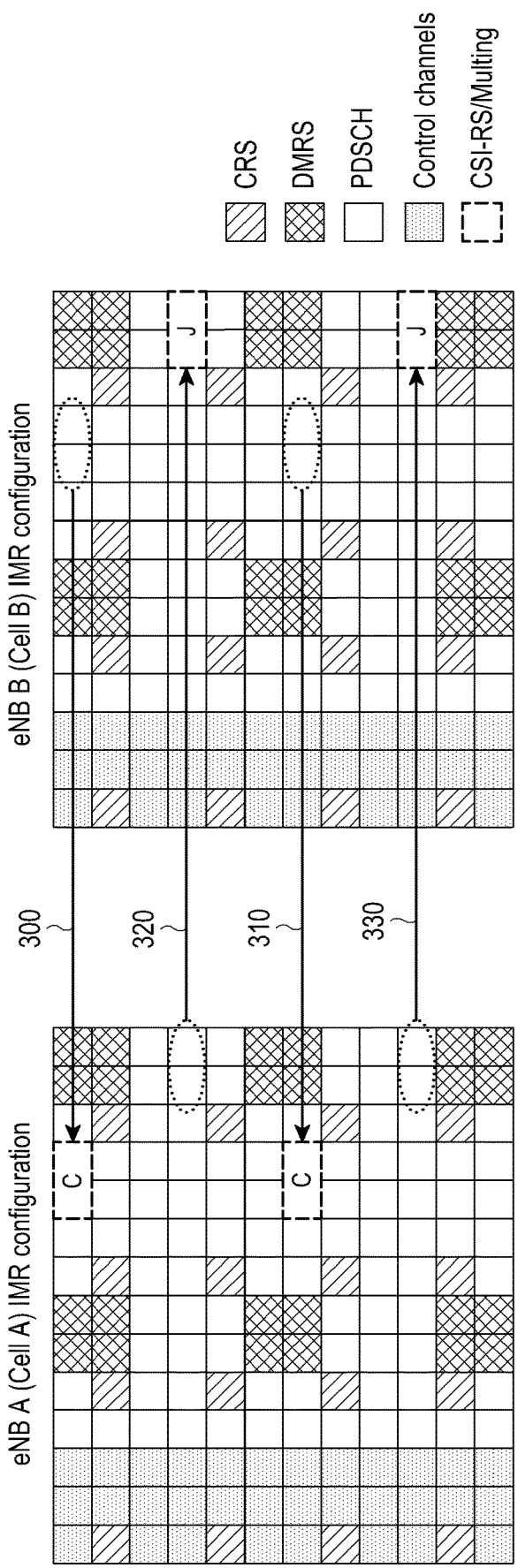
FIG. 3 is a view illustrating example signals transmitted from two IMR-applied eNBs.

FIG. 3 shows signals transmitted from two eNBs to which the IMR has applied. The operation principle of IMR is described below with reference to FIG. 3.

Referring to FIG. 3, eNB A sets IMR C for a UE positioned in cell A. eNB B sets IMR J for a UE positioned in cell B. That is, the UEs in cell A receive PDSCHs transmitted from eNB A, and for that purpose, have to report channel status information to eNB A. The UE should be able to measure signal energy to interference and noise strength (Es/(Io+No)) of the channel in order to generate channel status information. The IMR aims to allow the UE to measure interference and noise strength. In case eNB A and eNB B simultaneously attend transmission in FIG. 3, they create interference with each other. That is, a signal transmitted from eNB B plays a role as interference with the UE receiving signals from eNB A. Further, a signal transmitted from eNB A plays a role as interference with the UE receiving signals from eNB B.

In FIG. 3, eNB A sets IMR C to the corresponding UE to allow the UE positioned in cell A to measure interference caused by eNB B. Further, eNB A does not transmit signals at the position of IMR C. Resultantly, the signals received by the UE at IMR C are signals that have been transmitted from eNB B as denoted by reference numbers 300 and 310. That is, the UE receives only a signal transmitted from eNB B at IMR C and may determine the strength of interference caused by eNB B by measuring the reception strength for the signal. Likewise, eNB B sets IMR J to the corresponding UE to allow the UE positioned in cell B to measure interference caused by eNB A. Further, eNB B does not transmit signals at the position of IMR J.

Upon using an IMR as shown in FIG. 3, the strength of interference arising from other eNB or transmission point may be effectively measured. That is, it is possible to effectively measure the strength of interference that occurs at an adjacent transmission point or the strength of interference that arises at an adjacent cell by utilizing the IMR in a multi-cell mobile communication system or distributed antenna system where a plurality of cells co-exist. Further, the strength of MU-MIMO interference may also be measured using the IMR.

In the cellular system, a base station should transmit a reference signal to a UE in order to measure the downlink channel status. In 3GPP LTE-A systems, the UE measures its channel status and the channel status of the base station using the CRS or CSI-RS transmitted from the base station. The channel status should basically consider a few factors that include a downlink interference amount. The downlink interference amount includes an interference signal and thermal noise that are created by an antenna belonging to a neighbor base station and is critical in the UE determining the channel status of downlink. As an example, in case a base station with one transmit antenna sends a signal to a UE with one receive antenna, the UE should determine the amount of interference to be received simultaneously during the period of receiving corresponding symbols and energy per symbol that may be received on downlink using the reference signal received from the base station and should determine a signal energy to interference strength (Es/Io). The determined Es/Io is converted into a data transmission speed or its corresponding value and is notified to the base station in the form of a channel quality indicator (CQI), there enabling determination as to the data transmission speed at which the base station should perform transmission to the UE on downlink.

In the LTE-A system, the UE feedbacks information on the channel status of downlink to the base station so that it may be utilized for downlink scheduling by the base station. That is, the UE measures the reference signal transmitted from the base station on downlink and feedbacks the information extracted therefrom to the base station in a form as defined in the LTE-LTE-A standards. The information fed back from the UE in LTE/LTE-A generally comes in three types: rank indicator (RI), precoder matrix indicator (PMI), and channel quality indicator (CQI).

The RI is the number of spatial layers where the UE may receive in the current channel status, the PMI is an indicator for a precoding matrix that the UE prefers in the current channel status, and the CQI is the maximum data rate at which the UE may receive in the current channel status. Here, the CQI may be replaced with the SINR, maximum error correction code rate and modulation scheme, or data efficiency per frequency which may be utilized similar to the maximum data rate.

In the current LTE/LTE-A standards, the RI, PMI, and CQI all are defined as SU-CSI fed back under the assumption of SU-MIMO transmission. The RI, PMI, and CQI are associated with one another and have meanings. As an example, the precoding matrix supported in the LTE/LTE-A is defined different per rank. Accordingly, the PMI value when the RI is 1 and the PMI value when the RI is 2, even though the values are the same, are interpreted differently. Further, even when the UE determines the CQI, it assumes that the rank value and PMI value it notified to the base station have been applied by the base station. That is, the case where the UE notified RI_X, PMI_Y, and CQI_Z to the base station means that, when the rank is RI_X, and the precoding is PMI_Y, the UE may receive the data rate corresponding to CQI_Z. As such, the UE assumes the transmission scheme that is to be performed for the base station when computing the CQI, thereby enabling the securing of the optimized performance upon attending actual transmission in the corresponding transmission scheme.

The periodic feedback by the UE in the LTE/LTE-A is set to one of the following four feedback modes (or reporting modes) depending on what information is to be included:

1. feedback mode 1-0: RI, wideband CQI (wCQI)
2. feedback mode 1-1: RI, wCQI, PMI
3. feedback mode 2-0: RI, wCQI, subband CQI (sCQI)
4. feedback mode 2-1: RI, wCQI, sCQI, PMI The feedback timing of each information for the four feedback modes is determined by $N_{pd}$, $N_{OFFSET,CQI}$, $M_{RI}$, and $N_{OFFSET,RI}$ that are transferred via higher layer signals. The UE performs feedback to the base station at the feedback timings shown in FIGS. 4 to 8. FIGS. 4 to 8 are views illustrating example of feedback timings at which a UE performs feedback.

In feedback mode 1-0, the transmission period of wCQI is subframes, and the feedback timing is determined with the subframe offset value of $N_{OFFSET,CQI}$.

Further, the transmission period of RI is $N_{pd} \cdot M_{RI}$ subframes, and the offset is $N_{OFFSET,CQI}+N_{OFFSET,RI}$.

Figure 4:
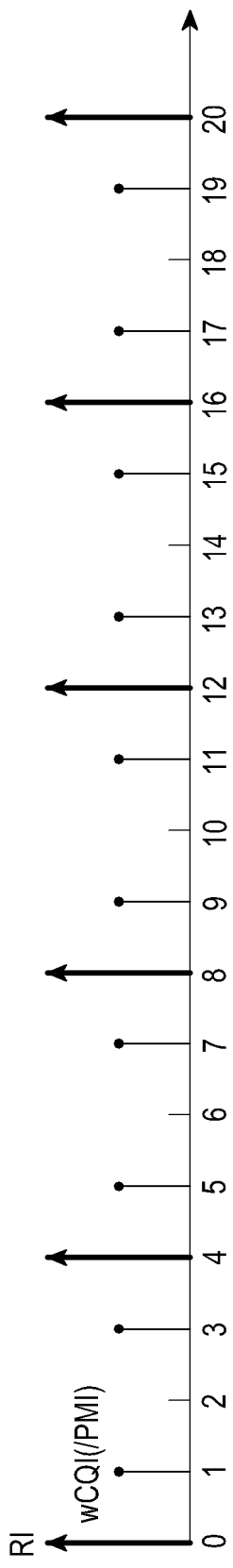

FIG. 4 is a view illustrating the feedback timing of wCQO and RI where $N_{pd}=2$, MRI=2, $N_{OFFSET,CQI}=1$, and $N_{OFFSET,RI}=-1$. In FIG. 4, each timing denotes a subframe index.

Feedback mode 1-1, although having the same feedback timing as feedback mode 1-0, differs in that wCQI and PMI are together transmitted at the wCQI transmission timing for the circumstance of one or two antenna ports or partially four antenna ports.

In feedback mode 2-0, the feedback period for sCQI is $N_{pd}$ subframes, and the offset value is $N_{OFFSET,CQI}$. The feedback period for wCQI is $H \cdot N_{pd}$ subframes, and the offset value is $N_{OFFSET,CQI}$ as is sCQI. Here, it is defined as $H=J \cdot K+1$, and K is transferred via a higher layer signal, and J is a value determined depending on the system bandwidth. For example, the J value for 10 MHz systems is defined as 3. Accordingly, wCQI is transmitted once for each sCQI transmissions, replacing the same. The period of RI is $M_{RI} \cdot H \cdot N_{pd}$ subframes, and the offset is $N_{OFFSET,CQI}+N_{OFFSET,RI}$.

Figure 5:
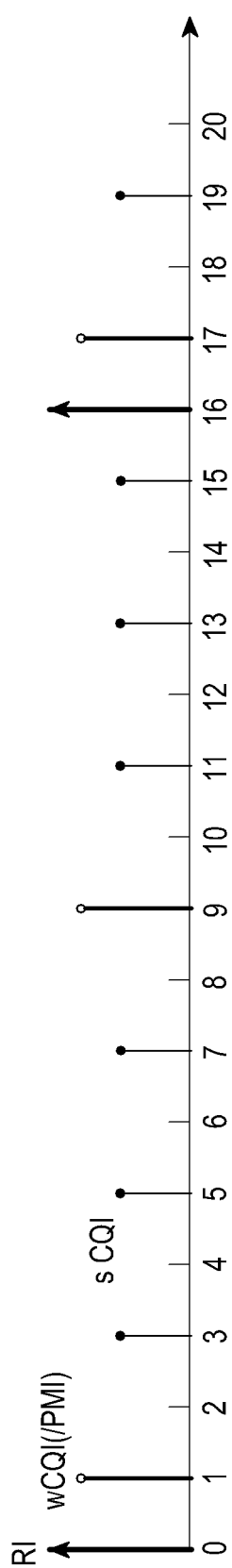

FIG. 5 is a view illustrating the feedback timing of RI, sCQI, and wCQI for $N_{pd}=2$, $M_{RI}=2$, J=3(10 MHz), K=1, $N_{OFFSET,CQI}=1$, $N_{OFFSET,RI}=-1$. Feedback mode 2-1, although having the same feedback timing as feedback mode 2-0, differs in that PMI is together transmitted at the wCQI transmission timing for the circumstance of one or two antenna ports or partially four antenna ports.

The above-described feedback timing is for part of the case where the number of CSI-RS antenna ports is one, two, or four, and for the UE receiving allocation of CSI-RS for other partial four or eight antenna ports, two types of PMI information is fed back unlike the feedback timing. When the UE receives allocation of the CSI-RS having other partial four antenna ports or eight antenna ports, feedback mode 1-1 is divided again into two submodes. In the first submode, the RI together with the first PMI information is transmitted, and the second PMI information is transmitted together with the wCQI. Here, the period and offset of feedback for wCQI and the second PMI are defined as $N_{pd}$ and $N_{OFFSET,CQI}$, and the feedback period and offset for RI and the first PMI information are defined as $M_{RI} \cdot N_{pd}$ and $N_{OFFSET,CQI}+N_{OFFSET,RI}$, respectively. If both the first PMI ($i_1$) and the second PMI ($i_2$) are reported from the UE to the base station, the UE and the base station identify that, in the set (codebook) of precoding matrixes shared by the UE and the base station, precoding matrix W($i_1$, $i_2$), which corresponds to the combination of the first PMI and the second PMI is a precoding matrix favored by the UE. In another interpretation, if the precoding matrix corresponding to the first PMI is $W_1$ and the precoding matrix corresponding to the second PMI is $W_2$, the information that the precoding matrix favored by the UE and the base station has been determined to be the multiple of the two matrixes, $W_1W_2$, is shared.

When the feedback mode for eight CSI-RS antenna ports is 2-1, the feedback information adds precoding type indicator (PTI) information. At this time, PTI is fed back together with RI, and its period is defined as $M_{RI} \cdot H \cdot N_{pd}$ subframes, and the offset is defined as $N_{OFFSET,CQI}+N_{OFFSET,RI}$.

Specifically, in case the PTI is 0, the first PMI, the second PMI, and wCQI all are fed back. Here, the wCQI and the second PMI are transmitted at the same timing, and the period and offset, respectively, are given as $N_{pd}$ and $N_{OFFSET,CQI}$. The period of the first PMI is $H' \cdot N_{pd}$, and the offset is $N_{OFFSET,CQI}$. Here, H' is transferred via a higher layer signal.

By contrast, when the PTI is 1, the wCQI is transmitted along with the wideband second PMI, and the sCQI is fed back along with the narrow band second PMI at a separate timing. Here, the first PMI is not transmitted, and the second PMI and CQI are computed and then reported assuming the first PMI reported latest in case the PTI is 0. The period and offset of the PTI and the RI are the same as when the PTI is 0. The period of sCQI is defined as $N_{pd}$ subframes, and the offset is defined as $N_{OFFSET,CQI}$. The wCQI and the second PMI are fed back with the period of $H \cdot N_{pd}$ and the offset of $N_{OFFSET,CQI}$, and H is defined as when the number of CSI-RS antenna ports is two.

Figure 6:
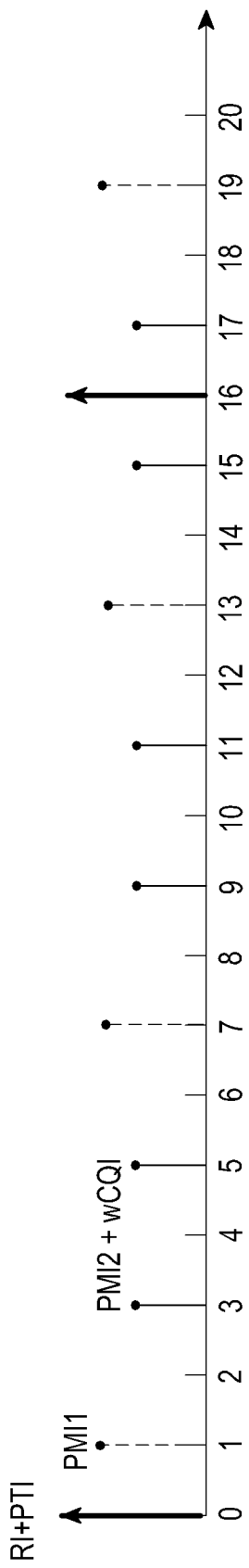
Figure 7:
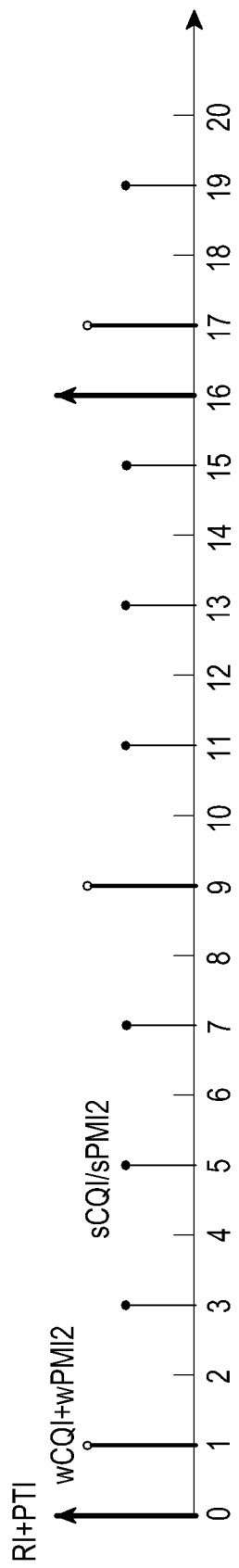

FIGS. 6 and 7 are views illustrating feedback timings when PTI=0 and PTI=1 for $N_{pd}=2$, $M_{RI}=2$, J=3 (10 MHz), K=1, H'=3, $N_{OFFSET,CQI}=1$, $N_{OFFSET,RI}=-1$.

The LTE/LTE-A supports aperiodic feedback as well as periodic feedback of the UE. When the base station desires to obtain aperiodic feedback information of a particular UE, the base station sets the aperiodic feedback indicator included in the downlink control information (DCI, downlink control information) for uplink data scheduling of the UE to perform particular aperiodic feedback and performs the uplink data scheduling of the UE. The corresponding UE, when receiving the indicator set to perform aperiodic feedback at an nth subframe, includes the aperiodic feedback information upon data transmission in an n+kth subframe and performs uplink transmission. Here, k is a parameter defined in the 3GPP LTE release 11 standards, and this is 4 for frequency division duplexing (FDD) while defined as shown in Table 1 for time division duplexing (TDD). Table 1 below represents k for each subframe number n in TDD uplink/downlink configuration.

TABLE 1

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the case where the aperiodic feedback is set, the feedback information includes RI, PMI, and CQI like in the case of the periodic feedback, and the RI and the PMI might not be fed back according to feedback settings. The CQI may include both the wCQI and the sCQI or only the wCQI information.

Recently, there is in discussion a method for performing transmission by applying a beam optimized for the UE to the CSI-RS resource in the FD-MIMO system. The FD-MIMO system enables beamforming in vertical and horizontal directions depending on the position of the UE, and thus, if transmission is performed with beamforming applied to the CSI-RS resource, a channel is measured with respect to the signal beamformed to the UE, and the information on the same may be fed back. Accordingly, the gain of the FD- MIMO system may be maximized. Unlike in the existing method not beamforming the CSI-RS, however, issues with channel measurement arise in the case of beamformed CSI-RS. The channel measurement-related issues occur because the beam applies differently for time and frequency resources. The current standards are defined not to impose measurement restriction in the UE determining the CQI. Accordingly, the UE obtains channel information by time averaging when performing channel measurement. That is, the UE grasps the channel status by performing channel measurement using the CSI-RS periodically coming down and averaging the same. However, performing the channel measurement scheme on the beamformed CSI-RS to which the beam varying over time applied may result in the channel status being inaccurately grasped. Further, such problem may arise where the CSI set based on the same is also inaccurately determined.

As described above, the FD-MIMO system enables beamforming in vertical and horizontal directions depending on the position of the UE, and thus, if transmission is performed with beamforming applied to the CSI-RS resource, a channel is measured with respect to the signal beamformed to the UE, and the information on the same may be fed back. Accordingly, the gain of the FD-MIMO system may be maximized. However, beamforming may vary depending on time frequency resources, and thus, not imposing restriction on time averaging when performing channel measurement on the CSI-RS might render it difficult to obtain exact channel information on the same.

Here, measurement restrictions may be used to obtain channel information and interference information.

First, when it is used to obtain channel information, the measurement restriction may be defined as follows.

If the measurement restriction is performed for channel estimation for a given CSI process, the channel used for generating CSI may be estimated using up to M non-zero power (NZP) CSI-RS subframes including the CSI interference reference resource.

Channel measurement is induced from NZP CSI-RS.

M may be explicitly configured or may be selected as a value between 1 and $Z_M$ by the UE. Next, when it is used to obtain interference information, the measurement restriction may be defined as follows.

If the measurement restriction is performed for channel estimation for a given CSI process, together with CSI-IM(s), the interference used for generating CSI may be estimated using up to N CSI-IM subframes including the CSI reference resource.

Interference measurement is induced from CSI-IM.

N may be explicitly configured or may be selected as a value between 1 and $Z_N$ by the UE.

According to a first embodiment of the present disclosure, to address such issue, there are described methods in which the base station transfers configuration information for channel measurement to the UE, and the UE performs channel measurement based on the configuration information received from the base station. As described above, as a method to pose restriction on time averaging for the reference signal when performing channel measurement, measurement reset methods are proposed. Measurement reset means that the UE initializes a resultant value for channel estimation at a determined time.

According to the first embodiment of the present disclosure, as methods for configuration information for channel measurement by the base station, measurement reset trigger and measurement window are proposed.

The object for the base station to configure configuration information for channel measurement is for the UE to exactly measure channel status and feedback the CSI for the same to the base station. Accordingly, the term may be replaced with another that fits the user's intention. Further, the proposed method may be used for channel measurement for IMR as well as channel measurement for CSI-RS beamformed. Although all examples that follow are described with respect to the CSI-RS, it should be noted that the CSI-RS may be replaced with the CSI-IM so that interference measurement for the IMR may be used. More specifically, in the 3GPP RAN1#82 conference, for CSI-RS, non-precoded CSI-RS has been named as Class A, and beamformed CSI-RS as Class B. Further, in the 3GPP RAN1#82b conference, Class A has been determined to support only measurement restriction for interference using CSI-IM, and Class B has been determined to support both measurement restriction for channel using CSI-RS and measurement restriction for interference using CSI-IM.

Now described in detail are measurement reset trigger and measurement window as methods for configuring configuration information for channel measurement by the base station.

<Measurement Reset Trigger>

First, a method for configuring configuration information for channel measurement based on a measurement reset trigger by the base station is described.

FIG. 8 illustrates an example of measurement reset trigger according to the first embodiment of the present disclosure. FIG. 8 shows that CSI-RSs are periodically transmitted. Referring to FIG. 8, the base station configures a measurement reset trigger at a particular time and transmits the same to the UE. Upon receipt of the measurement reset trigger from the base station, the UE initializes the channel estimation value for CSI-RS. In FIG. 8, the CSI-RS is denoted in a different shape in order to differentiate the CSI-RS used for channel estimation due to initialization. According to the first embodiment of the present disclosure, the measurement reset trigger allows the UE to initialize the channel estimation value for the CSI-RS in order for the base station to do dynamically through L1 signaling. The term "measurement reset" may be replaced with other terms, such as CSI reset, CSI reference resource restriction, valid CSI-RS restriction, DL subframe restriction, or BF change indicator, depending on the user's intention.

In each embodiment of the first embodiment of the present disclosure described below, a method for initializing the channel estimation value for CSI-RS through the measurement reset trigger is described using the aperiodic CSI request and other DCI signaling method.

<First-First Embodiment: Configuring a Measurement Reset Trigger Based on an Aperiodic CSI Request>

An example of configuring a measurement reset trigger through an aperiodic CSI request according to the first-first embodiment of the present disclosure is described below with reference to FIG. 9. The base station does not use separate L1 signaling to configure the measurement reset trigger and may interpret setting the aperiodic CSI request as configuring the measurement reset trigger.

Figure 10:
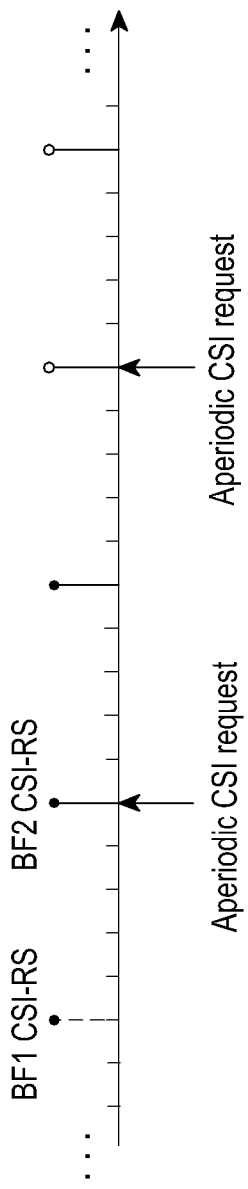
Figure 11:
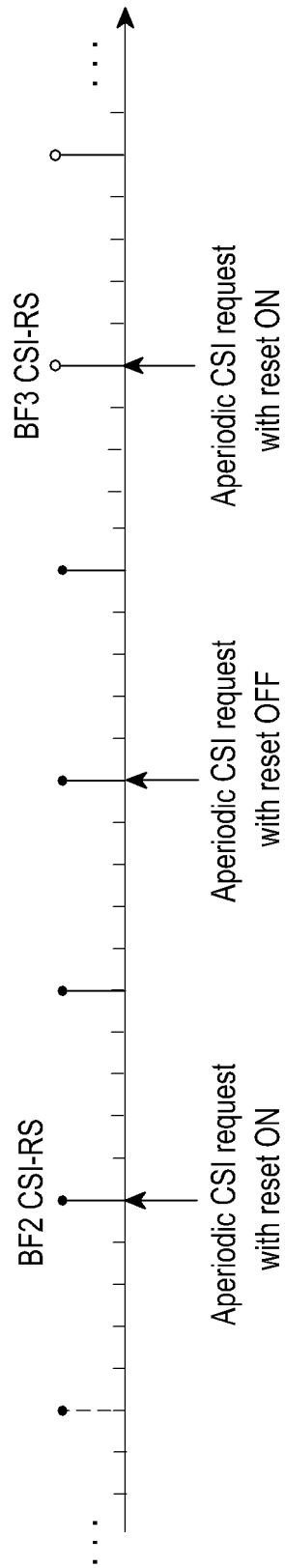

FIGS. 9 to 11 illustrate an example of configuring a measurement reset trigger through an aperiodic CSI request according to a first-first embodiment of the present disclosure.

FIG. 9 assumes that the CSI-RS is periodically transmitted. The base station transmits the CSI-RS by applying beamforming 1 and then determines to change the beam to beamforming 2 at a next subframe. At this time, the base station performs the operation of configuring the aperiodic CSI request to configure the measurement reset trigger.

As shown in FIG. 9, the timing at which the aperiodic CSI request is configured by the base station. FIG. 9 shows three example timings at which the base station configures the aperiodic CSI request. If the base station uses aperiodic CSI request timing-1, the UE fails to receive the CSI-RS to which beamforming 2 applies at this time and thus should wait until it receives a next CSI-RS in order to perform channel estimation on the CSI-RS to which beamforming 2 applies. Thus, the CSI reporting may be delayed. If the base station uses aperiodic CSI request timing-3, the UE may fail to perform measurement reset on the CSI-RS to which beamforming 2 has already applied. If the base station uses CSI-RS timing-2, the above issue may be addressed. However, in case more users are simultaneously scheduled in aperiodic CSI request timing-2, scheduling restriction may occur to PUSCH.

To address such problems, the base station may configure the measurement reset trigger to always perform a measurement reset upon an aperiodic CSI request as shown in FIG. 10.

Another way is to configure the measurement reset trigger by adding one bit to the uplink DCI to additionally set a reset ON/OFF. As an example, the UE may initialize the channel estimation where the bit added based on the uplink DCI is set to the reset ON and time-rearrange the subsequent channel information which has previously been initialized to perform an aperiodic CSI report where the added bit set to the reset OFF, as shown in FIG. 11. Here, the uplink DCI means DCI format 0 or 4.

Unlike the method in which the aperiodic CSI reporting is performed always for one CSI-RS as shown in FIG. 10, the method shown in FIG. 11 may increase accuracy by timing-arranging the CSI-RS for a fixed beam.

The method of the first-first embodiment may apply to periodic CSI report as well as aperiodic CSI report. As proposed above, the UE may perform channel estimation initialization on the CSI-RSs periodically transmitted through aperiodic CSI requests where the aperiodic CSI report is performed. The UE may perform channel estimation initialization on CSI-RSs through aperiodic CSI requests even where the periodic CSI report is performed. The operations of performing the aperiodic CSI report and the periodic CSI report are described below in detail with reference to the first-ninth embodiments. Now described is a method for configuring a range of reset when configuring up a measurement reset trigger through aperiodic CSI request as in the first-first embodiment of the present disclosure.

Table 2 below illustrates the CSI request field for the PDCCH/EPDCCH having an uplink DCI format in the UE specific search space. Where, as shown in Table 2, the CSI request field is set to '01,' '10,' or '11' so that the aperiodic CSI request is set, and the CSI process connected thereto is set to '01,' there may be up to four, or when it is set to '10' or '11,' there may be up to five.

TABLE 2

| Value of CSI request field | Description |
|---|---|
| '00' | No aperiodic CSI report is triggered |
| '01' | Aperiodic CSI report is triggered for a set of CSI process(es) configured by higher layers for serving cell C |

TABLE 2-continued

| Value of CSI request field | Description |
|---|---|
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

Thus, in case the measurement reset trigger is configured through the aperiodic CSI request, the range of reset may be configured by the following method.

Alt-1: Measurement reset is conducted for all CSI processes configured.

Alt-2: Whether to perform measurement reset is defined in the RRC, and measurement reset is performed on the CSI-RS/CSI-IM or CSI process corresponding thereto.

Alt-3: Whether to perform measurement reset is defined in the uplink DCI, and measurement reset is performed on the CSI-RS/CSI-IM or CSI process corresponding thereto.

Of the above methods, the Alt-1 case benefits no need of additional higher layer signaling or L1 signaling but suffers from the possibility that measurement reset may be conducted on the CSI-RS not beamformed. The Alt-3 case should determine whether to perform measurement reset through L1 signaling and may be thus subject to a signaling overhead issue. Further, the Alt-2 case is a method for determining whether to perform measurement reset using higher layer signaling and benefits freedom in signaling overhead over the Alt-3 case.

Among the above methods, determining whether to perform measurement reset using Alt-3 may be set by the following method.

Measurement reset turn ON/OFF is defined in CSI-process field.

Measurement reset turn ON/OFF is defined in CSI-RS-Config field.

Measurement reset turn ON/OFF is defined in CSI-RS-Config field and CSI-IM-Config field.

Defining whether to perform measurement reset through higher layer signaling may be indicated as shown in Table 3 below. However, the method for defining whether to perform measurement reset through higher layer signaling is not limited to the method shown in Table 3. If whether measurement reset is performed is defined in the CSI process field, the CSI-RS-Reset function and the CSI-IM-Reset function in Table 3 may be defined in the CSI process field. Or, only one thereof may be defined.

TABLE 3

| CSI-RS-Reset ::= | CHOICE { | |
| | Reset-ON | Null |
| | Reset-OFF | Null |
| } | | |
| CSI-IM-Reset ::= | CHOICE { | |
| | Reset-ON | Null |
| | Reset-OFF | Null |
| } | | |

If whether to perform measurement reset is defined only in the CSI-RS-Config field, only the CSI-RS-Reset function is included in Table 3, and in such case, whether to perform CSI-IM measurement reset might not be defined. Or, whether to perform CSI-IM measurement reset may be determined depending on the CSI-RS-Reset. If whether to perform measurement reset is defined using both the CSI-RS-Config field and the CSI-IM-Config field, the CSI-RS- Reset function and the CSI-IM-Reset function in Table 3 may be defined in the CSI-RS-Config field and the CSI-IM-Config field, respectively.

<First-Second Embodiment: Configuring a Measurement Reset Trigger Based on Uplink DCI>

An example of configuring a measurement reset trigger based on uplink DCI according to the first-second embodiment of the present disclosure is described below. Here, the uplink DCI means DCI format 0 or 4. In the method according to the first-second embodiment, one bit may be further defined in the uplink DCI, and the measurement reset trigger ON/OFF is set by the one-bit information. In the first-first embodiment, the measurement reset trigger has been configured based on the aperiodic CSI request, and thus, the aperiodic CSI report is always performed upon configuring the measurement reset trigger. In the first-second embodiment of the present disclosure, however, the measurement reset trigger may be set using one bit defined in the uplink DCI. In case the measurement reset trigger is set through the uplink DCI as in the first-second embodiment of the present disclosure, the Alt-1, Alt-2, and Alt-3 methods may be utilized to set the reset range.

<First-Third Embodiment: Configuring a Measurement Reset Trigger Based on Transmission Power Control (TPC) DCI>

An example of configuring a measurement reset trigger based on TPC DCI according to the first-third embodiment of the present disclosure is described below. Here, the TPC DCI means DCI format 3 or 3a. The method of the first-third embodiment of the present disclosure defines the measurement reset field as shown in Tables 4 and 5 instead of the TPC command field defined for TCP (refer to TPC command field, 3GPP TS 36.213 Table 5.1.1.1-2, 5.1.1.1-3). Further, a new radio network temporary identifier (RNTI) may be defined so that DCI format 3 or 3 a may be operated for measurement reset trigger while simultaneously used for the TPC.

TABLE 4

| Measurement reset Field in DCI format 3 | Measurement reset option-1 | Measurement reset option-2 |
|---|---|---|
| 0 | CSI-RS process ID-1 | A set of CSI process(es) configured by higher layers for serving cell C |
| 1 | CSI-RS process ID-2 | A $1^{st}$ set of CSI process(es) configured by higher layers |
| 2 | CSI-RS process ID-3 | A $2^{nd}$ set of CSI process(es) configured by higher layers |
| 3 | CSI-RS process ID-4 | A $3^{th}$ set of CSI process(es) configured by higher layers |

TABLE 5

| Measurement reset Field in DCI format 3A | Measurement reset |
|---|---|
| 0 | measurement reset ON |
| 1 | Reserved |

Table 4 above represents an example of where the measurement reset field is defined in DCI format 3. Two options are available at this time.

First, option-1 is a method for configuring a CSI-RS process to perform measurement reset while simultaneously configuring the measurement reset trigger. Option-2 is a method for configuring a CSI-RS process set to perform measurement reset while simultaneously configuring the measurement reset trigger considering carrier aggregation (CA). In case option-2 is used, the reset range may be set by the method such as Alt-1, Alt-2, and Alt-3 like in the first-second embodiment above. Table 5 above represents the case where the measurement reset field is defined in DCI format 3a. Also in this case, the method such as Alt-1, Alt-2, and Alt-3 of the first-second embodiment may be used to set the reset range.

<Measurement Window>

Next, a method for configuring configuration information for channel measurement based on a measurement window by the base station is described.

Figure 12:
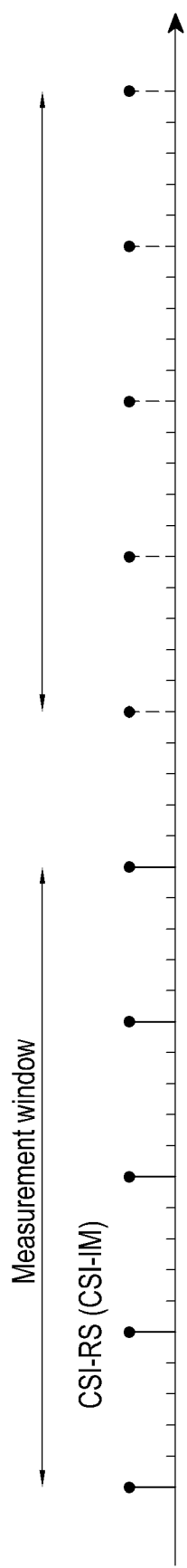
FIG. 12 is a view illustrating an example of a measurement window according to a first embodiment of the present disclosure.

FIG. 12 illustrates an example of a measurement window according to a first embodiment of the present disclosure.

FIG. 12 shows an example in which CSI-RSs are periodically transmitted and a measurement window is set for five CSI-RSs. Here, the measurement window refers to a period during which time averaging may be possible upon channel estimation using CSI-RSs. Further, the channel estimation value for CSI-RS is initialized at each measurement window start point. The measurement window may be defined as a time period or the number of CSI-RSs transmitted. For example, assuming that CSI-RSs are transmitted every 5 msec as shown in FIG. 12, the measurement window may be defined as 20 msec, or may be otherwise defined as 5, the number of CSI-RSs transmitted.

Table 6 below represents a case in which the measurement window periodicity is defined as a time period and a case in which the measurement window is defined as the number ($N_{CSI-RS}$) of CSI-RSs transmitted. When the measurement window is defined as the number of CSI-RSs transmitted, if $N_{CSI-RS}=1$, then $T_M=1$, and for the case where $N_{CSI-RS} \geq 2$, the measurement window $T_M$ may be calculated as in Equation 1 from the CSI-RS period $T_{CSI-RS}$.

$$T_M = T_{CSI-RS}(N_{CSI-RS} - 1)$$

Table 6-1 below represents a subframe configuration method for the measurement window.

In Tables 6 and 6-1, integer X may be interpreted as measurement reset being not performed. In Table 6-1, $X_k$ represents the measurement window period. More specifically, Table 6-2 shows an example for Table 6-1.

TABLE 6

| Measurement window periodicity configuration | Time interval (subframes) | # of CSI-RS transmission ($N_{CSI-RS}$) |
|---|---|---|
| 0 | 1 | 1 |
| 1 | 5 | 2 |
| 2 | 10 | 3 |
| 3 | 15 | 4 |
| 4 | 20 | 5 |
| 5 | 25 | 6 |
| 6 | 30 | 7 |
| ... | ... | ... |
| X | Infinite | Infinite |

TABLE 6-1

| MeasurementConfig ($I_M$) | Mesurement window periodicity (subframes) | Measurement window subframe offset $\Delta_M$ (subframe) |
|---|---|---|
| 0 | 1 | $I_M$ |
| 1~$X_1$ | $X_1$ | $I_M - 1$ |

TABLE 6-1-continued

| MeasurementConfig ($I_M$) | Mesurement window periodicity (subframes) | Measurement window subframe offset $\Delta_M$ (subframe) |
|---|---|---|
| $X_1 + 1 \sim X_1 + X_2$ | $X_2$ | $I_M - X_1 - 1$ |
| $X_1 + X_2 + 1 \sim X_1 + X_2 + X_3$ | $X_3$ | $I_M - X_1 - X_2 - 1$ |
| ... | ... | ... |
| $X_1 + X_2 + X_3 + \ldots + X_{k-1} + 1 \sim X_1 + X_2 + X_3 + \ldots + X_k$ | $X_k$ | $I_M - X_1 - X_2 - X_3 - \ldots - X_{k-1} - 1$ |
| ... | ... | ... |
| X | Infinite | Not defined |

TABLE 6-2

| MeasurementConfig ($I_M$) | Mesurement window periodicity (subframes) | Measurement window subframe offset $\Delta_M$ (subframe) |
|---|---|---|
| 0 | 1 | $I_M$ |
| 1~5 | 5 | $I_M - 1$ |
| 6~15 | 10 | $I_M - 6$ |
| 16~35 | 20 | $I_M - 16$ |
| 36~75 | 40 | $I_M - 36$ |
| 76~155 | 80 | $I_M - 76$ |
| X | Infinite | Not defined |

According to the first embodiment of the present disclosure, the measurement window is transferred from the base station to the UE through high-layer signaling to initialize the channel estimation value for the CSI-RS within a predetermined interval. In the first embodiment of the present disclosure, the measurement window may be operated in various measurement window configurations as shown in Table 6-1 or as a single fixed measurement window. For example, where the measurement window is operated in various measurement window configurations, the base station determines the number of measurement windows that it is to operate and signals the INTEGER(0 . . . X) values. Where it is operated in various measurement window configurations, the base station may set a proper size for the measurement window. However, implementing the UE may be complicated.

By contrast, where it is operated as a single fixed measurement window, the base station determines a particular measurement window size and signals the INTEGER (A,X) value. Here, A is set to the fixed measurement window periodicity value, and here, the measurement window subframe offset may be set to a value from 1 to A. For example, in case A is set to 1, the channel estimation value for CSI-RS is initialized every CSI-RS reception, and if X is configured through higher layer signaling, the channel estimation value for CSI-RS is not initialized. Further, the measurement window value may be configured considering the period of transmission of RI taking into account the periodic CSI reporting. Specific operations for the same are described in detail in connection with the first-ninth embodiment of the present disclosure. As such, where the measurement window size is operated to be fixed, implementing the UE may be a bit simplified as compared where it is operated in various measurement window configurations.

In the following first embodiment of the present disclosure, when it is operated in various measurement window configurations, it is denoted INTEGER (0 . . . X), while operated in a single fixed measurement window, it is denoted INTEGER (A,X).

Where it is operated in various measurement window configurations, Table 6-1 above may be used to determine the measurement window subframe offset, and where it is operated in a single fixed measurement window, the measurement window subframe offset may be set and configured as INTEGER(0 . . . A). Additionally, the term "measurement window" may be replaced with other terms, such as CSI reset window, CSI reference resource restriction window, valid CSI-RS restriction window, DL subframe restriction window, or BF change window, depending on the user's intention.

Described below through CSI-RS configuration, CSI process, and CSI report configuration is a method for configuring a measurement window subframe configuration and a measurement window value using higher-layer signaling in the first-fourth, first-fifth, and first-sixth embodiments of the present disclosure. Also described is a method for configuring a measurement window subframe configuration and a measurement window value without additional higher-layer signaling in the first-eleventh embodiment of the present disclosure.

<First-Fourth Embodiment: Configuring a Measurement Window Based on CSI-RS Configuration>

The method for configuring a measurement window based on a CSI-RS configuration according to the first-fourth embodiment of the present disclosure is described with reference to Table 7.

Table 7 below represents the CSI-RS-Config field. The first-fourth embodiment of the present disclosure is for the case where the measurement window is configured in the CSI-RS-Config field. Specifically, the following fields may be added for the CSI-RS and the CSI-IM in the first-fourth embodiment of the present disclosure.

CSI-RS-MeasurementConfig INTEGER(0 . . . X) or INTEGER(A,X)

CSI-IM-MeasurementConfig INTEGER(0 . . . X) or INTEGER(A,X)

additional configuration when operated in a single fixed measurement window: CSI-RS-Measurementoffset INTEGER(1 . . . A)

Here, the INTEGER value as set refers to Table 6 above, and X denotes not performing measurement reset.

TABLE 7

```
CSI-RS-Config-r10 ::=       SEQUENCE {
    csi-RS-r10              CHOICE {
        release                 NULL,
        setup                   SEQUENCE {
            antennaPortsCount-r10       ENUMERATED {an1, an2, an4, an8},
            resourceConfig-r10          INTEGER (0..31),
            subframeConfig-r10          INTEGER (0..154),
            p-C-r10                     INTEGER (-8..15)
        }
    }                                                   OPTIONAL,   -- Need ON
    zeroTxPowerCSI-RS-r10   ZeroTxPowerCSI-RS-Conf-r12  OPTIONAL    -- Need ON
}
```

<First-Fifth Embodiment: Configuring a Measurement Window Based on CSI Process>

The method for configuring a measurement window based on a CSI process according to the first-fifth embodiment of the present disclosure is described with reference to Table 8.

Table 8 below represents the CSI-Process field. The first-fifth embodiment of the present disclosure is for the case where the measurement window is set in the CSI-Process field. Specifically, the following fields may be added for the CSI-RS and the CSI-IM in the first-fifth embodiment of the present disclosure.

CSI-RS-MeasurementConfig INTEGER(0 . . . X) or INTEGER(A,X)

CSI-IM-MeasurementConfig INTEGER(0 . . . X) or INTEGER(A,X)

additional configuration when operated in a single fixed measurement window: CSI-RS-Measurementoffset INTEGER(1 . . . A).

Here, the INTEGER value as set refers to Table 6 above, and X denotes not performing measurement reset.

TABLE 8

```
CSI-Process-r11 ::=     SEQUENCE {
    csi-ProcessId-r11           CSI-ProcessId-r11,
    csi-RS-ConfigNZPId-r11      CSI-RS-ConfigNZPId-r11,
    csi-IM-ConfigId-r11         CSI-IM-ConfigId-r11,
    p-C-AndCBSRList-r11 SEQUENCE (SIZE (1..2)) OF P-C-AndCBSR-r11,
    cqi-ReportBothProc-r11      CQI-ReportBothProc-r11      OPTIONAL,                   -- Need OR
    cqi-ReportPeriodicProcId-r11    INTEGER (0...maxCQI-ProcExt-r11)    OPTIONAL,       -- Need OR
    cqi-ReportAperiodioProc-r11 CQI-ReportAperiodicProc-r11 OPTIONAL,                   -- Need OR
    ...,
    [{ alternativeCodebookEnabledFor4TXProc-r12     ENUMERATED {true}       OPTIONAL,   -- Need ON
        csi-IM-ConfigIdList-r12         CHOICE {
            release                         NULL,
            setup                           SEQUENCE (SIZE (1..2)) OF CSI-IM-ConfigId-r12
        }                                                               OPTIONAL,       -- Need ON
        cqi-ReportAperiodicProc2-r12    CHOICE [
            release                         NULL,
            setup                           CQI-ReportAperiodicProc-r11
        }                                                               OPTIONAL        -- Need ON
    ]]
}
```

<First-Sixth Embodiment: Configuring a Measurement Window Based on CSI Report Configuration>

The method for configuring a measurement window based on a CSI report configuration according to the first-sixth embodiment of the present disclosure is described with reference to Table 9.

Table 9 represents the CSI-Process field, and Table 10 represents the CQI-ReportPeriodic field. The first-sixth embodiment of the present disclosure is for the case where the measurement window is configured in the CSI-Process field or CQI-ReportPeriodic field. Specifically, the following fields may be added for the CSI-RS and the CSI-IM in the first-sixth embodiment of the present disclosure.

CSI-RS-MeasurementConfig INTEGER(0 . . . X) or INTEGER(A,X)

CSI-IM-MeasurementConfig INTEGER(0 . . . X) or INTEGER(A,X)

additional configuration when operated in a single fixed measurement window: CSI-RS-Measurementoffset INTEGER(1 . . . A)

Here, the INTEGER value as set refers to Table 6 above, and X denotes not performing measurement reset.

TABLE 9

| | | |
|---|---|---|
| CQI-ReportConfig ::= | SEQUENCE { | |
|    cqi-ReportModeAperiodic | CQI-ReportModeAperiodic OPTIONAL, | -- Need OR |
|    nomPDSCH-RS-EPRE-Offset | INTEGER (−1..6), | |
|    cqi-ReportPeriodic | CQI-ReportPeriodic OPTIONAL | -- Need ON |
| } | | |

TABLE 10

| | | | |
|---|---|---|---|
| CQI-ReportPeriodic ::= | CHOICE { | | |
|   release | NULL, | | |
|   setup | SEQUENCE { | | |
|     cqi-PUCCH-ResourceIndex | INTEGER (0..1185), | | |
|     cqi-pmi-ConfigIndex | INTEGER (0..1023), | | |
|     cqi-FormatIndicatorPeriodic | CHOICE { | | |
|       widebandCQI | NULL, | | |
|       subbandCQI | SEQUENCE { | | |
|         k | INTEGER (1..4) | | |
|       } | | | |
|     }, | | | |
|     ri-ConfigIndex | INTEGER (0..1023) | OPTIONAL, | -- Need OR |
|     simultaneousAckNackAndCQI | BOOLEAN | | |
|   } | | | |
| } | | | |

If the measurement window is set in the CQI-ReportPeriodic field and aperiodic CSI report operates, the UE may reference the measurement window value set in the CQI-ReportPeriodic field for channel measurement.

Described next is operating the measurement reset method proposed in the first embodiment of the present disclosure in case the UE is set with CSI subframe sets) $C_{CSI,0}$, $C_{CSI,1}$ through higher layers.

<First-Seventh Embodiment: Operating a Measurement Window in a New Transmission Mode (TM)>

The first-seventh embodiment of the present disclosure relates to a measurement window operation method for the case where a new TM is defined to operate FD-MIMO system in contrast to the first-fourth, first-fifth, and first-sixth embodiments of the present disclosure.

The size of measurement window may be set by higher-layer signaling or may be defined as a fixed one under the assumption that the FD-MIMO system is operated always in beamformed CSI-RSs without configuring higher-layer signaling. In other words, if the base station is configured with the new TM, it may be operated as using a measurement window size configured in a fixed manner In the first-seventh embodiment of the present disclosure, unlike the first-fourth, first-fifth, and first-sixth embodiments, no additional higher-layer signaling may be set. For example, if the base station is configured with a new TM, the measurement window configuration is set to 0 in Table 6, and such operation may be done that the channel estimation value is initialized for CSI-RS upon each CSI-RS receipt.

<First-Eighth Embodiment: CSI Subframe Sets>

In the firth-eighth embodiment of the present disclosure, there is described a method of using and operating the measurement reset trigger or measurement window proposed in the first embodiment of the present disclosure in case the UE is set with CSI subframe sets $C_{CSI,0}$, $C_{CSI,1}$ through higher layer.

First, in case the measurement reset trigger is used, it may be set to perform measurement reset only during the CSI subframe set where the measurement reset trigger has been transmitted. Next, in case the measurement window is used, the UE may be configured to define the measurement window as the number of CSI-RSs transmitted and to perform measurement reset only during the CSI subframe set where the measurement window has been configured.

<First-Ninth Embodiment: CSI Reporting>

The first-ninth embodiment of the present disclosure relates to a method for the UE to perform CSI reporting when a measurement restriction is imposed through the measurement reset trigger or measurement window proposed in the first embodiment of the present disclosure. The CSI reporting may be divided into aperiodic CSI reporting and periodic CSI reporting.

First, the case where the operation is performed in aperiodic CSI reporting is considered. In case measurement restriction is performed through measurement reset trigger, as described in connection with FIG. 9 of the first-first embodiment, it is effective for the base station to transmit measurement reset trigger and aperiodic CSI request at the time that CSI-RS is transmitted in light of performing measurement restriction and aperiodic CSI reporting. In this case, the UE may perform measurement using CSI-RS at time n when the measurement reset trigger and aperiodic CSI request were transmitted, and the UE may perform aperiodic CSI reporting at time n+k. In the case that measurement restriction is performed through the measurement window, if the aperiodic CSI request was transmitted at time n within the measurement window, the UE may perform measurement using a previous CSI-RS and aperiodic CSI reporting at time n+k.

Next, the case where the operation is carried out in periodic CSI reporting is taken into account. In the case of periodic CSI reporting, feedback timing is determined by four feedback modes set forth in 3GPP TS 36.213 Table 7.2.2-1 and parameter transferred through a higher layer signal. Refer to FIGS. 4 to 7 for details of the same. Periodic CSI reporting is required to specifically signify RI/PMI/CQI feedback reflecting the same from the time that measurement restriction is applied through measurement reset trigger or measurement window. For example, since feedback is done in order of RI, PMI, and CQI, and CQI is calculated based on RI and PMI fed back earlier, if measurement restriction is done after PMI is fed back, CQI cannot reflect the result of measurement restriction. Accordingly, if measurement restriction is done through the measurement reset trigger or measurement window, reflecting the same should be updated with respect to RI. For example, referring to FIG. 6, if measurement restriction is achieved at n=5 in FIG. 6, RI/PMI/CQI reflecting the measurement rest may be reported from n=16. In this case, the PMI/CQI information transmitted between n=5 to 15 cannot be used. In case measurement restriction is done through measurement window, the measurement window may be configured considering the period when RI is reported. As such, if the measurement window is configured with the feedback timing considering the period when RI is reported, such problem may be addressed where PMI/CQI information is discarded after the measurement restriction is achieved.

<First-Tenth Embodiment: Measurement Restriction Configuration>

In the first-tenth embodiment of the present disclosure, described is a method for configuring N CSI-IM subframes for measuring interference or configuring M NZP CSI-RS subframes for channel measurement based on the definition of measurement restriction unlike the method of indicating the measurement window periodicity of performing measurement reset at a predetermined period as described above in connection with the measurement window. As described above in connection with the measurement window, M or N may be configured using high-layer signaling. More specifically, the operation may be performed through the following Table 11. Further, a method configuring the same through higher-layer signaling is rendered possible by adding the following fields to CSI-RS configuration, CSI process, or CSI report configuration as in the first-fourth, first-fifth, and first-sixth embodiments of the present disclosure.

CSI-RS-MeasurementRestrictionConfig INTEGER(0 . . . X) or INTEGER(A,X)
CSI-IM-MeasurementRestrictionConfig INTEGER(0 . . . X) or INTEGER(A,X)

Here, integer X may be interpreted as measurement reset being not performed. In the case of periodic CSI reporting, feedback timing is determined by four feedback modes set forth in 3GPP TS 36.213 Table 7.2.2-1 and parameter transferred through a higher layer signal. Specifically, in case A is set to 1, M=1 or N=1, so that channel is measured through one NZP CSI-RS subframe or interference is measured through one CSI-IM subframe.

TABLE 11

| Measurement restriction configuration | M or N (subframes) |
|---|---|
| 0 | 1 |
| 1 | 2 |
| 2 | 3 |
| 3 | 4 |
| 4 | 5 |
| 5 | 6 |
| 6 | 7 |
| . . . | . . . |
| X | Infinite |

<First-Eleventh Embodiment: Configuring a Measurement Window and a Subframe Configuration of the Measurement Window without Additional Higher-Layer Signaling>

The first-eleventh embodiment of the present disclosure relates to a method for configuring a measurement window subframe configuration for the case where no additional configuration is made for the measurement window subframe configuration through higher-layer signaling, such as CSI-RS configuration, CSI process, and CSI report configuration described above in connection with the first-fourth, first-fifth, and first-sixth embodiments of the present disclosure in the method for operating the measurement window. In the first-eleventh embodiment of the present disclosure, two methods as follows may be taken into consideration.

subframe configuration of measurement window subframe configuration (measurement window periodicity and subframe offset) is determined by the subframe offset and period of beam indicator (BI) (BI may be used in the same meaning as CSI-RS resource indicator (CRI)). Here, CRI refers to the index for each of K CSI-RS resources.

subframe configuration (measurement window periodicity and subframe offset) of measurement window is determined by the subframe offset and period of RI.

That means that, for example, where the subframe configuration of measurement window is determined by CRI, the subframe offset and period of measurement window are determined by the offset and period of CRI defined through higher-layer signaling. If the period of CRI is A ms, and offset is B subframes, the period and subframe offset of the measurement window may be determined as A ms and (Y-x) subframes, respectively. Here, x may be set as an integer.

<First-Twelfth Embodiment: Configuring a Measurement Restriction as per Periodic CSI Reporting or Aperiodic CSI Reporting>

The first-twelfth embodiment of the present disclosure relates to a method for configuring the measurement restriction of base station and UE according to periodic CSI reporting or aperiodic CSI reporting. In the first-twelfth embodiment of the present disclosure, applying the measurement restriction scheme may be varied depending on periodic CSI reporting and aperiodic CSI reporting as shown in FIG. 13.

Figure 13:
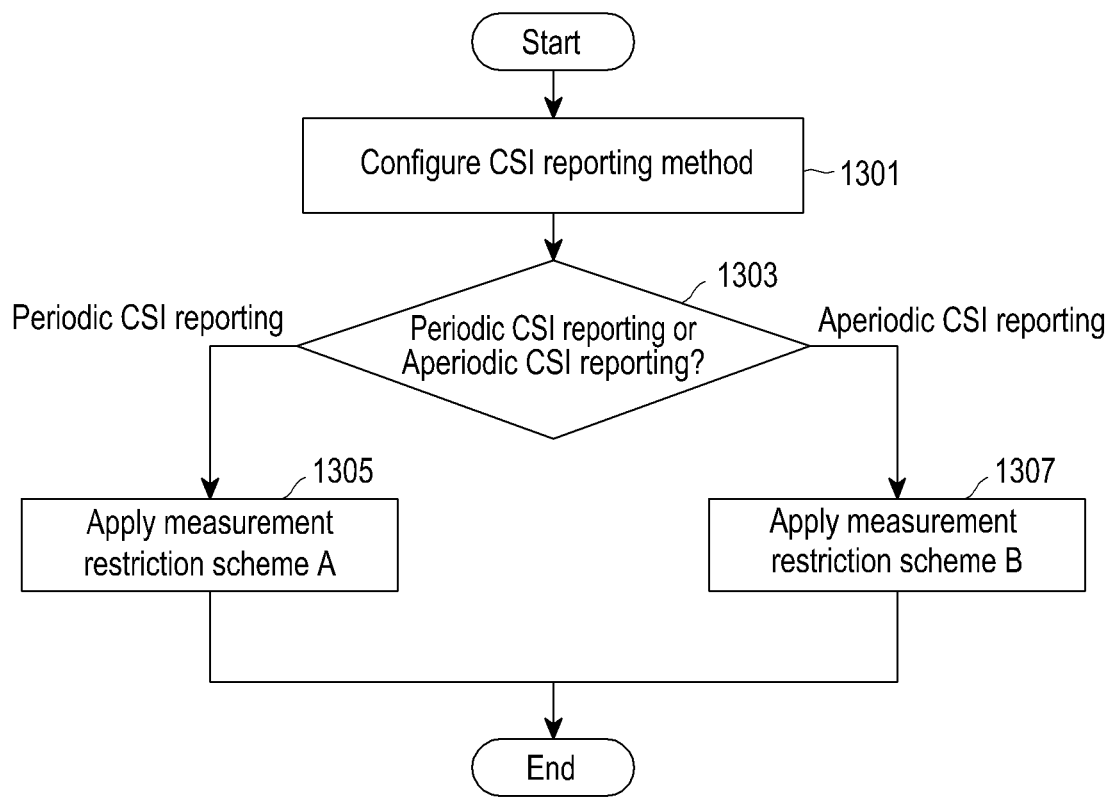
FIGS. 13 and 14 are views illustrating an example of a method for configuring a measurement restriction scheme according to a first-twelfth embodiment of the present disclosure.
Figure 14:
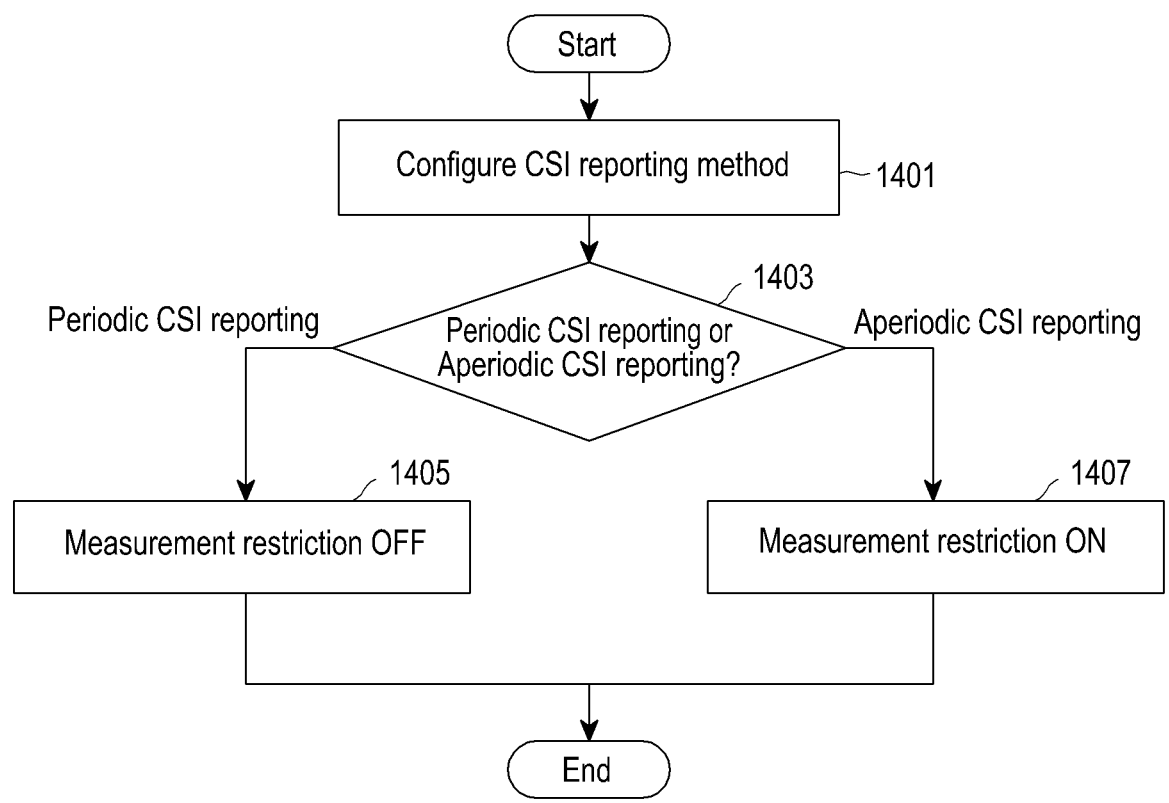

FIGS. 13 and 14 illustrate an example of a method for configuring a measurement restriction scheme according to a first-twelfth embodiment of the present disclosure.

Referring to FIG. 13, as the CSI reporting method is set as periodic CSI reporting or aperiodic CSI reporting, the measurement restriction scheme as applied may be varied. That is, the base station and the UE configure periodic CSI reporting or aperiodic CSI reporting as CSI reporting (1301). The CSI reporting set by the base station and the UE is determined (1303). Where the CSI reporting is periodic CSI reporting, measurement restriction scheme A applies (1305), and where the CSI reporting is aperiodic CSI reporting, measurement restriction scheme B applies (1307).

The measurement restriction schemes applied here include all of the first method (first-first, first-second, and first-third embodiments) for measurement reset trigger as proposed in the first embodiment of the present disclosure, the second method (first-fourth, first-fifth, first-sixth, and first-eleventh embodiments) for measurement window, and the third method (first-tenth embodiment) for the case where M/N, the number of subframes to which measurement restriction applies, is set to a fixed number that is one or more (first-tenth embodiment).

For example, where the CSI reporting is set as aperiodic CSI reporting, the third method may apply, and where the CSI reporting is set as periodic CSI reporting, the second method may apply.

Next, referring to FIG. 14, as the CSI reporting method is set as periodic CSI reporting or aperiodic CSI reporting, applying an ON/OFF to the measurement restriction may be varied.

That is, the base station and the UE configure periodic CSI reporting or aperiodic CSI reporting as CSI reporting (1401). The CSI reporting configured by the base station and the UE is determined (1403). Where the CSI reporting is set as aperiodic CSI reporting, the measurement restriction applies (1407), and where the CSI reporting is set as periodic CSI reporting, the measurement restriction does not apply. In other words, measurement restriction applies only for aperiodic CSI reporting. Accordingly, as described in connection with the first-ninth embodiment of the present disclosure, such problem may be prevented which may arise when measurement restriction applies to the periodic CSI reporting.

<First-Thirteenth Embodiment: Configuring a Measurement Restriction as Per Channel and Interference>

The first-thirteenth embodiment of the present disclosure relates to a method for configuring the measurement restriction of base station and UE for channel or interference. In the 3GPP RAN1#82b conference, Class A has been determined to support only measurement restriction for interference using CSI-IM, and Class B has been determined to support both measurement restriction for channel using CSI-RS and measurement restriction for interference using CSI-IM. Proposed is a method for applying a measurement restriction scheme to channel or interference based on such determination.

As described above in connection with the first-twelfth embodiment, the measurement restriction method proposed according to the first-thirteenth embodiment of the present disclosure includes all of the first method for measurement reset trigger method, the second method for measurement window, and the second method for the case where the number, M/N, of subframes to which measurement restriction is applied is set to one or more fixed values.

Figure 15:
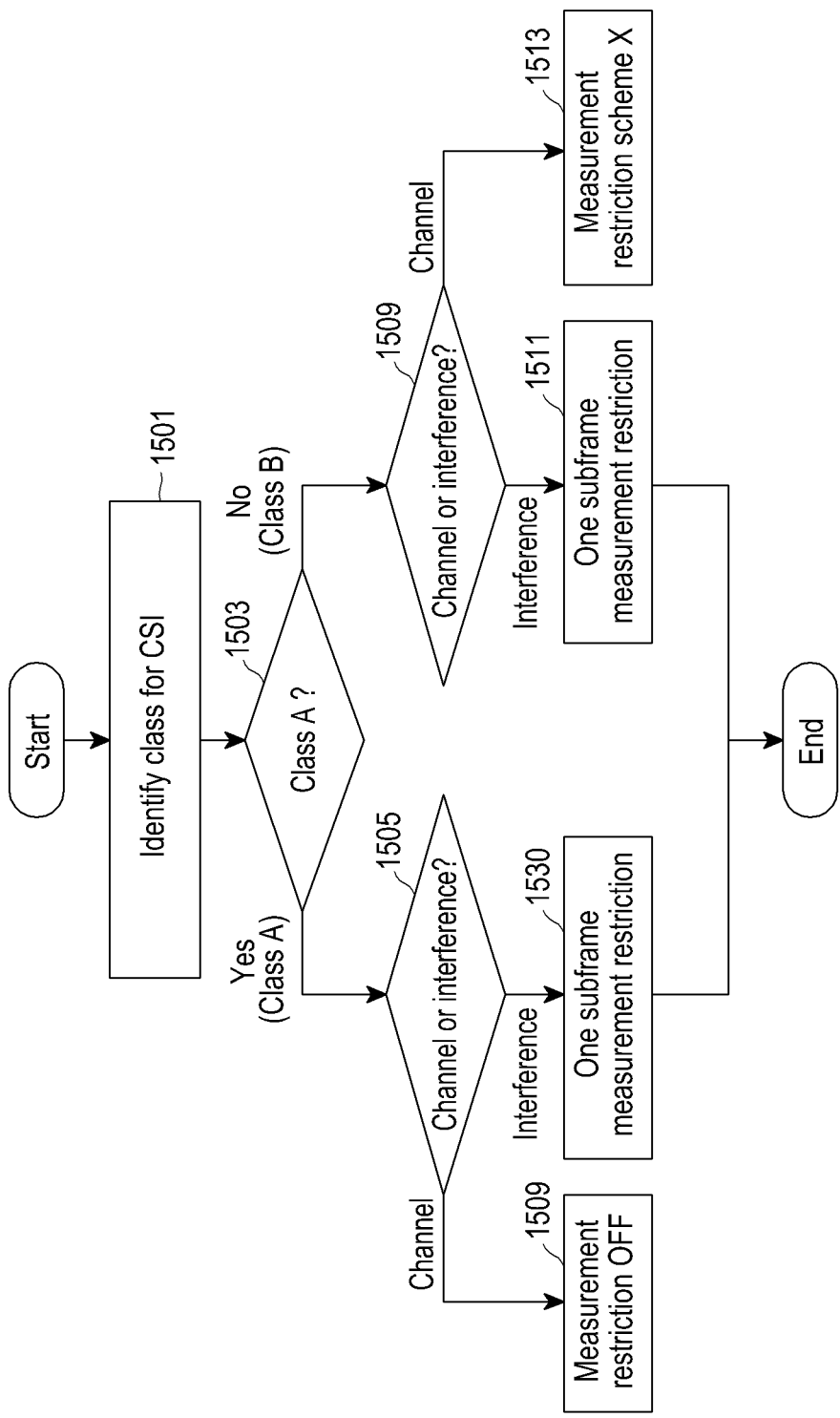
FIG. 15 is a view illustrating an example of a method for configuring a measurement restriction scheme according to a first-thirteenth embodiment of the present disclosure.

FIG. 15 illustrates an example of a method for configuring a measurement restriction scheme according to the first-thirteenth embodiment of the present disclosure.

Referring to FIG. 15, the base station and UE identify the class for CSI-RS (1501). The base station and UE determine whether the identified class is Class A (1503). Where the class is Class A, the base station and UE identify which one of channel or interference it is to apply the measurement restriction to (1505). As set forth above, since the base station and UE may apply the measurement restriction for interference in Class A, the base station and UE apply the measurement restriction to interference in one subframe (1507). The idea comes from the point that, for interference, the measurement restriction may be varied for each subframe. The first, second, and third methods for measurement restriction, all, may be set to be operated with the measurement restriction in one subframe. In contrast, for channel, the base station and UE do not apply the measurement restriction in Class A (1509).

In contrast, where the base station and UE determine that the identified class is not Class A (i.e., where it is Class B), the base station and UE identify which one of channel or interference it is to apply the measurement restriction to (1509). As set forth above, the base station and UE may apply the measurement restriction to channel and interference in case of Class B. In case of Class B, therefore, the base station and UE apply the measurement restriction to interference in one subframe and apply a channel restriction scheme X to channel (1513). Here, the channel restriction scheme X means that one of the first, second, and third methods is put to use. As an example, where the third method applies, the following configurations may be made: N=1 for reference numbers 1507 and 1511 and M=1 or M>1 for reference number 1513.

Figure 16:
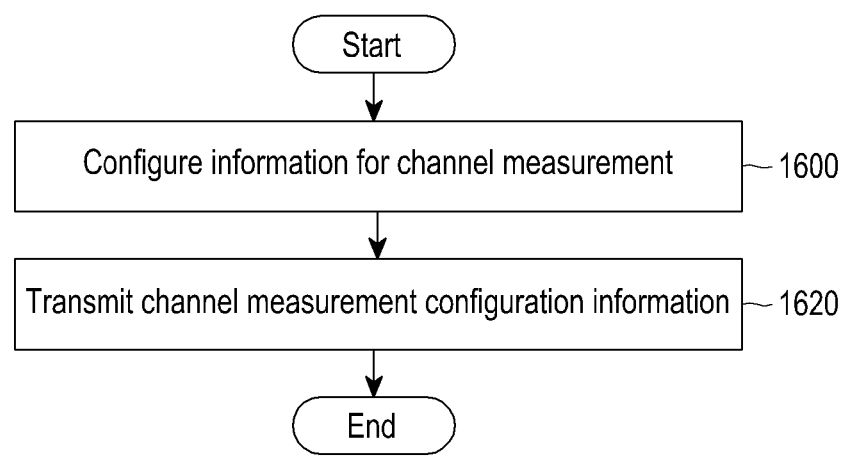
FIG. 16 is a view illustrating a method for estimating a channel by a base station according to a first embodiment of the present disclosure.

Hereinafter, operations of a base station and UE performing the first embodiment of the present disclosure are described. FIG. 16 illustrates a method for estimating a channel by a base station according to a first embodiment of the present disclosure. FIG. 16 shows operations of a base station where it is operated based on beamformed CSI-RSs in an FD-MIMO system. Meanwhile, the method for measuring channel according to the first embodiment of the present disclosure may apply to CSI-IM as well as CSI-RSs beamformed.

Referring to FIG. 16, the base station configures information for channel measurement (1601). Here, configuring the information for channel measurement may be performed through the methods proposed as per the first embodiment of the present disclosure. Thereafter, the base station transmits configuration information configured for channel measurement to the UE (1603). If the information for measurement is configured based on the measurement reset trigger, the base station transmits the information basically through L1 signaling, and information requiring additional configurations may be transmitted through higher layer signaling. Here, specific operations for the same have been described in detail in connection with the first-first to first-third embodiments of the present disclosure, and thus, no further description thereof is given. If the information for channel measurement has been configured through the measurement window, this information may be transmitted through higher layer signaling. Here, specific operations for the same have been described in detail in connection with the first-fourth, first-fifth, first-sixth, and first-eleventh embodiments of the present disclosure, and thus, no further description thereof is given. Additionally, for the operation related to the case where the UE has been set with CSI subframe sets upon CSI operation, the first-eighth embodiment of the present disclosure is referenced.

Figure 17:
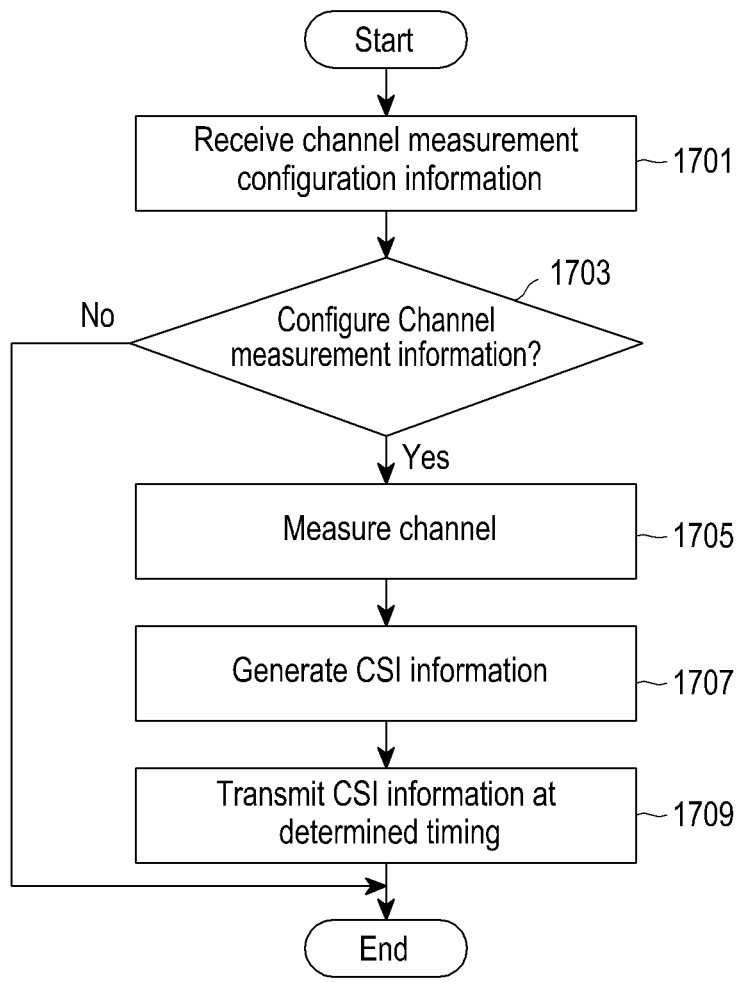
FIG. 17 is a view illustrating a method for estimating a channel by a UE according to a first embodiment of the present disclosure.

FIG. 17 illustrates a method for estimating a channel by a UE according to a first embodiment of the present disclosure. FIG. 17 shows operations of a UE where it is operated based on beamformed CSI-RSs in an FD-MIMO system. Meanwhile, the method for measuring channel according to the first embodiment of the present disclosure may apply to CSI-IM as well as CSI-RSs beamformed.

Referring to FIG. 17, the UE receives configuration information for channel measurement from the base station (1701). The UE identifies the received channel measurement information and determines whether the channel measurement information has been initialized and set (1703). The UE performs channel measurement where the channel measurement information has been initialized (1705). The UE generates CSI information (1707) and transmits the CSI information to the base station at a determined timing (1709). For relevant UE operations, refer to the first-ninth embodiment.

The method for measuring channel by the base station and UE according to the first embodiment of the present disclosure has been described above. Now described are internal configurations of a base station and UE performing channel measurement as per the first embodiment of the present disclosure in connection with FIGS. 18 and 19.

Figure 18:
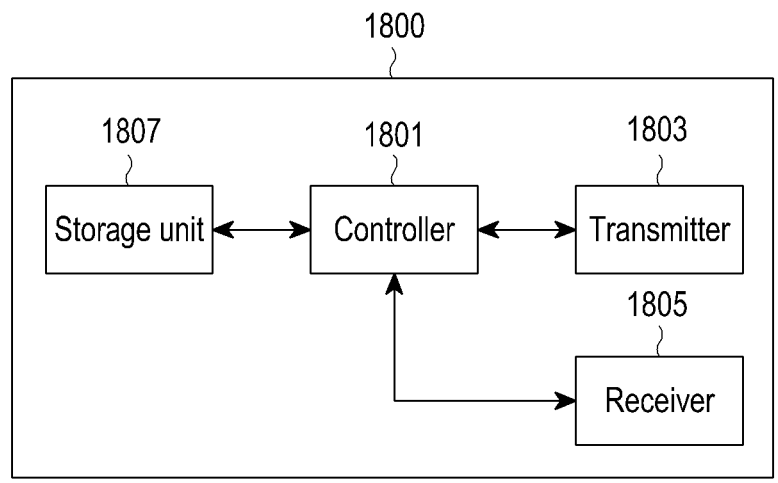
FIG. 18 is a view briefly illustrating an internal configuration of a base station for estimating a channel in an FD-MIMO system according to the first embodiment of the present disclosure.

FIG. 18 briefly illustrates an internal configuration of a base station for measuring a channel in an FD-MIMO system according to the first embodiment of the present disclosure.

Referring to FIG. 18, a base station 1800 includes a controller 1801, a transmitter 1803, a receiver 1805, and a storage unit 1807.

The controller 1801 controls the overall operation of the base station 1800, particularly, operations related to channel measurement according to the first embodiment of the present disclosure. The operations related to channel measurement according to the first embodiment of the present disclosure are the same as those described above in connection with FIGS. 8 to 17, and no detailed description thereof is repeated.

The transmitter 1803 receives various signals and messages from other entities included in the communication system under the control of the controller 1801. Here, the signals and messages received by the transmitter 1803 are the same as those described above in connection with FIGS. 8 to 16, and no detailed description thereof is repeated.

The receiver 1805 receives various signals and messages from other entities included in the communication system under the control of the controller 1801. Here, the signals and messages received by the receiver 1805 are the same as those described above in connection with FIGS. 8 to 16, and no detailed description thereof is repeated.

The storage unit 1807 stores programs and various data related to channel measurement-related operations performed by the base station 1800 under the control of the controller 1801 according to the first embodiment of the present disclosure. The storage unit 1807 stores various signals and messages received by the receiving unit 1805 from other entities.

Although FIG. 18 illustrates that the base station 1800 includes separate units, such as the controller 1801, the transmitter 1803, the receiver 1805, and the storage unit 1807, the base station 1800 may be implemented in such a manner that at least two of the controller 1801, the transmitter 1803, the receiver 1805, and the storage unit 1807 are integrated together. Further, the base station 1800 may be implemented in a single processor.

Figure 19:
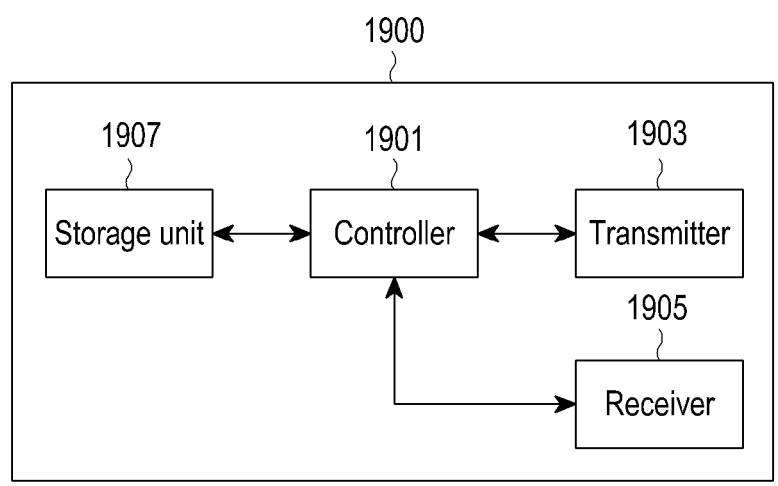
FIG. 19 is a view briefly illustrating an internal configuration of a UE for estimating a channel in an FD-MIMO system according to the first embodiment of the present disclosure.

FIG. 19 briefly illustrates an internal configuration of a UE for measuring a channel in an FD-MIMO system according to the first embodiment of the present disclosure.

Referring to FIG. 19, a UE 1900 includes a controller 1901, a transmitter 1903, a receiver 1905, and a storage unit 1907.

The controller 1901 controls the overall operation of the UE 1900, particularly, operations related to channel measurement according to the first embodiment of the present disclosure. The operations related to channel measurement according to the first embodiment of the present disclosure are the same as those described above in connection with FIGS. 8 to 17, and no detailed description thereof is repeated.

The transmitter 1903 receives various signals and messages from other entities included in the communication system under the control of the controller 1901. Here, the signals and messages received by the transmitter 1903 are the same as those described above in connection with FIGS. 8 to 17, and no detailed description thereof is repeated.

The receiver 1905 receives various signals and messages from other entities included in the communication system under the control of the controller 1901. Here, the signals and messages received by the receiver 1905 are the same as those described above in connection with FIGS. 8 to 17, and no detailed description thereof is repeated.

The storage unit 1907 stores programs and various data related to channel measurement-related operations performed by the UE 1900 under the control of the controller 1901 according to the first embodiment of the present disclosure. The storage unit 1907 stores various signals and messages received by the receiving unit 1905 from other entities.

Although FIG. 19 illustrates that the UE 1900 includes separate units, such as the controller 1901, the transmitter 1903, the receiver 1905, and the storage unit 1907, the UE 1900 may be implemented in such a manner that at least two of the controller 1901, the transmitter 1903, the receiver 1905, and the storage unit 1907 are integrated together. Further, the UE 1900 may be implemented in a single processor.

The second embodiment of the present disclosure relates to a method and apparatus in which the UE measures interference to generate channel status information in a mobile communication system that performs MIMO transmission using a plurality of eNB transmit antennas.

Figure 20:
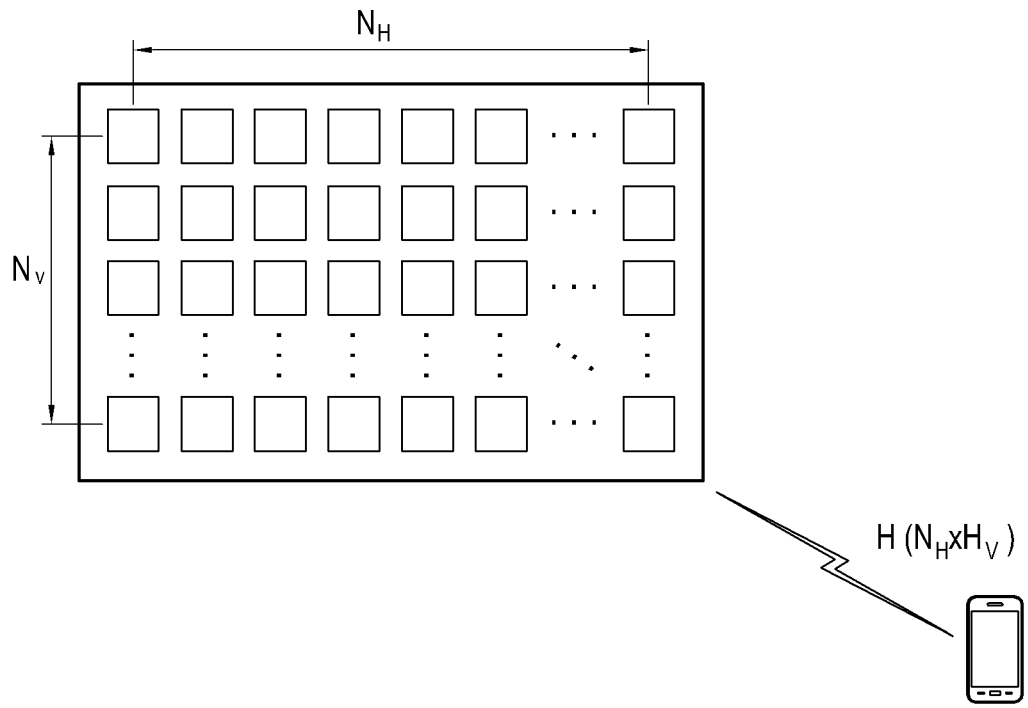
FIG. 20 is a view illustrating a communication system to which an embodiment of the present disclosure applies.

FIG. 20 is a view illustrating a communication system to which an embodiment of the present disclosure applies.

Referring to FIG. 20, a base station transmits wireless signals using a few tens of, or more, transmit antennas. The plurality of transmit antennas are arranged to maintain a predetermined distance therebetween as shown in FIG. 20. The predetermined distance may correspond to a multiple of a half the wavelength of the wireless signal transmitted, for example. Generally, in case the distance of a half the wavelength of a wireless signal is maintained between transmit antennas, the respective signals transmitted from the transmit antennas are influenced by wireless channels having lower correlation therebetween. As the distance between the transmit antennas increases, the correlation between the signals decreases.

A base station having many antennas may have the antennas arranged in 2D as shown in FIG. 20 to prevent the transmitter included therein from increasing in size. In FIG. 20, the base station transmits signals via $N_H$ antennas arranged along the horizontal axis and $N_V$ antennas arranged along the vertical axis, and the UE should measure channels on the antennas.

A few tens of, or more, transmit antennas deployed in the base station of FIG. 20 may be used to transmit signals to one or more UEs. Proper precoding applies to the plurality of transmit antennas so that signals may be simultaneously transmitted to the plurality of UEs. At this time, one UE may receive one or more information streams. Generally, the number of information streams receivable by one UE is determined depending on the channel status and the number of receive antennas owned by the UE.

In order to effectively implement the MIMO system, the UE needs to exactly measure the channel status and interference magnitude and transmit effective channel status information to the base station using the same as described above. The base station receiving the channel status information determines UEs on which it performs transmission, at what data transmission rate to perform transmission, or the precoding to apply using the channel status information in connection with downlink transmission. Since the FD-MIMO system has a lot of transmit antennas, application of the conventional channel status information communication method for LTE/LTE-A systems may cause the uplink overhead issue that more control information should be transmitted on uplink.

In the mobile communication system, time, frequency, and power resources are limited. Thus, if more resources are allocated to the reference signal, the resources allocable for traffic channel (data traffic channel) transmission may be reduced, thus resulting in a decrease on the absolute amount of data transmitted. In such case, the channel measurement and estimation capability may be enhanced, but since the absolute amount of data transmitted is reduced, the overall system capability may be rather lowered.

Accordingly, a proper distribution is required between resources for the reference signal and resources for traffic channel transmission in order to bring up with the optimal performance from a point of view of the overall system capability.

In the case of a base station having large-size antennas as shown in FIG. 20, resources to measure eight or more antenna channels need to be configured and transmitted to the UE. The available resources, as an example, may be up to 40 REs, but actually one cell is available only for two, four, or eight ones. Accordingly, there is a need for a CSI-RS pattern for 16 or 32 that are not supported in the current system in order to support channel measurement for large-size antennas required in the FD-MIMO system, and such CSI-RS pattern should be designed considering various aspects such as power boosting and radio channel estimator implementation in order for exact and efficient CSI creation.

Further, in case the legacy base station that uses four horizontal-dimensional antennas adopt vertical-dimensional antennas for enhanced performance, the size to which the antennas may be applicable might not be necessarily four or eight. Accordingly, what needs is to redesign the CSI-RS pattern to support 12 antennas used for three vertical antennas for supporting the same or other various numbers of antennas.

Thus, the FD-MIMO system should be able to consider more antennas to generate channel status information reported to the base station as compared with the conventional LTE system and to that end should transmit and receive more reference signals. Thus, according to the second embodiment of the present disclosure, there are provided a method and apparatus in which in such FD-MIMO system the UE transmit and receives more reference signals and reflects the transmitted/received reference signals to the channel status information.

<Second-First Embodiment>

The second-first embodiment of the present disclosure is a method for supporting 12 CSI-RS ports.

Figure 21:
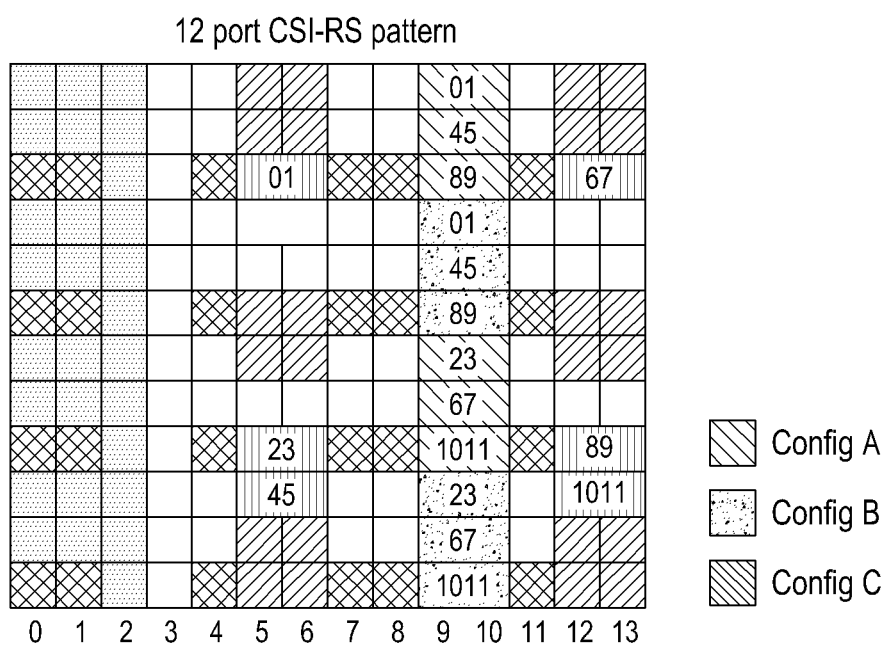
FIG. 21 is a view illustrating an example of supporting 12 CSI-RS ports using existing CSI-RS REs in a mobile communication system according to a second-first embodiment of the present disclosure.

FIG. 21 illustrates supporting 12 CSI-RS ports using existing CSI-RS REs in a mobile communication system according to a second-first embodiment of the present disclosure;

As described above, one PRB consists of 40 CSI-RS REs in total. Here, the second-first embodiment of the present disclosure is to define a CSI-RS port by excluding four legacy CSI-RS REs to support 12 CSI-RS ports in the 40 CSI-RS REs. In the case of using adding new REs and using the same as the CSI-RS port without using the currently defined CSI-RS REs only, the current REs should not be used for the PDSCH for the legacy UEs that do not use the current REs as the CSI-RS REs, and thus, data transmission to the corresponding REs cannot be done. That is, in case of adding new REs and using the same as CSI-RS ports, rather than using only CSI-RS REs currently defined, data puncturing may arise. Further, the legacy UEs do not have any means to receive the information on such data puncturing and thus decode the PDCSH by deeming the corresponding CSI-RS as data signal, and thus, the CSI-RS of the corresponding RE plays a role as interference with the legacy UEs. In order to prevent such data puncturing and interference, the CSI-RS port should be constituted of only the legacy CSI-RS REs. However, in such case, there are 40 CSI-RS REs as previously defined, and thus, four REs should not be used, and the number of configurations that may be made is limited to three for one RB. As such, the number of configurations that may be made being small means that the number of cases where various neighbor cells and UEs may do multiplexing on the time and frequency dimensions while avoiding their CSI-RS positions deceases.

In order to maximize the radio channel estimation performance through reference signals, the legacy 4, 8 port CSI-RSs have transmitted the CSI-RS ports using the same time resources under the same configurations. Accordingly, a power boosting effect, 3 dB for 4 port CSI-RS and 6 dB for 8 port CSI-RS, has been able to be achieved. However, although the CSI-RS pattern shown in FIG. 21 may achieve a power boosting effect on the order of 7.8 dB (six times) as all the reference signals use the same time resource for configs. B and C, config A may achieve only 4 dB (three times) of power boosting, and despite having more antennas than the existing 8 port CSI-RS, may obtain a sufficient power boosting effect. This should be taken into account. Further, in case the measurement OFDM symbols vary, a phase shift may arise due to the time difference and residual frequency offset between two symbols that may influence the PMI estimation performance.

Likewise, the legacy CSI-RSs have the same RS structure but different RE start points according to all the CSI-RS configs. in order to minimize the hardware complexity of the UE. However, the pattern as per CDM 2 which has a two-count size in the second-first embodiment of the present disclosure cannot take such consideration to support 12 CSI-RS ports within the existing CSI-RS positions. The resource configurations for 12 port CSI-RSs considering the pattern as per CDM 2 in the second-first embodiment of the present disclosure may be made as shown in Table 12. To that end, the base station dynamically or semi-statically makes a CSI reference signal (CSI-RS) configuration in the UE, and to share the CSI-RS configuration with the UE, Table 12 below may previously define, in the standards, the CSI-RS resource configuration method (normal CP) as per CDM 2 in the second-first embodiment of the present disclosure.

TABLE 12

| CSI reference signal | # of CSI-RS signals configured 12 | |
|---|---|---|
| configuration | (k', l') | $n_s$ mod 2 |
| Frame structure type 1 and 2    0 | (9, 5) | 0, 1 |
| 1 | (11, 2) | 1 |
| 2 | (8, 2) | 1 |

Here, p is the port index of the port, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 2 below.

$$a_{k,l}^{(p)} = W_{l''} \cdot r_{l,n_s}(m') \quad \text{[Equation 2]}$$

Here, $$k = k' + 12m +$$

$$\begin{cases}
-0 & \text{for } p \in \{15, 16, 21, 22\}, \text{ } CSI \text{ reference signal configuration 0,} \\
& \text{normal cyclic prefix} \\
-6 & \text{for } p \in \{17, 18, 23, 24\}, \text{ } CSI \text{ reference signal configuration 0,} \\
& \text{normal cyclic prefix} \\
-7 & \text{for } p \in \{19, 20, 25, 26\}, \text{ } CSI \text{ reference signal configuration 0,} \\
& \text{normal cyclic prefix} \\
-0 & \text{for } p \in \{15, 16\}, \text{ } CSI \text{ reference signal configurations 1-2,} \\
& \text{normal cyclic prefix} \\
-6 & \text{for } p \in \{17, 18\}, \text{ } CSI \text{ reference signal configurations 1-2,} \\
& \text{normal cyclic prefix} \\
-1 & \text{for } p \in \{19, 20\}, \text{ } CSI \text{ reference signal configurations 1-2,} \\
& \text{normal cyclic prefix} \\
-7 & \text{for } p \in \{21, 22\}, \text{ } CSI \text{ reference signal configurations 1-2,} \\
& \text{normal cyclic prefix} \\
-2 & \text{for } p \in \{23, 24\}, \text{ } CSI \text{ reference signal configurations 1-2,} \\
& \text{normal cyclic prefix} \\
-8 & \text{for } p \in \{25, 26\}, \text{ } CSI \text{ reference signal configurations 1-2,} \\
& \text{normal cyclic prefix} \\
& \vdots
\end{cases}$$

$$l = l' + \begin{cases}
l'', n_s \bmod 2 = 0 & \begin{array}{l} \text{for } p \in \{15, 16, 17, 18, 19, 20\}, \\ CSI \text{ reference signal configuration 0,} \\ \text{normal cyclic prefix} \end{array} \\
l'', n_s \bmod 2 = 1 & \begin{array}{l} \text{for } p \in \{21, 22, 23, 24, 25, 26\}, \\ CSI \text{ reference signal configuration 0,} \\ \text{normal cyclic prefix} \end{array} \\
l'' & \begin{array}{l} \text{for } p \in CSI \text{ reference signal} \\ \text{configurations 1-2, normal cyclic prefix} \end{array} \\
& \vdots
\end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Using Equation 2 above, the UE may derive parameters, e.g., $W_{l''}$, $l''$, m', through the set k', l', $N_{RB}^{max,DL}$, $N_{RB}^{DL}$, cp type (normal cyclic prefix or extended cyclic prefix) and $n_s$ and the UE may derive symbol a of 12 port CSI-RSs transmitted in the lth time symbol and the receipt position kth frequency RE of the CSI-RS required for CSI-RS reception based on the same. At this time, $N_{RB}^{max,DL}$ is the largest downlink bandwidth as settable, $N_{RB}^{DL}$ is the actual downlink bandwidth set for the UE, and $n_s$ is the slot number in the radio frame.

Further, it has been assumed in the second-first embodiment of the present disclosure that the CDM has a size of CDM 2. However, the power boosting of CSI-RS port is difficult due to hardware limitations and influence from inter-modulation. Thus, in the case of applying CDM 4 which has a four-count size, a CDM scheme with a four-count size may be used. In case CDM 2 which has a two-count size is used, each is transmitted via the same two REs, grouped in pair, in the order of {0,1}, {2,3}, {4,5}, {6,7}, . . . , {30,31}, and in case CDM4 which has a four-count size is used, four ports are transmitted via the same four REs in the order of {0,1,2,3}, {4,5,6,7}, {8,9,10,11}, . . . , {28,29,30,31}. Further, considering the position of RE and order of port, it should be noted that port combinations for various types of CDM are possible, such as {0,1,6,7}, {2,3,8,9}, and {4,5,10,11}. The following Equation 3 is an example of CDM schemes having a two-count size and a four-count size when there are 12 CSI-RS ports.

The resource configurations for 12 port CSI-RSs considering the pattern as per CDM 4 in the second-first embodiment of the present disclosure may be made as shown in Table 13. Table 13 below represents the CSI-RS resource configuration method (normal CP) as per CDM 4 in the second-first embodiment of the present disclosure.

TABLE 13

| CSI reference signal | # of CSI-RS signals configured 12 | | |
|---|---|---|---|
| | configuration | (k', l') | $n_s$ mod 2 |
| Frame | 0 | (9, 5) | 0, 1 |
| structure | 1 | (11, 2) | 1 |
| type 1 and 2 | 2 | (8, 2) | 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 3 below.

$$a_{k,l}^{(p)} = W_{l''} \cdot r_{l,n_s}(m') \quad \text{[Equation 3]}$$

wherein, $$k = k' + 12m + k'',$$

$$k'' = \begin{cases}
-0, -6 & \begin{array}{l} \text{for } p \in \{15, 16, 17, 18, 23, 24, 25, 26\}, \\ CSI \text{ reference signal configuration 0,} \\ \text{normal cyclic prefix} \end{array} \\
-7 & \begin{array}{l} \text{for } p \in \{19, 20, 21, 22\}, \\ CSI \text{ reference signal configuration 0,} \\ \text{normal cyclic prefix} \end{array} \\
-0, -6 & \begin{array}{l} \text{for } p \in \{15, 16, 17, 18\}, \\ CSI \text{ reference signal configurations 1-2,} \\ \text{normal cyclic prefix} \end{array} \\
-1, -7 & \begin{array}{l} \text{for } p \in \{19, 20, 21, 22\}, \\ CSI \text{ reference signal configurations 1-2,} \\ \text{normal cyclic prefix} \end{array} \\
-2, -8 & \begin{array}{l} \text{for } p \in \{23, 24, 25, 26\}, \\ CSI \text{ reference signal configurations 1-2,} \\ \text{normal cyclic prefix} \end{array} \\
& \vdots
\end{cases}$$

-continued $$l = l' + \begin{cases} \vdots \\ l'', n_s \bmod 2 = 0, 1 \quad \begin{array}{l} \text{CSI reference signal configuration 0,} \\ \text{normal cyclic prefix} \end{array} \\ l'', \quad \begin{array}{l} \text{CSI reference signal configurations 1-2,} \\ \text{normal cyclic prefix} \end{array} \\ \vdots \end{cases}$$

$$w_r = \begin{cases} 1 & p \in \{15, 19, 23, 25\} \\ (-1)^r & p \in \{16, 20, 24, 26\} \\ 1 & p \in \{17, 23\}, \text{CSI reference signal} \\ & \text{configuration 0, } k'' = -0 \\ -1 & p \in \{17, 23\}, \text{CSI reference signal} \\ & \text{configuration 0, } k'' = -6 \\ -1 & p \in \{18, 24\}, \text{CSI reference signal} \\ & \text{configuration 0, } k'' = -0 \\ 1 & p \in \{18, 24\}, \text{CSI reference signal} \\ & \text{configuration 0, } k'' = -6 \\ 1 & p \in \{25\}, \text{CSI reference signal} \\ & \text{configuration 1-2, } n_s \bmod 2 = 0 \\ -1 & p \in \{25\}, \text{CSI reference signal} \\ & \text{configuration 1-2, } n_s \bmod 2 = 1 \\ -1 & p \in \{26\}, \text{CSI reference signal} \\ & \text{configuration 1-2, } n_s \bmod 2 = 0 \\ 1 & p \in \{26\}, \text{CSI reference signal} \\ & \text{configuration 1-2, } n_s \bmod 2 = 1 \\ 1 & p \in \{17, 21, 25\}, \text{CSI reference signal} \\ & \text{configuration 1-2, } k'' = -0, -1, -2 \\ -1 & p \in \{17, 21, 25\}, \text{CSI reference signal} \\ & \text{configuration 1-2, } k'' = -6, -7, -8 \\ -1 & p \in \{18, 22, 26\}, \text{CSI reference signal} \\ & \text{configuration 1-2, } k'' = -0, -1, -2 \\ 1 & p \in \{18, 22, 26\}, \text{CSI reference signal} \\ & \text{configuration 1-2, } k'' = -6, -7, -8 \end{cases}$$

$$l'' = 0, 1$$
$$m = 0, 1, \ldots, N_{RB}^{DL} - 1$$
$$m' = m + \left\lfloor \frac{N_{RB}^{min,DL} - N_{RB}^{DL}}{2} \right\rfloor$$

is the same like this.

The above definition is to exemplify CDM 4 using four codes (1,1,1,1), (1,−1,1,−1), (1,1,−1,−1), and (−1,−1,1,1) in the second-first embodiment of the present disclosure, as mentioned above, and it should be noted that although CDM 2 is used in the foregoing or other subsequent embodiments, the above representations may be possible using CDM 4.

Figure 22:
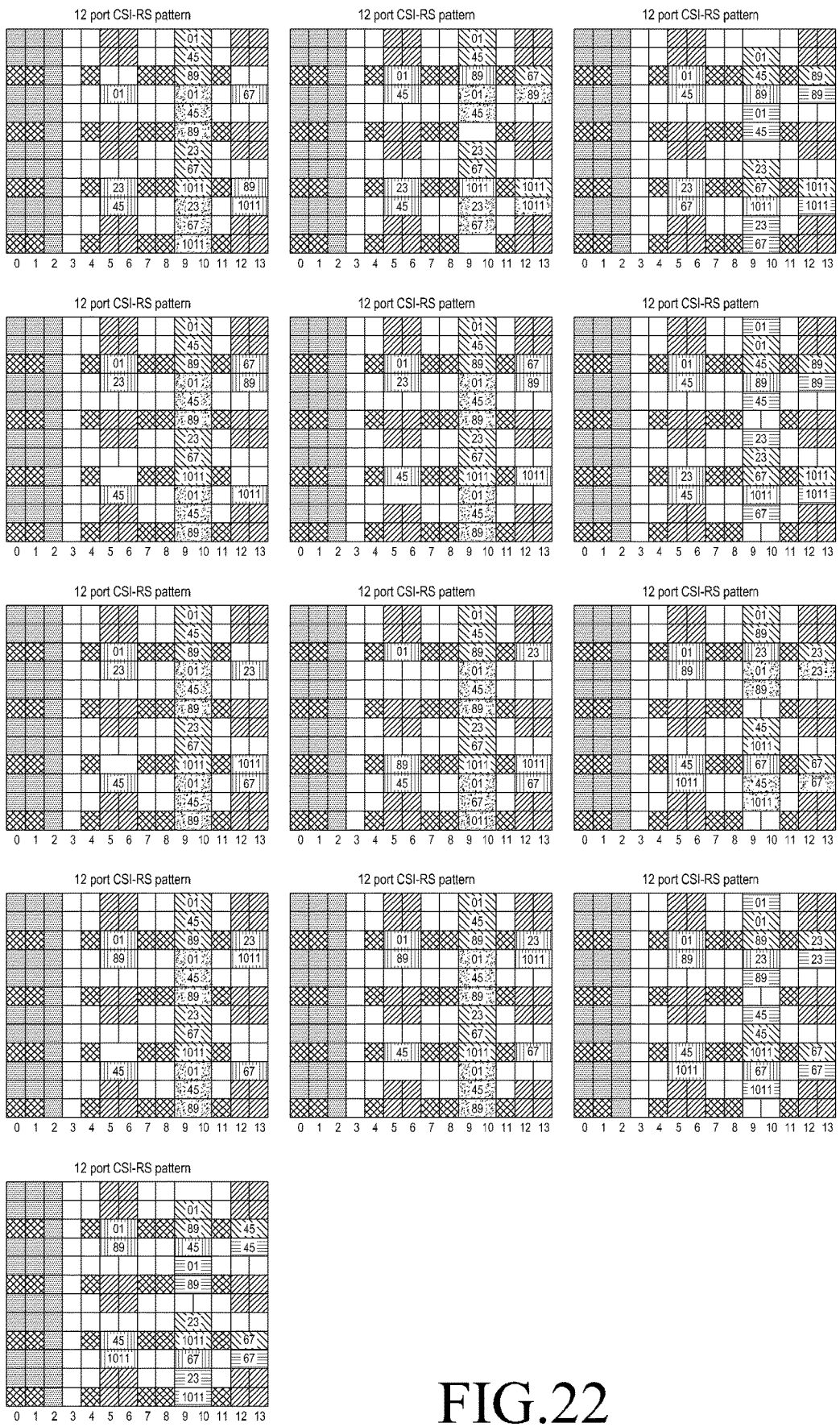
FIG. 22 is a view illustrating CSI-RS patterns for 12 ports configured based on the second-first embodiment of the present disclosure.

FIG. 22 illustrates CSI-RS patterns for 12 ports configured using the second-first embodiment of the present disclosure, and it may be used through similar definitions to the 12 port CSI-RS symbols and the resource configurations exemplified above in the second-first embodiment of the present disclosure. The current LTE Rel-10 8Tx codebook and Rel-12 4Tx codebook have been designed assuming that first four or two antennas are polarized at +45 degrees and subsequent four or two antennas are polarized at −45 degrees. If the codebooks to support the 12 CSI-RS ports are designed under the same principle, in case the 0-5 ports and 6-11 ports are transmitted through the same OFDM symbols, the beam selection experiences the same phase shift by the time difference and reflects only the phase shift difference by the frequency difference so that relatively smaller errors may be selected. In contrast, the phase shift due to the time difference concentrates on the co-phasing between antennas with different polarizations so that the errors for the corresponding portion may increase. Unlike this, in case transmission is performed through OFDM symbols on different times, phase shift occurs only in the OFDM symbols of some ports of the antennas having the same polarization, so that the same level of error may occur in the beam selection and co-phasing determined by the UE. However, such pattern benefits reflecting on average the errors according to times to beam selection and co-phasing within one RB.

<Second-Second Embodiment>

The second-second embodiment of the present disclosure is a method for supporting 16 CSI-RS ports.

Figure 23:
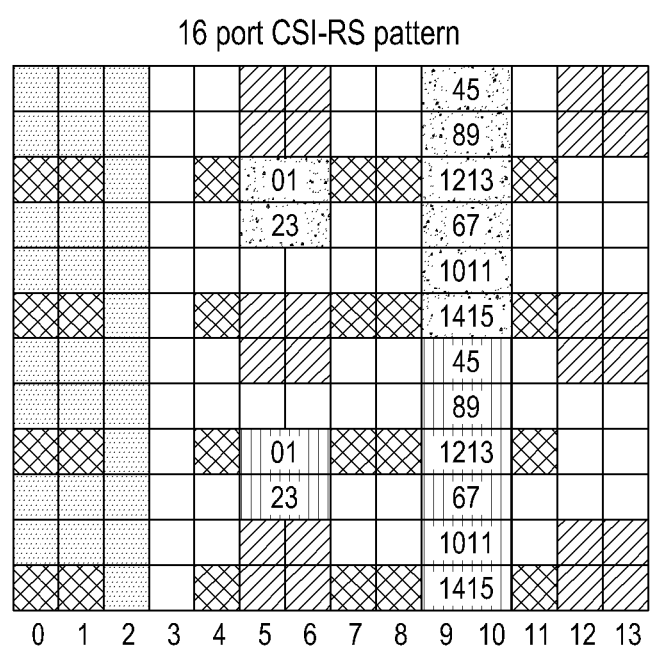
FIG. 23 is a view illustrating an example of supporting 16 CSI-RS ports using existing CSI-RS REs in a mobile communication system according to a second-second embodiment of the present disclosure.

FIG. 23 illustrates supporting 16 CSI-RS ports using existing CSI-RS REs in a mobile communication system according to a second-second embodiment of the present disclosure;

As described above, one PRB consists of 40 CSI-RS REs in total. Here, the second-second embodiment of the present disclosure is to define CSI-RS ports with only 32 REs, except for eight existing CSI-RS REs, to support 16 CSI-RS ports in the CSI-RS REs the number of which is now 40. As set forth above, in the case of using adding new REs and using the same as the CSI-RS port without using the currently defined CSI-RS REs only, the current REs should not be used for the PDSCH for the legacy UEs that do not use the current REs as the CSI-RS REs, and thus, data transmission to the corresponding REs cannot be done. That is, in case of adding new REs and using the same as CSI-RS ports, rather than using only CSI-RS REs currently defined, data puncturing may arise. Further, the legacy UEs do not have any means to receive the information on such data puncturing and thus decode the PDCSH by deeming the corresponding CSI-RS as data signal, and thus, the CSI-RS of the corresponding RE plays a role as interference with the legacy UEs. In order to prevent such data puncturing and interference, the CSI-RS port should be constituted of only the legacy CSI-RS REs. However, in such case, there are 40 CSI-RS REs as previously defined, and thus, eight REs should not be used, and the number of configurations that may be made is limited to one for one RB. The number of configurations that may be made being small means that the number of cases where various neighbor cells and UEs may do multiplexing on the time and frequency dimensions while avoiding their CSI-RS positions deceases.

In order to maximize the radio channel estimation performance through reference signals, the legacy 4, 8 port CSI-RSs have transmitted the CSI-RS ports using the same time resources under the same configurations. Accordingly, a power boosting effect, 3 dB for 4 port CSI-RS and 6 dB for 8 port CSI-RS, has been able to be achieved. However, although in the case of the CSI-RS pattern shown in FIG. 6 the 4-15 port reference signals may present a 6 dB power boosting effect using the same time resource, 0-3 port may achieve only 3 dB power boosting. Accordingly, despite having more antennas than the legacy 8 port CSI-RS, it cannot sufficiently achieve a power boosting effect, and the power boosting value that may be considered maximally within one CSI-RS 16 port configuration is varied. This should be taken into account.

Figure 24A:
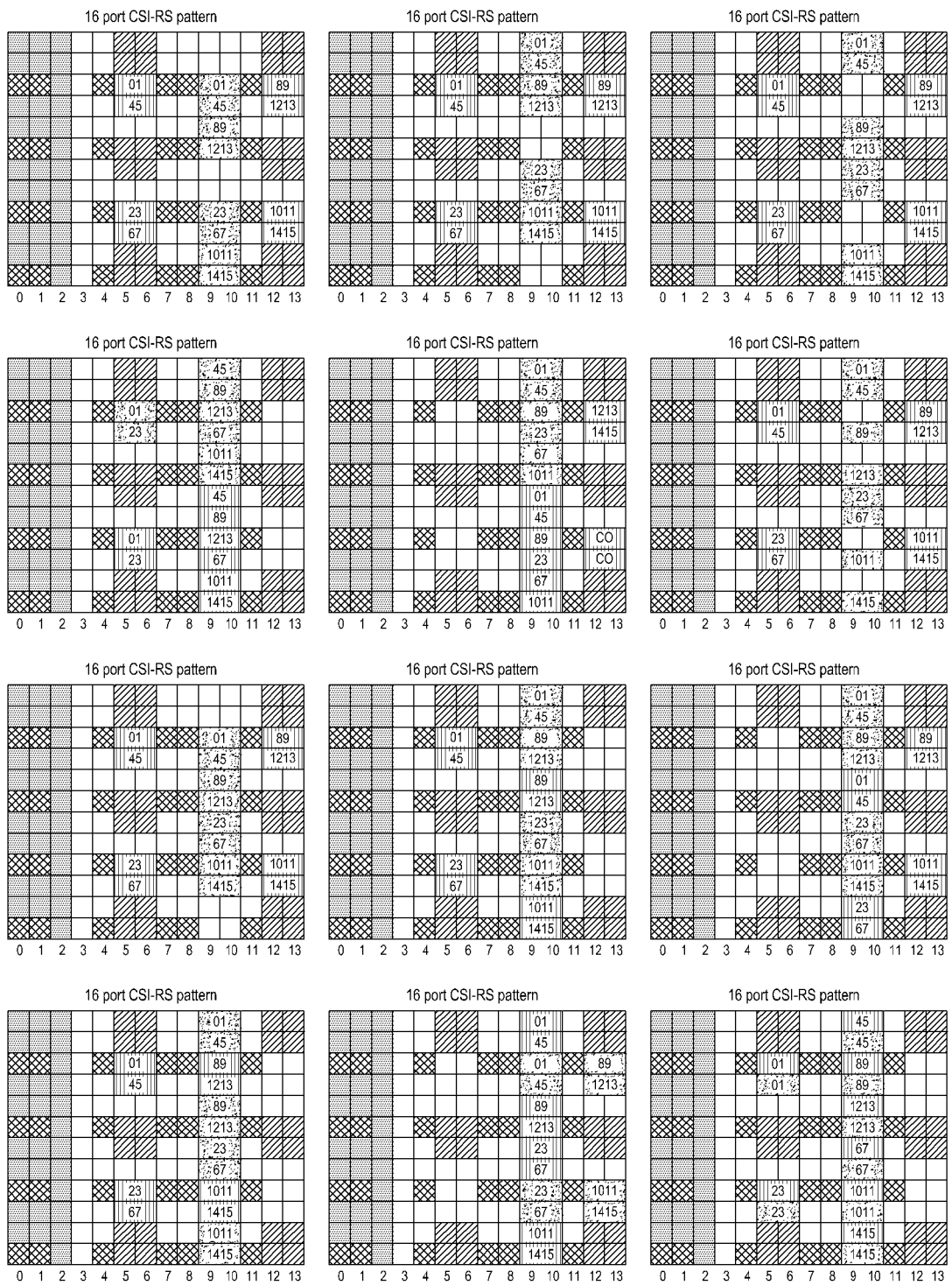
FIGS. 24a and 24b are views illustrating CSI-RS patterns for 16 ports based on the second-second embodiment of the present disclosure.
Figure 24B:
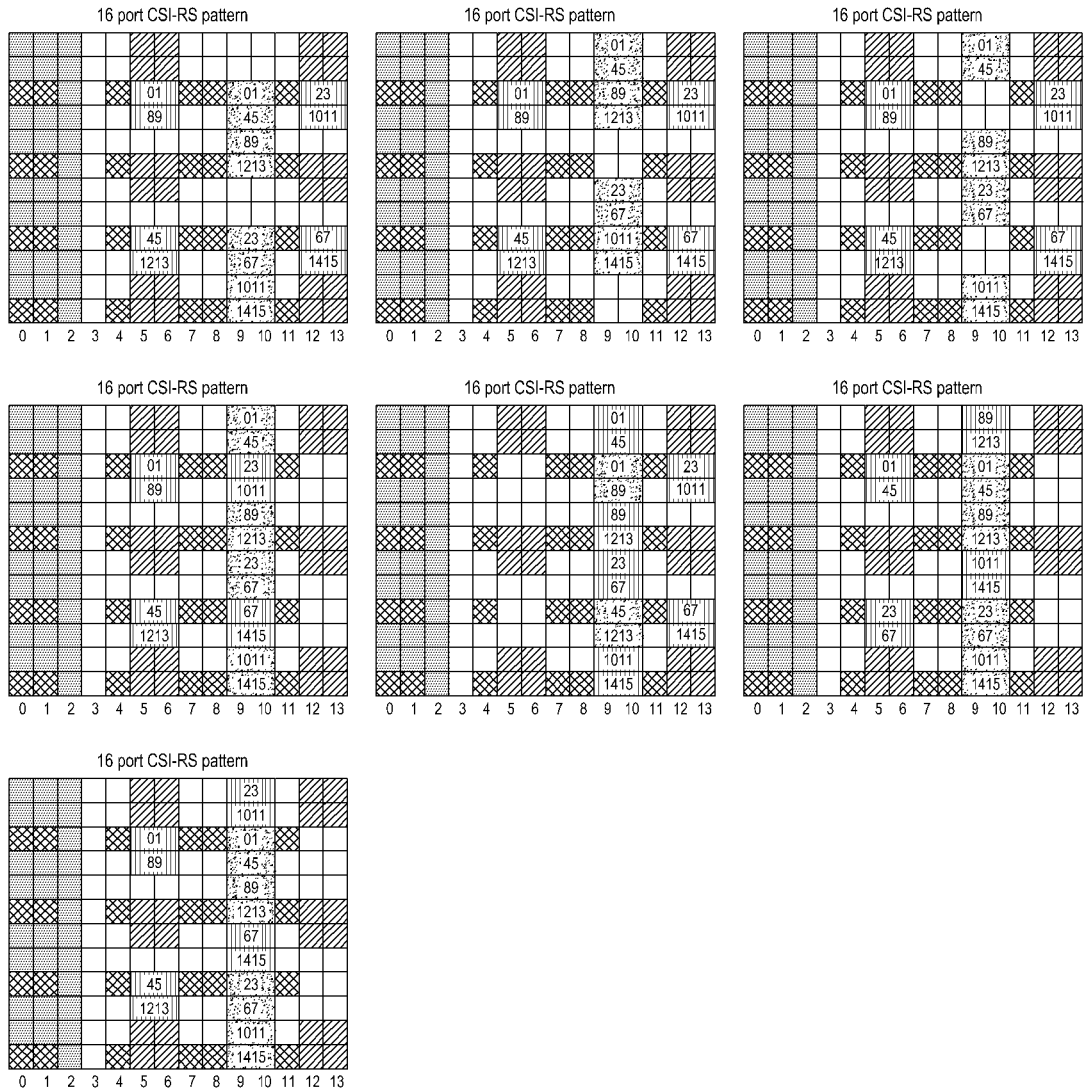

Like the legacy CSI-RSs, the pattern as per the second-second embodiment of the present disclosure has the same RS structure but different RE start points according to all the CSI-RS configs. in order to minimize the hardware complexity of the UE. However, it may be designed to have a different RS structure depending on each configuration considering the legacy ZP-CSI-RS structure or the same power boosting, and FIGS. 24a and 24b are referenced for the same. FIGS. 24a and 24b illustrate CSI-RS patterns for 16 ports based on the second-second embodiment of the present disclosure, and it may be used through similar definitions to the 16 port CSI-RS symbols and the resource configurations exemplified above in the second-second embodiment of the present disclosure.

The resource configurations for 16 port CSI-RSs considering the pattern as per the second-second embodiment of the present disclosure may be made as shown in Table 14. Table 14 below represents the CSI-RS resource configuration method (normal CP) as per second-second embodiment of the present disclosure.

TABLE 14

| CSI reference signal configuration | # of CSI-RS signals configured 16 | |
|---|---|---|
| | (k', l') | $n_s$ mod 2 |
| Frame structure type 1 and 2 | 0 (9, 5) | 0, 1 |
| | 1 (11, 2) | 1 |

Here, p is the port index, and the 0th antenna port is represented as 15. This means that as the antenna index increases, the port index also increases. In this case, for example, symbol a of the 16 port CSI-RSs transmitted through the lth time symbol and the kth frequency RE may be defined as shown in Equation 4 below.

$$a_{k,l}^{(p)} = w_{l''} \cdot r_{l,n_s}(m')$$ [Equation 4]

Here, $k = k' + 12m +$ $$\begin{cases}
-0 & \text{for } p \in \{15, 16, 23, 24\}, \textit{CSI} \text{ reference signal configuration 0, normal cyclic prefix} \\
-6 & \text{for } p \in \{17, 18, 25, 26\}, \textit{CSI} \text{ reference signal configuration 0, normal cyclic prefix} \\
-1 & \text{for } p \in \{19, 20, 27, 28\}, \textit{CSI} \text{ reference signal configuration 0, normal cyclic prefix} \\
-7 & \text{for } p \in \{21, 22, 29, 30\}, \textit{CSI} \text{ reference signal configuration 0, normal cyclic prefix} \\
-0 & \text{for } p \in \{15, 16\}, \textit{CSI} \text{ reference signal configuration 1, normal cyclic prefix} \\
-6 & \text{for } p \in \{17, 18\}, \textit{CSI} \text{ reference signal configuration 1, normal cyclic prefix} \\
-1 & \text{for } p \in \{19, 20\}, \textit{CSI} \text{ reference signal configuration 1, normal cyclic prefix} \\
-7 & \text{for } p \in \{21, 22\}, \textit{CSI} \text{ reference signal configuration 1, normal cyclic prefix} \\
-2 & \text{for } p \in \{23, 24\}, \textit{CSI} \text{ reference signal configuration 1, normal cyclic prefix} \\
-8 & \text{for } p \in \{25, 26\}, \textit{CSI} \text{ reference signal configuration 1, normal cyclic prefix} \\
-3 & \text{for } p \in \{27, 28\}, \textit{CSI} \text{ reference signal configuration 1, normal cyclic prefix} \\
-9 & \text{for } p \in \{29, 30\}, \textit{CSI} \text{ reference signal configuration 1, normal cyclic prefix} \\
\vdots
\end{cases}$$

$l = l' +$ $$\begin{cases}
l'', n_s \bmod 2 = 0 & \text{for } p \in \{15, 16, 17, 18, 19, 20, 21, 22\}, \textit{CSI} \text{ reference signal configuration 0, normal cyclic prefix} \\
l'' - 3, n_s \bmod 2 = 1 & \text{for } p \in \{23, 24, 25, 26, 27, 28, 29, 30\}, \textit{CSI} \text{ reference signal configuration 0, normal cyclic prefix} \\
l'' & \text{for } p \in \textit{CSI} \text{ reference signal configuration 1, normal cyclic prefix} \\
\vdots
\end{cases}$$

$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$ $l'' = 0, 1$ $m = 0, 1, \ldots, N_{RB}^{DL} - 1$ $m' = m + \left\lfloor \dfrac{N_{RB}^{max,DL} - N_{RB}^{DL}}{2} \right\rfloor$ <Second-Third Embodiment>

The second-third embodiment of the present disclosure is a method for supporting 32 CSI-RS ports.

Figure 25:
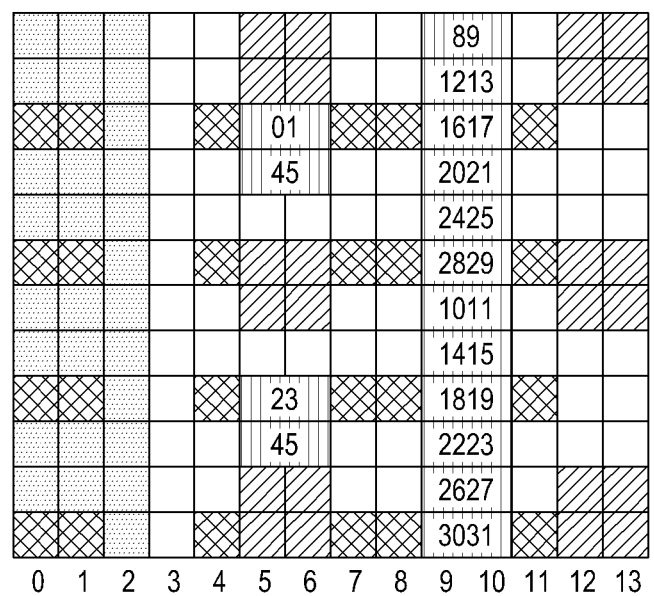
FIG. 25 is a view illustrating an example of supporting 32 CSI-RS ports using existing CSI-RS REs in a mobile communication system according to a second-third embodiment of the present disclosure.

FIG. 25 illustrates supporting 32 CSI-RS ports using existing CSI-RS REs in a mobile communication system according to a second-third embodiment of the present disclosure.

As described above, one PRB consists of 40 CSI-RS REs in total. Here, the second-third embodiment of the present disclosure is to define a CSI-RS 32 port of one configuration in the PRB using only 32 REs and by excluding eight legacy CSI-RS REs to support 32 CSI-RS ports in the currently 40 CSI-RS REs. As set forth above, in the case of using adding new REs and using the same as the CSI-RS port without using the currently defined CSI-RS REs only, the current REs should not be used for the PDSCH for the legacy UEs that do not use the current REs as the CSI-RS REs, and thus, data transmission to the corresponding REs cannot be done. That is, in case of adding new REs and using the same as CSI-RS ports, rather than using only CSI-RS REs currently defined, data puncturing may arise. Further, the legacy UEs do not have any means to receive the information on such data puncturing and thus decode the PDCSH by deeming the corresponding CSI-RS as data signal, and thus, the CSI-RS of the corresponding RE plays a role as interference with the legacy UEs. In order to prevent such data puncturing and interference, the CSI-RS port should be constituted of only the legacy CSI-RS REs. However, in such case, there are 40 CSI-RS REs as previously defined, and thus, eight REs should not be used, and the number of configurations that may be made is limited to one for one RB. The number of configurations that may be made being small means that the number of cases where various neighbor cells and UEs may do multiplexing on the time and frequency dimensions while avoiding their CSI-RS positions deceases.

In order to maximize the radio channel estimation performance through reference signals, the legacy 4, 8 port CSI-RSs have transmitted the CSI-RS ports using the same time resources under the same configurations. Accordingly, a power boosting effect, 3 dB for 4 port CSI-RS and 6 dB for 8 port CSI-RS, has been able to be achieved. In case the 32 CSI-RS ports all are arranged in the same time resource, up to 12 dB power boosting may be achieved, but the current LTE RB structure deploys only 12 REs in the frequency resource, and such is impossible. For the CSI-RS pattern as per the second-third embodiment as shown in FIG. 25, the 0-7 port reference signals may achieve 6 dB power boosting in the same form as the eight ports, and for 8-31 ports, 10.8 dB power boosting is possible. In case the power amp of the base station supports 10.8 dB power boosting and only some ports in all the CSI-RS ports are determined to be advantageous for higher accuracy via higher power boosting, as many CSI-RS ports as possible may be arranged in the same time resource as shown in FIG. 25, so that the CSI-RS pattern may be designed to allow the maximum power to be used for some ports. As such, the resource configurations for 32 port CSI-RSs considering the pattern as per the second-third embodiment of the present disclosure may be made as shown in Table 15. Table 15 below represents the CSI-RS resource configuration method (normal CP) as per second-third embodiment of the present disclosure.

TABLE 15

| CSI reference signal configuration | # of CSI-RS signals configured 32 | |
|---|---|---|
| | (k', l') | $n_s$ mod 2 |
| Frame structure type 1 and 2 | 0 | (9, 5) | 0, 1 |

Here, p is the port index, and the 0th antenna port is represented as 15. This means that as the antenna index increases, the port index also increases. In this case, for example, symbol a of the 32 port CSI-RSs transmitted through the lth time symbol and the kth frequency RE may be defined as shown in Equation 5 below.

$$a_{k,l}^{(p)} = w_{l''} \cdot r_{l,n_s}(m') \quad \text{[Equation 5]}$$

Here, $$k = k' + 12m +$$

$$\begin{cases}
-0 & \text{for } p \in \{15, 16, 23, 24\}, CSI \text{ reference signal configuration 0, normal cyclic prefix} \\
-6 & \text{for } p \in \{17, 18, 25, 26\}, CSI \text{ reference signal configuration 0, normal cyclic prefix} \\
-1 & \text{for } p \in \{19, 20, 27, 28\}, CSI \text{ reference signal configuration 0, normal cyclic prefix} \\
-7 & \text{for } p \in \{21, 22, 29, 30\}, CSI \text{ reference signal configuration 0, normal cyclic prefix} \\
-0 & \text{for } p \in \{15, 16\}, CSI \text{ reference signal configuration 1, normal cyclic prefix} \\
-6 & \text{for } p \in \{17, 18\}, CSI \text{ reference signal configuration 1, normal cyclic prefix} \\
-1 & \text{for } p \in \{19, 20\}, CSI \text{ reference signal configuration 1, normal cyclic prefix} \\
-7 & \text{for } p \in \{21, 22\}, CSI \text{ reference signal configuration 1, normal cyclic prefix} \\
-2 & \text{for } p \in \{23, 24\}, CSI \text{ reference signal configuration 1, normal cyclic prefix} \\
-8 & \text{for } p \in \{25, 26\}, CSI \text{ reference signal configuration 1, normal cyclic prefix} \\
-3 & \text{for } p \in \{27, 28\}, CSI \text{ reference signal configuration 1, normal cyclic prefix} \\
-9 & \text{for } p \in \{29, 30\}, CSI \text{ reference signal configuration 1, normal cyclic prefix} \\
\vdots
\end{cases}$$

-continued $$l = l' +
\begin{cases}
\vdots \\
l'', n_s \bmod 2 = 0 & \text{for } p \in \{15, 16, 17, 18, 19, 20, 21, 22\}, \\
& \text{CSI reference signal configuration 0,} \\
& \text{normal cyclic prefix} \\
l'' - 3, & \text{for } p \in \{23, 24, 25, 26, 27, 28, 29, 30\}, \\
n_s \bmod 2 = 1 & \text{CSI reference signal configuration 0,} \\
& \text{normal cyclic prefix} \\
l'' & \text{for } p \in CSI \text{ reference signal} \\
& \text{configuration 1, normal cyclic prefix} \\
\vdots
\end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 26:
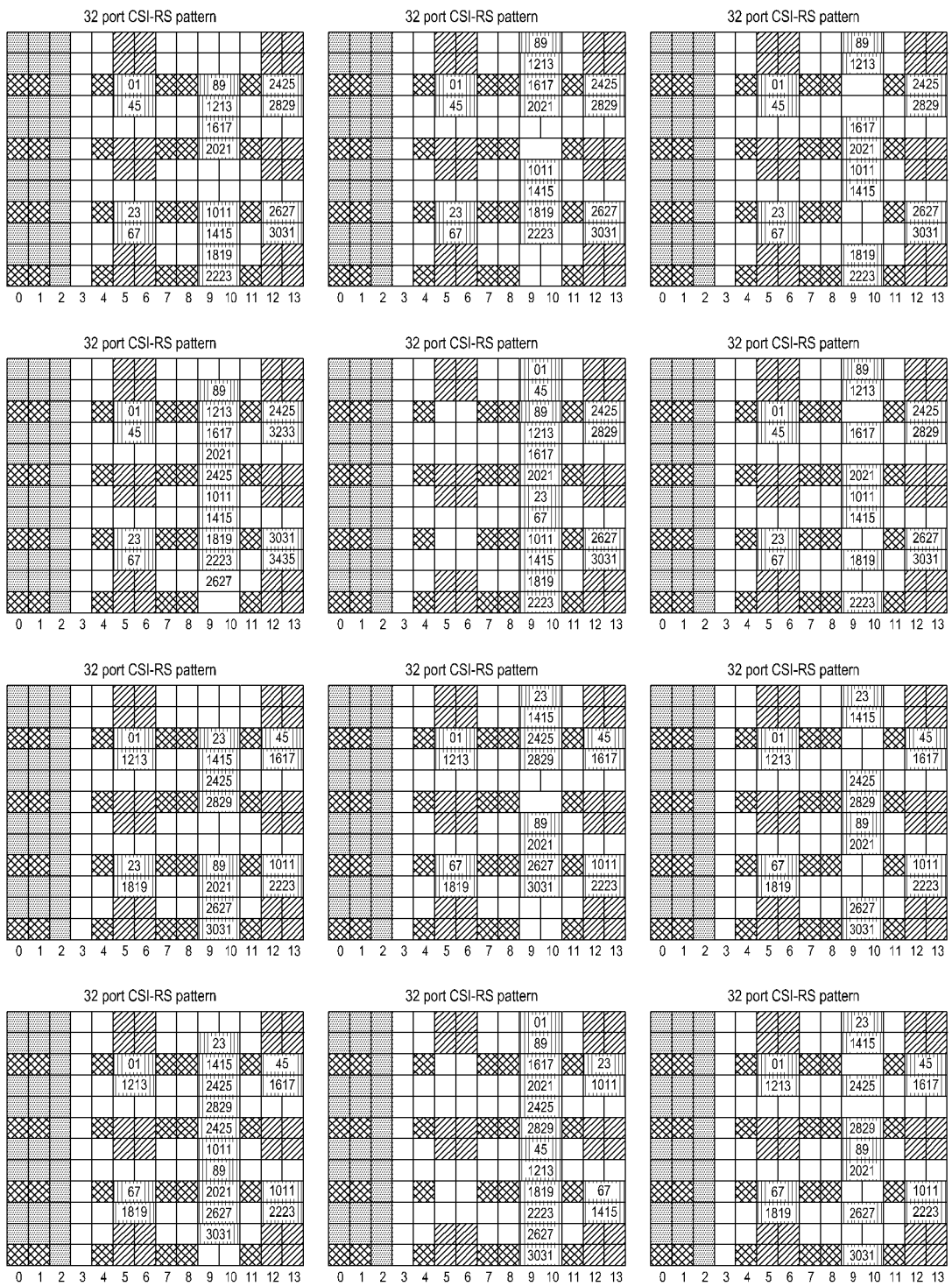
FIG. 26 is a view illustrating CSI-RS patterns for 32 ports configured based on the second-third embodiment of the present disclosure.

FIG. 26 illustrates CSI-RS patterns for 32 ports configured based on the second-third embodiment of the present disclosure, and it may be used through similar definitions to the 32 port CSI-RS symbols and the resource configurations exemplified above in the second-third embodiment of the present disclosure.

<Second-Fourth Embodiment>

The second-fourth embodiment of the present disclosure is a method for supporting 12 CSI-RS ports.

Figure 27:
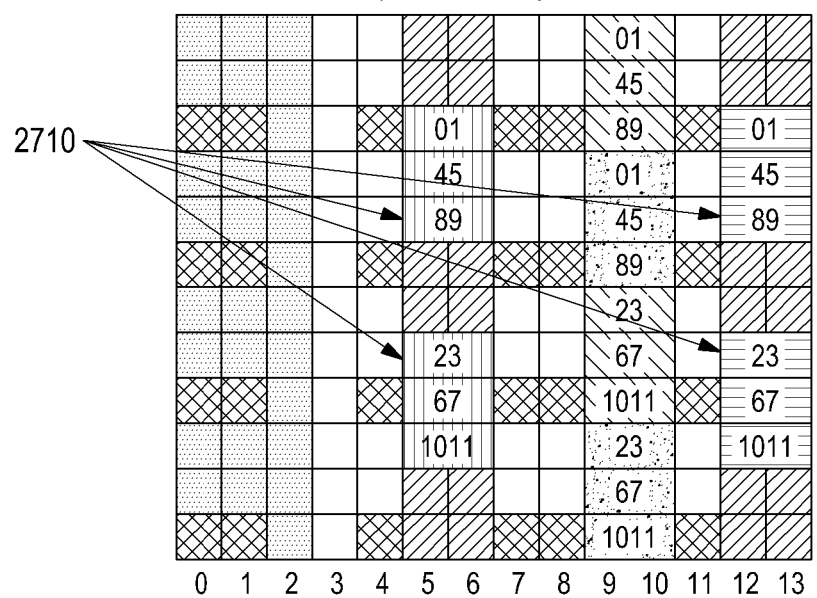
FIG. 27 is a view illustrating an example of supporting 12 CSI-RS ports using REs used as a PDSCH as well as existing CSI-RS REs in a mobile communication system according to a second-fourth embodiment of the present disclosure.

FIG. 27 illustrates an example of supporting 12 CSI-RS ports using REs used as a PDSCH as well as existing CSI-RS REs in a mobile communication system according to a second-fourth embodiment of the present disclosure;

As described above, one PRB consists of 40 CSI-RS REs in total. Accordingly, in case the eight PDSCH REs are additionally in use to make the total number of CSI-RS REs a multiple of 12, the total number of CSI-RS REs becomes 48, so that four 12 port CSI-RSs may be used in one RB. The second-fourth embodiment of the present disclosure is creating four 12 port CSI-RSs using eight additional PDSCH REs of OFDM symbols 12 and 13 and OFDM symbols 5 and 6 among all the RBs as indicated in 2710 of FIG. 27. In contrast with using the PDSCH REs in other places, where additional PDSCH REs in the corresponding places are used in the second-fourth embodiment of the present disclosure, the reference signals in all the CSI-RS configurations may be rendered to have a similar structure although they are not perfectly the same. In the second-fourth embodiment of the present disclosure, 12 CSI-RS ports all are present in the same time resources, thereby achieving up to 7.8 dB (six times) power boosting and thus enhancing channel estimation performance through the reference signals. Further, as per the second-fourth embodiment of the present disclosure, since the number of configurations that may be made maximally in one PRB is 4, several cells and UEs may perform more multiplexing while avoiding mutual CSI-RS positions and thus mutual interference in the time and frequency dimensions than when using the legacy CSI-RS REs. However, use of such scheme needs to puncture the PDSCHs of the corresponding REs for the legacy UEs as described above. Further, the legacy UEs do not have any means to receive the information on such puncturing and thus perform decoding by deeming the corresponding CSI-RS as PDSCH, and thus, the CSI-RS of the corresponding RE plays a role as interference with the legacy UEs. The resource configurations for 12 port CSI-RSs considering the pattern as per the second-fourth embodiment of the present disclosure may be made as shown in Table 16. Table 16 below represents the CSI-RS resource configuration method (normal CP) as per second-fourth embodiment of the present disclosure.

TABLE 16

| | CSI reference signal configuration | # of CSI-RS signals configured 12 | |
|---|---|---|---|
| | | (k', l') | $n_s \bmod 2$ |
| Frame structure type 1 and 2 | 0 | (9, 5) | 0 |
| | 1 | (11, 2) | 1 |
| | 2 | (8, 2) | 1 |
| | 3 | (9, 5) | 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 6 below.

$$a_{k,l}^{(p)} = w_{l''} \cdot r_{l,n_s}(m') \qquad [\text{Equation 6}]$$

Here, $$k = k' + 12m +$$

$$l = l' + \begin{cases} \vdots \\ -0 & \text{for } p \in \{15, 16\}, \text{ CSI reference signal configuration 0-1, normal cyclic prefix} \\ -5 & \text{for } p \in \{17, 18\}, \text{ CSI reference signal configuration 0-1, normal cyclic prefix} \\ -1 & \text{for } p \in \{19, 20\}, \text{ CSI reference signal configuration 0-1, normal cyclic prefix} \\ -6 & \text{for } p \in \{21, 22\}, \text{ CSI reference signal configuration 0-1, normal cyclic prefix} \\ -2 & \text{for } p \in \{23, 24\}, \text{ CSI reference signal configuration 0-1, normal cyclic prefix} \\ -7 & \text{for } p \in \{25, 26\}, \text{ CSI reference signal configuration 0-1, normal cyclic prefix} \\ -0 & \text{for } p \in \{15, 16\}, \text{ CSI reference signal configuration 1-2, normal cyclic prefix} \\ -6 & \text{for } p \in \{17, 18\}, \text{ CSI reference signal configuration 1-2, normal cyclic prefix} \\ -1 & \text{for } p \in \{19, 20\}, \text{ CSI reference signal configuration 1-2, normal cyclic prefix} \\ -7 & \text{for } p \in \{21, 20\}, \text{ CSI reference signal configuration 1-2, normal cyclic prefix} \\ -2 & \text{for } p \in \{22, 23\}, \text{ CSI reference signal configuration 1-2, normal cyclic prefix} \\ -8 & \text{for } p \in \{24, 25\}, \text{ CSI reference signal configuration 1-2, normal cyclic prefix} \\ \vdots \end{cases}$$

$$l = l' + \begin{cases} \vdots \\ 1'' & \text{CSI reference signal configuration 0-2, normal cyclic prefix} \\ \vdots \end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 28:
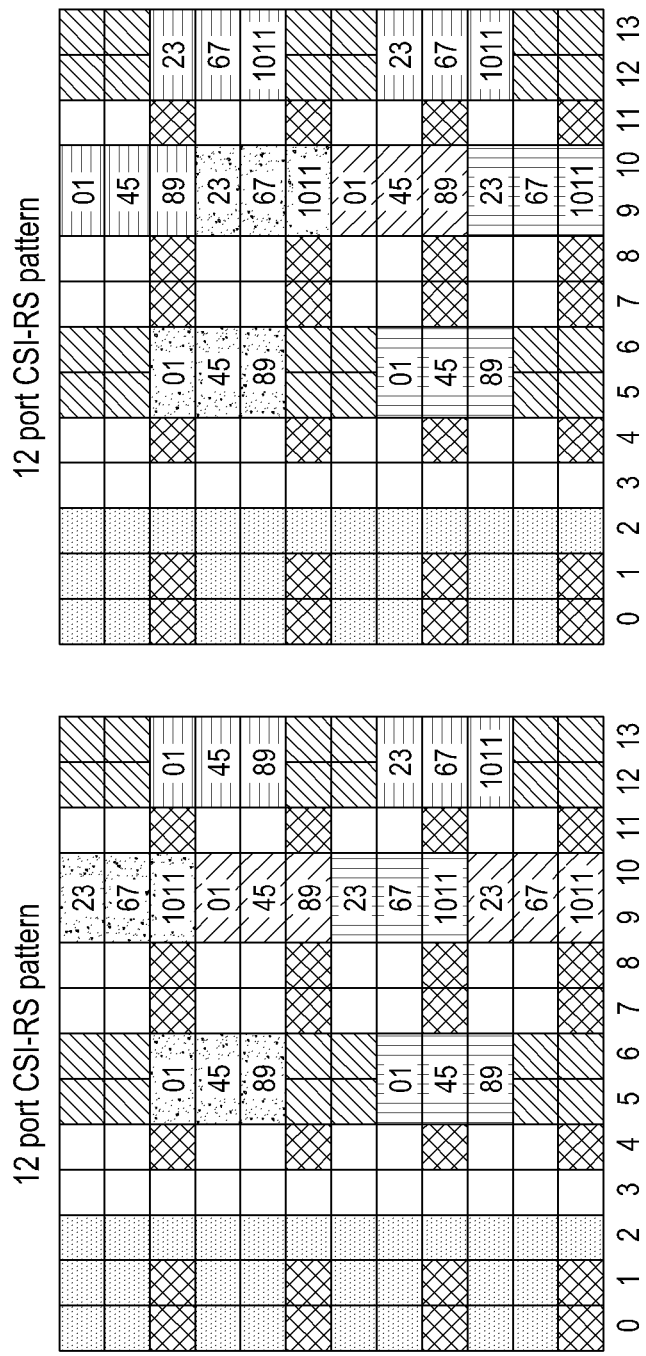
FIG. 28 is a view illustrating CSI-RS patterns for 12 ports configured based on the second-fourth embodiment of the present disclosure.

FIG. 28 illustrates CSI-RS patterns for 12 ports configured based on the second-fourth embodiment of the present disclosure, and it may be used through similar definitions to the 12 port CSI-RS symbols and the resource configurations exemplified above in the second-fourth embodiment of the present disclosure.

In the embodiments shown in FIG. 28, unlike the case where in FIG. 27 the CSI-RS pattern is transmitted in the OFDM symbols having the same configuration, it is sent in different OFDM symbols, and in such case, sufficient power boosting cannot be attained, so that the channel estimation performance may be lowered as compared with the CSI-RS pattern shown in FIG. 27. Further, in case the measurement OFDM symbols vary, a phase shift may arise due to the time difference and residual frequency offset between two symbols that may influence the PMI estimation performance.

<Second-Fifth Embodiment>

The second-fifth embodiment of the present disclosure is a method for supporting 12 CSI-RS ports.

Figure 29:
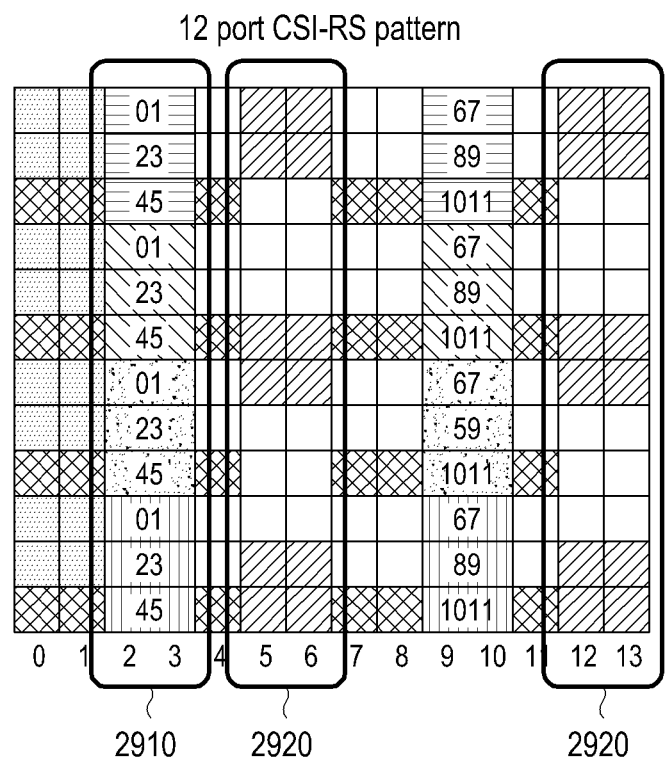
FIG. 29 is a view illustrating an example of supporting 12 CSI-RS ports using REs used as a PDSCH as well as existing CSI-RS REs in a mobile communication system according to a second-fifth embodiment of the present disclosure.

FIG. 29 illustrates an example of supporting 12 CSI-RS ports using REs used as a PDSCH as well as existing CSI-RS REs to support 12 CSI-RS ports in a mobile communication system according to the second-fifth embodiment of the present disclosure.

As described above, one PRB consists of 40 CSI-RS REs in total. Accordingly, in case the 48 REs are additionally used as CSI-RS REs to make the total number of CSI-RS REs a multiple of 12, four 12 port CSI-RSs may be used in one RB. The second-fifth embodiment of the present disclosure is to create four 12 port CSI-RSs by additionally using 24 PDSCH REs of OFDM symbols 2 and 3 among all the RBs as indicated in 2910 of FIG. 29 while excluding 16 REs used in OFDM symbols 5, 6, 12, and 1 as indicated in 2920 of FIG. 29. Use of the second-fifth embodiment of the present disclosure allows the reference signals of all the CSI-RS configurations to use the same structure. Further, 12 CSI-RS ports all are present in the same time resources, thereby achieving up to 7.8 dB (six times) power boosting and thus enhancing channel estimation performance through the reference signals. Further, in case the second-fifth embodiment of the present disclosure is used, since the number of configurations that may be made maximally in one PRB is 4, several cells and UEs may perform more multiplexing while avoiding mutual CSI-RS positions and thus mutual interference in the time and frequency dimensions than when using the legacy CSI-RS REs. However, it is required to puncture the PDSCHs of the corresponding REs for the legacy UEs as described above. Further, the legacy UEs do not have any means to receive the information on such puncturing and thus perform decoding by deeming the corresponding CSI-RS as PDSCH, and thus, the CSI-RS of the corresponding RE plays a role as interference with the legacy UEs.

Unlike in the second-fourth embodiment of the present disclosure, in the case of CSI-RS pattern as per the second-fifth embodiment, OFDM symbol 2 available as a PDCCH symbol is in use. The PDCCH contains control-related information very critical for the UE, and it is impossible to address by simply puncturing this information. Accordingly, in the corresponding case, the total number of PDCCH symbols for the existing and new UEs should be limited to 2, and it should be known through the PCFICH that the number of PDCCH symbols is two. However, in case the CSI-RS has been set in the corresponding subframe although the number of PCFICH symbols is three, it may be address through the following methods.

First method: disregarding the corresponding CSI-RS configuration and following the PCFICH Second method: determining that the corresponding PCFICH is set wrong and measuring the channel through the CSI-RS.

The first method is a method that disregards all the CSI-RSs configured in the corresponding subframe in case the number of PDCCH OFDM symbols indicated by the PCFICH is 3. In this case, if the CSI-RS pattern of FIG. 29 is used, there exist overlaps with the PDCCH symbols in all the CSI-RS configurations, resulting in the 12 port CSI-RSs being not able to be used in the corresponding subframe. Thus, the pattern as shown in FIG. 30 may be used to consider the CSI-RS pattern based on the first method in the second-fifth embodiment of the present disclosure.

Figure 30:
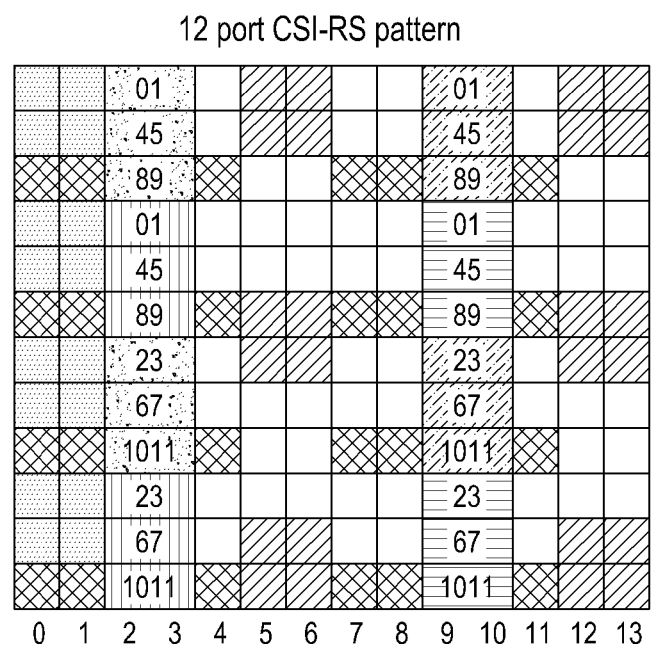
FIG. 30 is a view illustrating a CSI-RS pattern designed based on the first method according to a second-fifth embodiment of the present disclosure.

FIG. 30 illustrates a CSI-RS pattern designed based on the first method according to a second-fifth embodiment of the present disclosure.

In the pattern shown in FIG. 30, there are two configurations positioned in symbol 2 that may be used as PDCCHs, and the other remaining configurations may be available as CSI-RSs. In the case of the pattern shown in FIG. 30, since all the CSI-RS ports are transmitted in the same OFDM symbol, up to 7.8 dB (six times) power boosting value may be used and thus more power boosting may be achieved if supported in hardware as compared with the pattern of FIG. 29.

The second method is a method in which in case the 12 port CSI-RS configured in the corresponding subframe is present in the PDCCH OFDM symbol region, the PCFICH is determined to have been transmitted wrong and the PCFICH is assumed to be 2. There is no such case where the channel is not measured in the CSI-RS port configured in the second method, but the actual PDCCH uses three OFDM symbols, and unless the CSI-RS port is transmitted, the operation might not be properly performed.

The resource configurations for 12 port CSI-RSs considering the pattern shown in FIG. 29 in the second-fifth embodiment of the present disclosure may be made as shown in Table 17. Table 17 below represents an example of the CSI-RS resource configuration method (normal CP) as per second-fifth embodiment of the present disclosure.

TABLE 17

| CSI reference signal configuration | | # of CSI-RS signals configured 12 | |
| --- | --- | --- | --- |
| | | (k', l') | $n_s$ mod 2 |
| Frame structure type 1 and 2 | 0 | (11, 2) | 0, 1 |
| | 1 | (8, 2) | 0, 1 |
| | 2 | (5, 2) | 0, 1 |
| | 3 | (2, 2) | 0, 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 7 below.

$$a_{k,l}^{(p)} = w_{l''} \cdot r_{l,n_s}(m') \qquad \text{[Equation 7]}$$

Here, $$k = k' + 12m + \begin{cases} \vdots \\ -0 & \text{for } p \in \{15, 16, 21, 22\}, \text{normal cyclic prefix} \\ -1 & \text{for } p \in \{17, 18, 23, 24\}, \text{normal cyclic prefix} \\ -2 & \text{for } p \in \{19, 20, 25, 26\}, \text{normal cyclic prefix} \\ \vdots \end{cases}$$

$$l = l' + \begin{cases} \vdots \\ \text{for } p \in \{15, 16, 17, 18, 19, 20\}, \\ 1'', n_s \bmod 2 = 0 \quad CSI \text{ reference signal configuration 0-3,} \\ \text{normal cyclic prefix} \\ \text{for } p \in \{21, 22, 23, 24, 25, 26\}, \\ 1'', n_s \bmod 2 = 1 \quad CSI \text{ reference signal configuration 0-3,} \\ \text{normal cyclic prefix} \\ \vdots \end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the pattern of FIG. 29, 0-5 ports and 6-11 ports are separately transmitted in the respective OFDM symbols. The current LTE Rel-10 8Tx codebook and Rel-12 4Tx codebook have been designed assuming that first four or two antennas are polarized at +45 degrees and subsequent four or two antennas are polarized at −45 degrees. If the codebooks to support the 12 port CSI-RSs are designed under the same principle, in case the 0-5 ports and 6-11 ports are transmitted through the same OFDM symbols, the beam selection experiences the same phase shift by the time difference and reflects only the phase shift difference by the frequency difference so that relatively smaller errors may be selected while the phase shift due to the time difference concentrates on the co-phasing between antennas with different polarizations so that the errors for the corresponding portion may increase. Unlike this, in case transmission is performed through OFDM symbols on different times, phase shift occurs only in the OFDM symbols of some ports of the antennas having the same polarization, so that the same level of error may occur in the beam selection and co-phasing determined by the UE. However, such pattern benefits reflecting on average the errors according to times to beam selection and co-phasing within one RB.

Figures 31, 32:
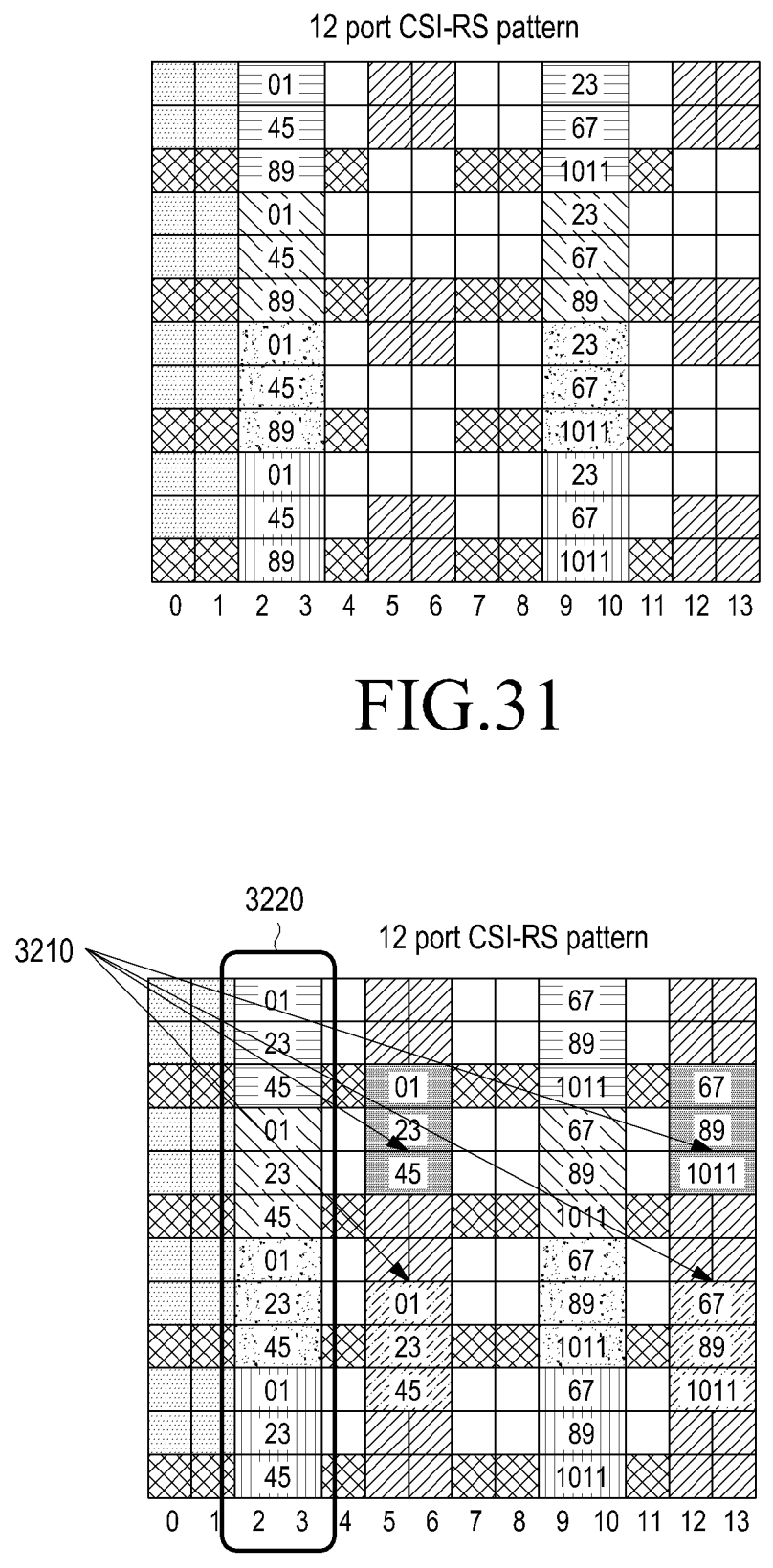

The pattern of FIG. 31 is a variation in port position to the pattern of FIG. 29 to reflect such effect. The resource configurations for 12 port CSI-RSs based on the pattern shown in FIG. 31 in the second-fifth embodiment of the present disclosure may be made as shown in Table 18. Table 18 below represents another example of the CSI-RS resource configuration method (normal CP) as per second-fifth embodiment of the present disclosure.

$$a_{k,l}^{(p)} = w_{l''} \cdot r_{l,n_s}(m')$$ [Equation 8]

Here, $$k = k' + 12m + \begin{cases} \vdots \\ -0 & \text{for } p \in \{15, 16, 17, 18\}, \text{ normal cyclic prefix} \\ -1 & \text{for } p \in \{19, 20, 21, 22\}, \text{ normal cyclic prefix} \\ -2 & \text{for } p \in \{23, 24, 25, 26\}, \text{ normal cyclic prefix} \\ \vdots \end{cases}$$

$$l = l' + \begin{cases} \vdots \\ \begin{array}{l} \text{for } p \in \{15, 16, 19, 20, 23, 24\}, \\ l'', n_s \bmod 2 = 0 \quad CSI \text{ reference signal configuration 0-3,} \\ \text{normal cyclic prefix} \\ \text{for } p \in \{17, 18, 21, 22, 25, 26\}, \\ l'', n_s \bmod 2 = 1 \quad CSI \text{ reference signal configuration 0-3,} \\ \text{normal cyclic prefix} \\ \vdots \end{array} \end{cases}$$

$$w_{l'} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 18

| CSI reference signal configuration | # of CSI-RS signals configured 12 | |
|---|---|---|
| | (k', l') | $n_s \bmod 2$ |
| Frame structure type 1 and 2    0 | (11, 2) | 0, 1 |
| 1 | (8, 2) | 0, 1 |
| 2 | (5, 2) | 0, 1 |
| 3 | (2, 2) | 0, 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 8 below.

<Second-Sixth Embodiment>

The second-sixth embodiment of the present disclosure is a method for supporting 12 CSI-RS ports.

FIG. 32 illustrates an example of supporting 12 CSI-RS ports using REs used as a PDSCH as well as existing CSI-RS REs to support 12 CSI-RS ports in a mobile communication system according to the second-sixth embodiment of the present disclosure.

As described above, one PRB consists of 40 CSI-RS REs in total. Accordingly, in case the 72 REs are additionally used as CSI-RS REs to make the total number of CSI-RS REs a multiple of 12, six 12 port CSI-RSs may be used in one RB. The second-sixth embodiment of the present disclosure is to create six 12 port CSI-RSs by adding 24 PDSCH REs of OFDM symbols 2 and 3 among all the RBs as indicated in 3220 of FIG. 32 while adding eight REs to the 16 REs used in OFDM symbols 5, 6, 12, and 13 as indicated in 3210 of FIG. 32. Use of the second-sixth embodiment of the present disclosure allows the reference signals of all the CSI-RS configurations to use the same structure. Further, six CSI-RS ports all are present in the same time resources, thereby achieving up to 4.8 dB (three times) power boosting and thus enhancing channel estimation performance through the reference signals. Further, in case the second-sixth embodiment of the present disclosure is used, since the number of configurations that may be made maximally in one PRB is 6, several cells and UEs may perform more multiplexing while avoiding mutual CSI-RS positions and thus mutual interference in the time and frequency dimensions than when using the legacy CSI-RS REs. However, it is required to puncture the PDSCHs of the corresponding REs for the legacy UEs as described above. Further, the legacy UEs do not have any means to receive the information on such puncturing and thus perform decoding by deeming the corresponding CSI-RS as PDSCH, and thus, the CSI-RS of the corresponding RE plays a role as interference with the legacy UEs.

Like in the second-fifth embodiment of the present disclosure, the CSI-RS pattern as per the second-sixth embodiment of the present disclosure also uses OFDM symbol 2 available as a PDCCH symbol. The PDCCH contains control-related information very critical for the UE, and it is impossible to address by simply puncturing this information. Accordingly, in the corresponding case, the total number of PDCCH symbols for the existing and new UEs should be limited to 2, and it should be known through the PCFICH that the number of PDCCH symbols is two. However, in case the CSI-RS has been set in the corresponding subframe although the number of PCFICH symbols is three, it may be address through the following methods.

First method: disregarding the corresponding CSI-RS configuration and following the PCFICH Second method: determining that the corresponding PCFICH is set wrong and measuring the channel through the CSI-RS.

The first method is a method that disregards all the CSI-RSs configured in the corresponding subframe in case the number of PDCCH OFDM symbols indicated by the PCFICH is 3. In this case, if the CSI-RS pattern of FIG. 32 is used, there exist overlaps with the PDCCH symbols in all the CSI-RS configurations, resulting in the 12 port CSI-RS being not able to be used in the corresponding subframe. Thus, the pattern as shown in FIG. 33 may be used to consider the CSI-RS pattern based on the first method in the second-sixth embodiment of the present disclosure.

Figures 33, 34:
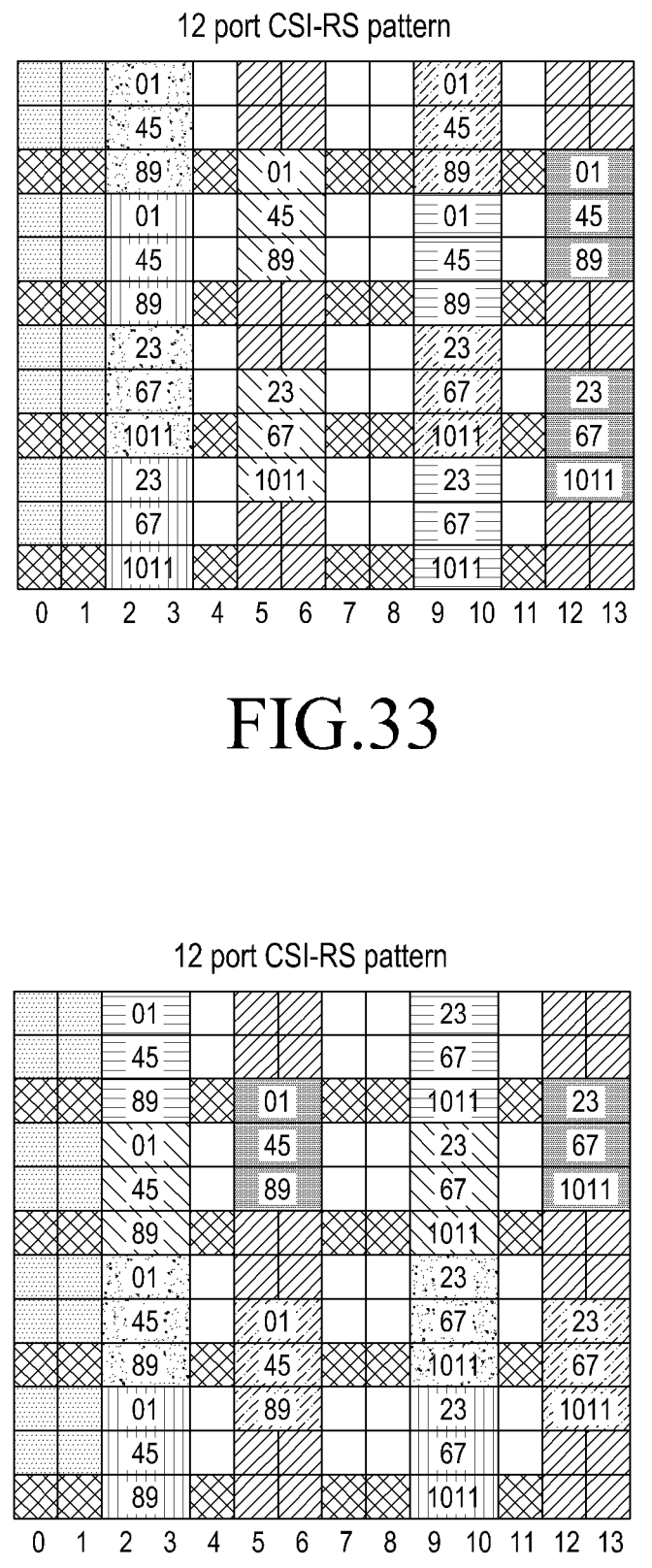

FIG. 33 illustrates a CSI-RS pattern designed based on the first method according to a second-sixth embodiment of the present disclosure.

In the pattern shown in FIG. 33, there are two configurations positioned in symbol 2 that may be used as PDCCHs, and the other remaining configurations may be available as CSI-RSs. In the case of the pattern shown in FIG. 33, since all the CSI-RS ports are transmitted in the same OFDM symbol, up to 7.8 dB (six times) power boosting value may be used and thus more power boosting may be achieved if supported in hardware as compared with the pattern of FIG. 32.

The second method is a method in which in case the 12 port CSI-RS configured in the corresponding subframe is present in the PDCCH OFDM symbol region, the PCFICH is determined to have been transmitted wrong and the PCFICH is assumed to be 2. There is no such case where the channel is not measured in the CSI-RS port configured in the second method, but the actual PDCCH uses three OFDM symbols, and unless the CSI-RS port is transmitted, the operation might not be properly performed.

The resource configurations for 12 port CSI-RSs considering the pattern shown in FIG. 32 in the second-sixth embodiment of the present disclosure may be made as shown in Table 19. Table 19 below represents an example of the CSI-RS resource configuration method (normal CP) as per second-sixth embodiment of the present disclosure.

TABLE 19

| CSI reference signal configuration | # of CSI-RS signals configured 12 | |
|---|---|---|
| | (k', l') | $n_s$ mod 2 |
| Frame structure type 1 and 2   0 | (11, 2) | 0, 1 |
| 1 | (8, 2) | 0, 1 |
| 2 | (5, 2) | 0, 1 |
| 3 | (2, 2) | 0, 1 |
| 4 | (9, 5) | 0, 1 |
| 5 | (4, 5) | 0, 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 9 below.

$$a_{k,l}^{(p)} = w_{l''} \cdot r_{l,n_s}(m') \quad \text{[Equation 9]}$$

Here, $$k = k' + 12m + \begin{cases} \vdots \\ -0 & \text{for } p \in \{15, 16, 21, 22\}, \text{ normal cyclic prefix} \\ -1 & \text{for } p \in \{17, 18, 23, 24\}, \text{ normal cyclic prefix} \\ -2 & \text{for } p \in \{19, 20, 25, 26\}, \text{ normal cyclic prefix} \\ \vdots \end{cases}$$

-continued $$l = l' + \begin{cases} \vdots \\ \text{for } p \in \{15, 16, 17, 18, 19, 20\}, \\ 1'', n_s \bmod 2 = 0 \quad CSI \text{ reference signal configuration 0-5,} \\ \text{normal cyclic prefix} \\ \text{for } p \in \{21, 22, 23, 24, 25, 26\}, \\ 1'', n_s \bmod 2 = 1 \quad CSI \text{ reference signal configuration 0-5,} \\ \text{normal cyclic prefix} \\ \vdots \end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the pattern of FIG. 32, 0-5 ports and 6-11 ports are separately transmitted in the respective OFDM symbols. The current LTE Rel-10 8Tx codebook and Rel-12 4Tx codebook have been designed assuming that first four or two antennas are polarized at +45 degrees and subsequent four or two antennas are polarized at −45 degrees. If the codebooks for the 12 port CSI-RSs are designed under the same principle give for the legacy codebook, in case the 0-5 ports and 6-11 ports are transmitted through the same OFDM symbols, the beam selection experiences the same phase shift by the time difference and reflects only the phase shift difference by the frequency difference so that relatively smaller errors may be selected while the phase shift due to the time difference concentrates on the co-phasing between antennas with different polarizations so that the errors for the corresponding portion may increase. Unlike this, in case transmission is performed through OFDM symbols on different times, phase shift occurs only in the OFDM symbols of some ports of the antennas having the same polarization, so that the same level of error may occur in the beam selection and co-phasing determined by the UE. However, such pattern benefits reflecting on average the errors according to times to beam selection and co-phasing within one RB.

The pattern of FIG. 34 is a variation in port position to the pattern of FIG. 33 to reflect such effect. The resource configurations for 12 port CSI-RSs based on the pattern shown in FIG. 34 in the second-sixth embodiment of the present disclosure may be made as shown in Table 20. Table 20 below represents another example of the CSI-RS resource configuration method (normal CP) as per second-sixth embodiment of the present disclosure.

TABLE 20

| CSI reference signal | # of CSI-RS signals configured 12 | |
|---|---|---|
| configuration | (k', l') | $n_s$ mod 2 |
| Frame structure type 1 and 2    0 | (11, 2) | 0, 1 |
| 1 | (8, 2) | 0, 1 |
| 2 | (5, 2) | 0, 1 |
| 3 | (2, 2) | 0, 1 |
| 4 | (9, 5) | 0, 1 |
| 5 | (4, 5) | 0, 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 10 below.

$$a_{k,l}^{(p)} = w_{l''} \cdot r_{l,n_s}(m') \quad \text{[Equation 10]}$$

Here, $$k = k' + 12m + \begin{cases} \vdots \\ -0 & \text{for } p \in \{15, 16, 17, 18\}, \text{ normal cyclic prefix} \\ -1 & \text{for } p \in \{19, 20, 21, 22\}, \text{ normal cyclic prefix} \\ -2 & \text{for } p \in \{23, 24, 25, 26\}, \text{ normal cyclic prefix} \\ \vdots \end{cases}$$

$$l = l' + \begin{cases} \vdots \\ \text{for } p \in \{15, 16, 19, 20, 23, 24\}, \\ 1'', n_s \bmod 2 = 0 \quad \text{CSI reference signal configuration 0-2,} \\ \qquad \qquad \text{normal cyclic prefix} \\ \text{for } p \in \{17, 18, 21, 22, 25, 26\}, \\ 1'', n_s \bmod 2 = 1 \quad \text{CSI reference signal configuration 0-2,} \\ \qquad \qquad \text{normal cyclic prefix} \\ \vdots \end{cases}$$

$$w_{l'} = \begin{cases} 1 & p \in \{15, 17, 19, 21, 23, 25\} \\ (-1)^{l''} & p \in \{16, 18, 20, 22, 24, 26\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

<Second-Seventh Embodiment>

The second-seventh embodiment of the present disclosure is a method for supporting 16 CSI-RS ports.

Figure 35:
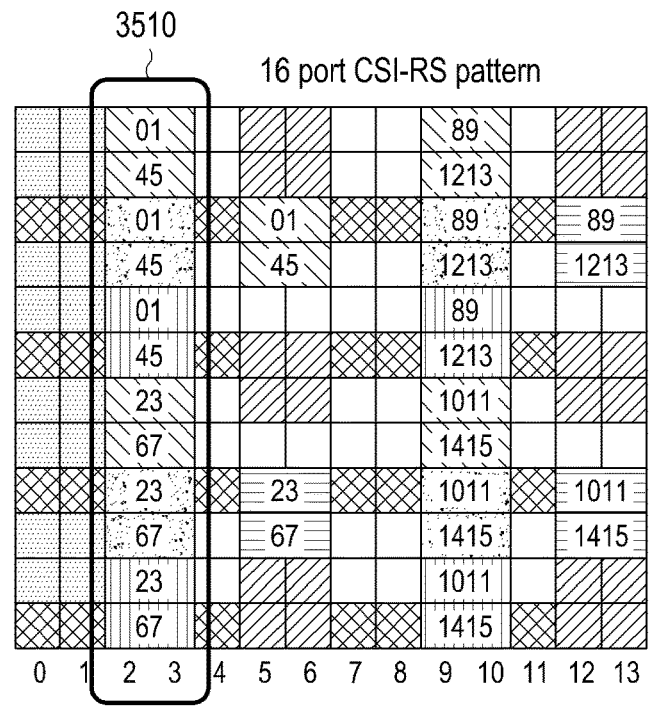
FIG. 35 is a view illustrating an example of supporting 16 CSI-RS ports using REs used as a PDSCH as well as existing CSI-RS REs in a mobile communication system according to a second-seventh embodiment of the present disclosure.

FIG. 35 illustrates an example of supporting 16 CSI-RS ports using REs used as a PDSCH as well as existing CSI-RS REs to support 16 CSI-RS ports in a mobile communication system according to the second-seventh embodiment of the present disclosure.

As described above, one PRB consists of 40 CSI-RS REs in total. Accordingly, in case the 24 REs are additionally used as CSI-RS REs to make the total number of CSI-RS REs a multiple of 16, four 12 port CSI-RSs may be used in one RB. The second-seventh embodiment of the present disclosure is to create four 16 port CSI-RSs additionally using 24 PDSCH REs of OFDM symbols 2 and 3 among all the RBs as indicated in 3510 of FIG. 35. Use of the second-seventh embodiment of the present disclosure allows the reference signals of all the CSI-RS configurations to use the same structure. Further, 8 CSI-RS ports are present in the same time resources, thereby achieving up to 6 dB power boosting and thus enhancing channel estimation performance through the reference signals. Further, in case the second-seventh embodiment of the present disclosure is used, since the number of configurations that may be made maximally in one PRB is 4, several cells and UEs may perform more multiplexing while avoiding mutual CSI-RS positions and thus mutual interference in the time and frequency dimensions than when using the legacy CSI-RS REs. However, it is required to puncture the PDSCHs of the corresponding REs for the legacy UEs as described above. Further, the legacy UEs do not have any means to receive the information on such puncturing and thus perform decoding by deeming the corresponding CSI-RS as PDSCH, and thus, the CSI-RS of the corresponding RE plays a role as interference with the legacy UEs.

Like in the second-fifth and second-sixth embodiments of the present disclosure, the CSI-RS pattern shown in FIG. 35 also uses OFDM symbol 2 available as a PDCCH symbol. The PDCCH contains control-related information very critical for the UE, and it is impossible to address by simply puncturing this information. Accordingly, in the corresponding case, the total number of PDCCH symbols for the existing and new UEs should be limited to 2, and it should be known through the PCFICH that the number of PDCCH symbols is two. However, in case the CSI-RS has been set in the corresponding subframe although the number of PCFICH symbols is three, it may be address through the following methods.

First method: disregarding the corresponding CSI-RS configuration and following the PCFICH Second method: determining that the corresponding PCFICH is set wrong and measuring the channel through the CSI-RS.

The first method is a method that disregards all the CSI-RSs configured in the corresponding subframe in case the number of PDCCH OFDM symbols indicated by the PCFICH is 3. In this case, if the CSI-RS pattern of FIG. 35 is used, there exist overlaps with the PDCCH symbols in all the CSI-RS configurations, resulting in the 16 port CSI-RS being not able to be used in the corresponding subframe. Thus, the pattern as shown in FIG. 36 may be used to consider the CSI-RS pattern based on the first method in the second-seventh embodiment of the present disclosure.

Figure 36:
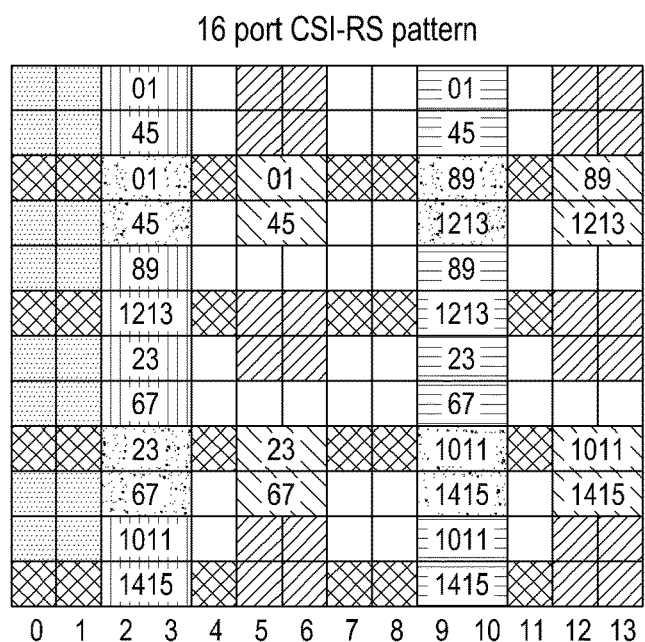
FIG. 36 is a view illustrating a CSI-RS pattern designed based on the first method according to the second-seventh embodiment of the present disclosure.

FIG. 36 illustrates a CSI-RS pattern designed based on the first method according to a second-seventh embodiment of the present disclosure.

In the pattern shown in FIG. 36, there are two configurations positioned in symbol 2 that may be used as PDCCHs, and the other remaining configurations may be available as CSI-RSs. In the case of the pattern shown in FIG. 36, since all the CSI-RS ports are transmitted in the same OFDM symbol, if supportable in hardware, up to 9 dB (six times) power boosting value may be used and thus more power boosting may be achieved if supported in hardware as compared with the pattern of FIG. 35.

The second method is a method in which in case the 12 port CSI-RS configured in the corresponding subframe is present in the PDCCH OFDM symbol region, the PCFICH is determined to have been transmitted wrong and the PCFICH is assumed to be 2. There is no such case where the channel is not measured in the CSI-RS port configured in the second method, but the actual PDCCH uses three OFDM symbols, and unless the CSI-RS port is transmitted, the operation might not be properly performed.

The resource configurations for 16 port CSI-RSs considering the pattern shown in FIG. 35 in the second-seventh embodiment of the present disclosure may be made as shown in Table 21. Table 21 below represents an example of the CSI-RS resource configuration method (normal CP) as per second-seventh embodiment of the present disclosure.

TABLE 21

| CSI reference signal configuration | | # of CSI-RS signals configured 16 | |
| --- | --- | --- | --- |
| | | (k', l') | $n_s$ mod 2 |
| Frame structure type 1 and 2 | 0 | (11, 2) | 0, 1 |
| | 1 | (9, 2) | 0, 1 |
| | 2 | (7, 2) | 0, 1 |
| | 3 | (9, 5) | 0, 1 |

Here, p is the port index, and the 0th antenna port is represented as 15. This means that as the antenna index increases, the port index also increases. In this case, for example, symbol a of the 16 port CSI-RSs transmitted through the lth time symbol and the kth frequency RE may be defined as shown in Equation 11 below.

$$a_{k,l}^{(p)} = w_{l''} \cdot r_{l,n_s}(m')$$ [Equation 11]

Here, $$k = k' + 12m + \begin{cases} \vdots \\ -0 \text{ for } p \in \{15, 16, 23, 24\}, \text{ normal cyclic prefix} \\ -6 \text{ for } p \in \{17, 18, 25, 26\}, \text{ normal cyclic prefix} \\ -1 \text{ for } p \in \{19, 20, 27, 28\}, \text{ normal cyclic prefix} \\ -7 \text{ for } p \in \{21, 22, 29, 30\}, \text{ normal cyclic prefix} \\ \vdots \end{cases}$$

$$l = l' + \begin{cases} \vdots \\ l'', n_s \bmod 2 = 0 \quad \text{for } p \in \{15, 16, 17, 18, 19, 20, 21, 22\}, \\ \quad CSI \text{ reference signal configuration 0-5, normal cyclic prefix} \\ l'', n_s \bmod 2 = 1 \quad \text{for } p \in \{23, 24, 25, 26, 27, 28, 29, 30\}, \\ \quad CSI \text{ reference signal configuration 0-5, normal cyclic prefix} \\ \vdots \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the pattern of FIG. 35, 0-7 ports and 8-15 ports are separately transmitted in the respective OFDM symbols. The current LTE Rel-10 8Tx codebook and Rel-12 4Tx codebook have been designed assuming that first four or two antennas are polarized at +45 degrees and subsequent four or two antennas are polarized at −45 degrees. If the codebooks to support the 16 CSI-RS ports are designed under the same principle, in case the 0-7 ports and 8-15 ports are transmitted through the same OFDM symbols, the beam selection experiences the same phase shift by the time difference and reflects only the phase shift difference by the frequency difference so that relatively smaller errors may be selected while the phase shift due to the time difference concentrates on the co-phasing between antennas with different polarizations so that the errors for the corresponding portion may increase. Unlike this, in case transmission is performed through OFDM symbols on different times, phase shift occurs only in the OFDM symbols of some ports of the antennas having the same polarization, so that the same level of error may occur in the beam selection and co-phasing determined by the UE. However, such pattern benefits reflecting on average the errors according to times to beam selection and co-phasing within one RB.

Figures 37, 38:
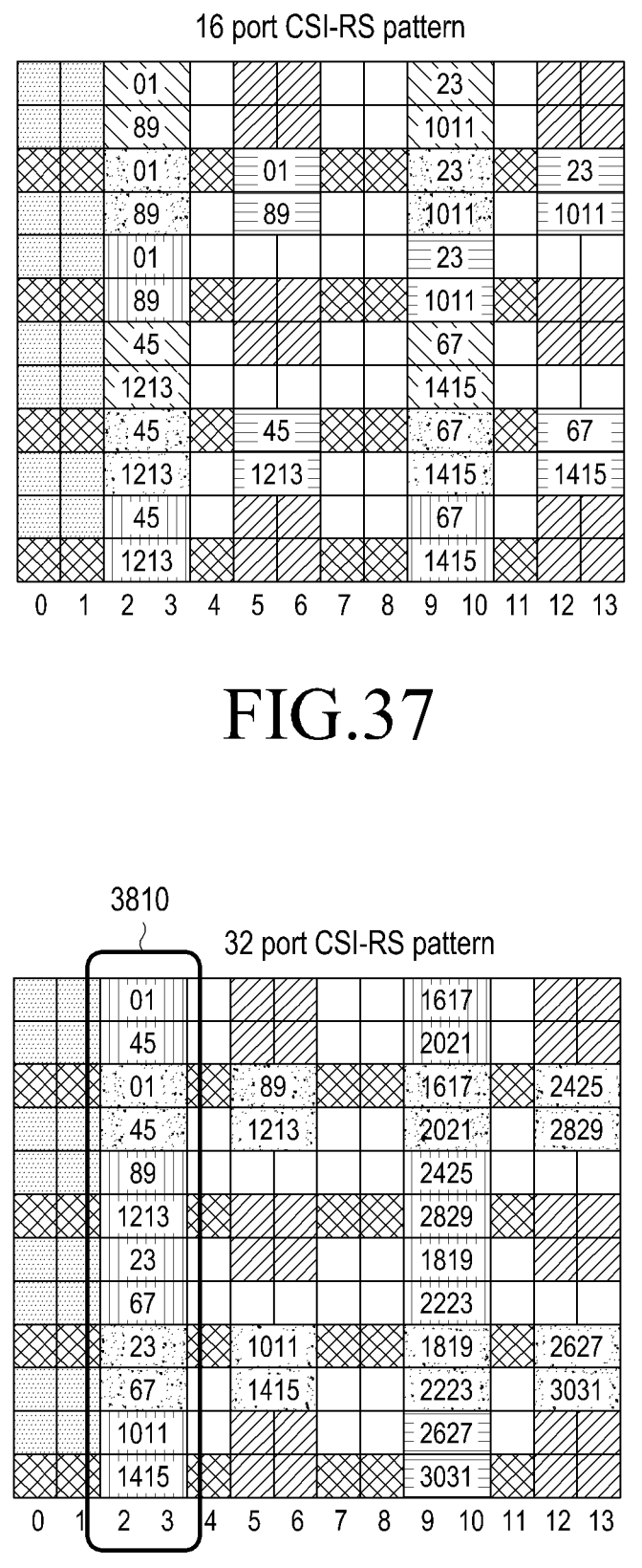

The pattern of FIG. 37 is a variation in port position to the pattern of FIG. 35 to reflect such effect. The resource configurations for 16 port CSI-RSs based on the pattern shown in FIG. 37 in the second-seventh embodiment of the present disclosure may be made as shown in Table 22. Table 22 below represents another example of the CSI-RS resource configuration method (normal CP) as per second-seventh embodiment of the present disclosure.

TABLE 22

| CSI reference signal configuration | | # of CSI-RS signals configured 16 | |
| --- | --- | --- | --- |
| | | (k', l') | $n_s$ mod 2 |
| Frame structure type 1 and 2 | 0 | (11, 2) | 0, 1 |
| | 1 | (9, 2) | 0, 1 |
| | 2 | (7, 2) | 0, 1 |
| | 3 | (9, 5) | 0, 1 |

Here, p is the port index, and the 0th antenna port is represented as 15. This means that as the antenna index increases, the port index also increases. In this case, for example, symbol a of the 16 port CSI-RSs transmitted through the lth time symbol and the kth frequency RE may be defined as shown in Equation 12 below.

$$a_{k,l}^{(p)} = w_{l''} \cdot r_{l,n_s}(m')$$ [Equation 12]

Here, $$k = k' + 12m + \begin{cases} \vdots \\ -0 & \text{for } p \in \{15, 16, 17, 18\}, \text{ normal cyclic prefix} \\ -6 & \text{for } p \in \{19, 20, 21, 22\}, \text{ normal cyclic prefix} \\ -1 & \text{for } p \in \{23, 24, 25, 26\}, \text{ normal cyclic prefix} \\ -7 & \text{for } p \in \{27, 28, 29, 30\}, \text{ normal cyclic prefix} \\ \vdots \end{cases}$$

$$l = l' + \begin{cases} \vdots \\ l'', n_s \bmod 2 = 0 & \text{for } p \in \{15, 16, 19, 20, 23, 24, 27, 28\}, \\ & \text{CSI reference signal configuration 0-2, normal cyclic prefix} \\ l'', n_s \bmod 2 = 1 & \text{for } p \in \{17, 18, 21, 22, 25, 26, 29, 30\}, \\ & \text{CSI reference signal configuration 0-2, normal cyclic prefix} \\ \vdots \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

<Second-Eighth Embodiment>

The second-eighth embodiment of the present disclosure is a method for supporting 32 CSI-RS ports.

FIG. 38 illustrates an example of supporting 32 CSI-RS ports using REs used as a PDSCH as well as existing CSI-RS REs to support 32 CSI-RS ports in a mobile communication system according to the second-eighth embodiment of the present disclosure.

As described above, one PRB consists of 40 CSI-RS REs in total. Accordingly, in case the 64 REs are additionally used as CSI-RS REs to make the total number of CSI-RS REs a multiple of 32, two 32 port CSI-RSs may be used in one RB. The second-eighth embodiment of the present disclosure is to create two 32 port CSI-RSs additionally using 24 PDSCH REs of OFDM symbols 2 and 3 among all the RBs as indicated in 3810 of FIG. 38. In the case of using the second-eighth embodiment of the present disclosure, it is impossible for the reference signals of all the CSI-RS configurations to use the same structure considering the existing CSI-RS REs and DM-RS RS structure for the 32 CSI-RSs. In the case of using the second-eighth embodiment of the present disclosure, 16 CSI-RS ports all are present in the same time resources, thereby achieving up to 12 dB (eight times) power boosting and thus enhancing channel estimation performance through the reference signals. Further, in the case of using the second-eighth embodiment of the present disclosure, since the number of configurations that may be made maximally in one PRB is 2, more multiplexing may be achieved while avoiding mutual CSI-RS positions and thus mutual interference in the time and frequency dimensions as compared with the case multiplexing is impossible in one PRB using the existing CSI-RS REs. However, it is required to puncture the PDSCHs of the corresponding REs for the legacy UEs as described above. Further, the legacy UEs do not have any means to receive the information on such puncturing and thus perform decoding by deeming the corresponding CSI-RS as PDSCH, and thus, the CSI-RS of the corresponding RE plays a role as interference with the legacy UEs.

As set forth above in connection with the embodiments, the CSI-RS pattern shown in FIG. 38 as per the second-eighth embodiment of the present disclosure also uses OFDM symbol 2 available as a PDCCH symbol. The PDCCH contains control-related information very critical for the UE, and it is impossible to address by simply puncturing this information. Accordingly, in the corresponding case, the total number of PDCCH symbols for the existing and new UEs should be limited to 2, and it should be known through the PCFICH that the number of PDCCH symbols is two. However, in case the CSI-RS has been set in the corresponding subframe although the number of PCFICH symbols is three, it may be address through the following methods.

First method: disregarding the corresponding CSI-RS configuration and following the PCFICH Second method: determining that the corresponding PCFICH is set wrong and measuring the channel through the CSI-RS.

The first method is a method that disregards all the CSI-RSs configured in the corresponding subframe in case the number of PDCCH OFDM symbols indicated by the PCFICH is 3. In this case, if the CSI-RS pattern of FIG. 38 is used, there exist overlaps with the PDCCH symbols in all the CSI-RS configurations, resulting in the 32 port CSI-RS being not able to be used in the corresponding subframe. Thus, the pattern as shown in FIG. 39 may be used to consider the CSI-RS pattern based on the first method in the second-eighth embodiment of the present disclosure.

Figure 39:
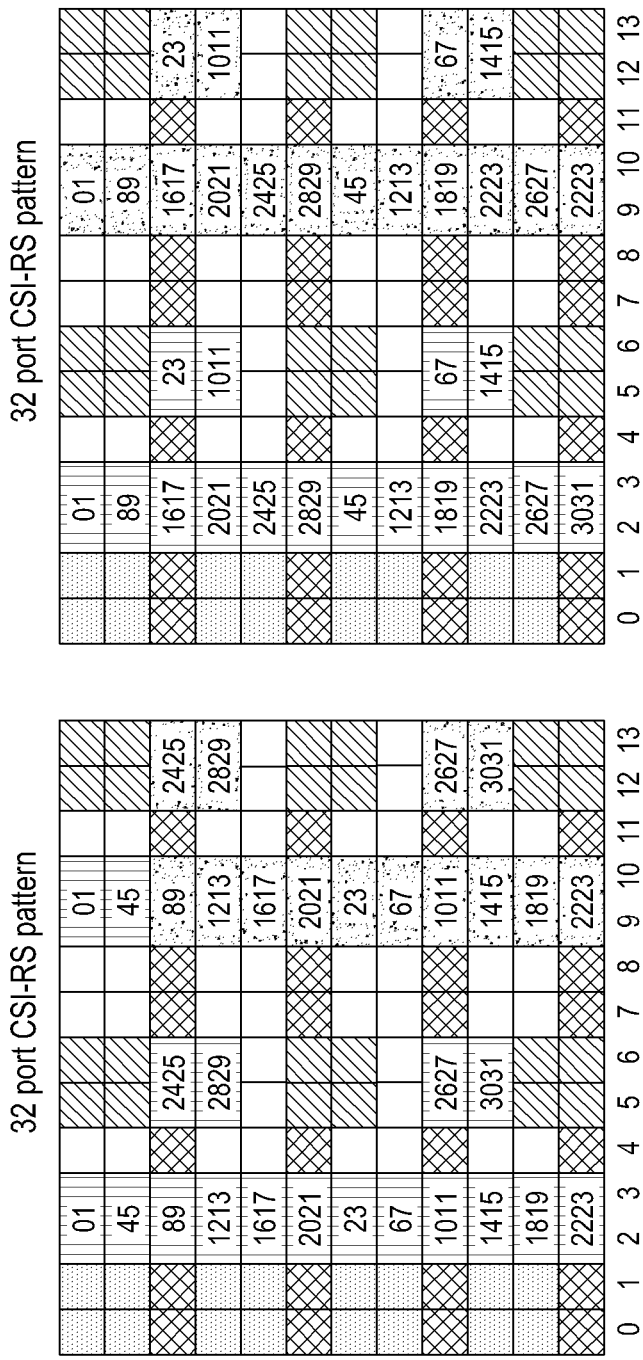
FIG. 39 is a view illustrating a CSI-RS pattern designed based on the first method according to the second-eighth embodiment of the present disclosure.

FIG. 39 illustrates a CSI-RS pattern designed based on the first method according to a second-eighth embodiment of the present disclosure.

In the pattern shown in FIG. 39, there is one configuration positioned in symbol 2 that may be used as PDCCHs, and the other remaining configurations may be available as CSI-RSs. Further, in the case of the pattern shown in FIG. 39, since more CSI-RS ports are transmitted in OFDM symbols 2, 3, 9, and 10, the CSI-RS ports positioned in the corresponding symbols may lead to more power boosting. However, the ports of symbols 5, 6, 12, and 13 are limited to, up to, 6 dB.

The second method is a method in which in case the 32 port CSI-RS configured in the corresponding subframe is present in the PDCCH OFDM symbol region, the PCFICH is determined to have been transmitted wrong and the PCFICH is assumed to be 2. There is no such case where the channel is not measured in the CSI-RS port configured in the second method, but the actual PDCCH uses three OFDM symbols, and unless the CSI-RS port is transmitted, the operation might not be properly performed.

The resource configurations for 32 port CSI-RSs based on the pattern shown in FIG. 38 in the second-eighth embodiment of the present disclosure may be made as shown in Table 23. Table 23 below represents an example of the CSI-RS resource configuration method (normal CP) as per second-eighth embodiment of the present disclosure.

TABLE 23

| CSI reference signal configuration | # of CSI-RS signals configured 12 | |
|---|---|---|
| | (k', l') | $n_s$ mod 2 |
| Frame structure type 1 and 2    0 | (11, 2) | 0, 1 |
|                 1 | (9, 2) | 0, 1 |

Here, p is the port index, and the 0th antenna port is represented as 15. This means that as the antenna index increases, the port index also increases. In this case, for example, symbol a of the 12 port CSI-RSs transmitted through the lth time symbol and the kth frequency RE may be defined as shown in Equation 13 below.

[Equation 13]

$$a_{k,l}^{(p)} = w_{l''} \cdot r_{l,n_s}(m')$$

Here, $$k = k' + 12m +$$

$$l = l' + \begin{cases} \vdots \\ -0 & \text{for } p \in \{15, 16, 31, 32\}, \text{CSI reference signal configuration 0, normal cyclic prefix} \\ -6 & \text{for } p \in \{17, 18, 33, 34\}, \text{CSI reference signal configuration 0, normal cyclic prefix} \\ -1 & \text{for } p \in \{19, 20, 35, 36\}, \text{CSI reference signal configuration 0, normal cyclic prefix} \\ -7 & \text{for } p \in \{21, 22, 37, 38\}, \text{CSI reference signal configuration 0, normal cyclic prefix} \\ -4 & \text{for } p \in \{23, 24, 39, 40\}, \text{CSI reference signal configuration 0, normal cyclic prefix} \\ -11 & \text{for } p \in \{25, 26, 41, 42\}, \text{CSI reference signal configuration 0, normal cyclic prefix} \\ -5 & \text{for } p \in \{27, 28, 43, 44\}, \text{CSI reference signal configuration 0, normal cyclic prefix} \\ -12 & \text{for } p \in \{29, 30, 45, 46\}, \text{CSI reference signal configuration 0, normal cyclic prefix} \\ 0 & \text{for } p \in \{15, 16, 23, 24, 31, 32, 39, 40\}, \text{CSI reference signal configuration 1, normal cyclic prefix} \\ -6 & \text{for } p \in \{17, 18, 25, 26, 33, 34, 41, 42\}, \text{CSI reference signal configuration 1, normal cyclic prefix} \\ -1 & \text{for } p \in \{19, 20, 27, 28, 35, 36, 43, 44\}, \text{CSI reference signal configuration 1, normal cyclic prefix} \\ -7 & \text{for } p \in \{21, 22, 29, 30, 37, 38, 45, 46\}, \text{CSI reference signal configuration 1, normal cyclic prefix} \end{cases}$$

$$l = l' + \begin{cases} \vdots \\ l'', n_s \bmod 2 = 0 & \text{for } p \in \{15, 16, 17, 18, 19, 20, 21, 22, 23, 24, 25, 26, 27, 28, 29, 30\}, \text{CSI reference signal configuration 0, normal cyclic prefix} \\ l'', n_s \bmod 2 = 1 & \text{for } p \in \{31, 32, 33, 34, 35, 36, 37, 38, 39, 40, 41, 42, 43, 44, 45, 46\}, \text{CSI reference signal configuration 0, normal cyclic prefix} \\ l'', n_s \bmod 2 = 0 & \text{for } p \in \{15, 16, 17, 18, 19, 20, 21, 22\}, \text{CSI reference signal configuration 1, normal cyclic prefix} \\ l'' + 3, n_s \bmod 2 = 0 & \text{for } p \in \{23, 24, 25, 26, 27, 28, 29, 30\}, \text{CSI reference signal configuration 1, normal cyclic prefix} \\ l'', n_s \bmod 2 = 1 & \text{for } p \in \{31, 32, 33, 34, 35, 36, 37, 38\}, \text{CSI reference signal configuration 1, normal cyclic prefix} \\ l'' + 3, n_s \bmod 2 = 1 & \text{for } p \in \{39, 40, 41, 42, 43, 44, 45, 46\}, \text{CSI reference signal configuration 1, normal cyclic prefix} \end{cases}$$

$$w_{l''} = \begin{cases} 1 & p \in \{15, 17, 19, 21, 23, 25, 27, 29, 31, 33, 35, 37, 39, 41, 43, 45\} \\ (-1)^{l''} & p \in \{16, 18, 20, 22, 24, 26, 28, 30, 32, 34, 36, 38, 40, 42, 44, 46\} \end{cases}$$

-continued $l'' = 0, 1$ $m = 0, 1, \ldots, N_{RB}^{DL} - 1$ $m' = m + \left\lfloor \dfrac{N_{RB}^{max,DL} - N_{RB}^{DL}}{2} \right\rfloor$ FIG. 40 illustrates CSI-RS patterns for 32 ports configured based on the second-eighth embodiment of the present disclosure, and it may be used through similar definitions to the 32 port CSI-RS symbols and the resource configurations exemplified above in the second-eighth embodiment of the present disclosure.

<Second-Ninth Embodiment>

The second-ninth embodiment of the present disclosure is a method for supporting 16 CSI-RS ports.

Figure 41:
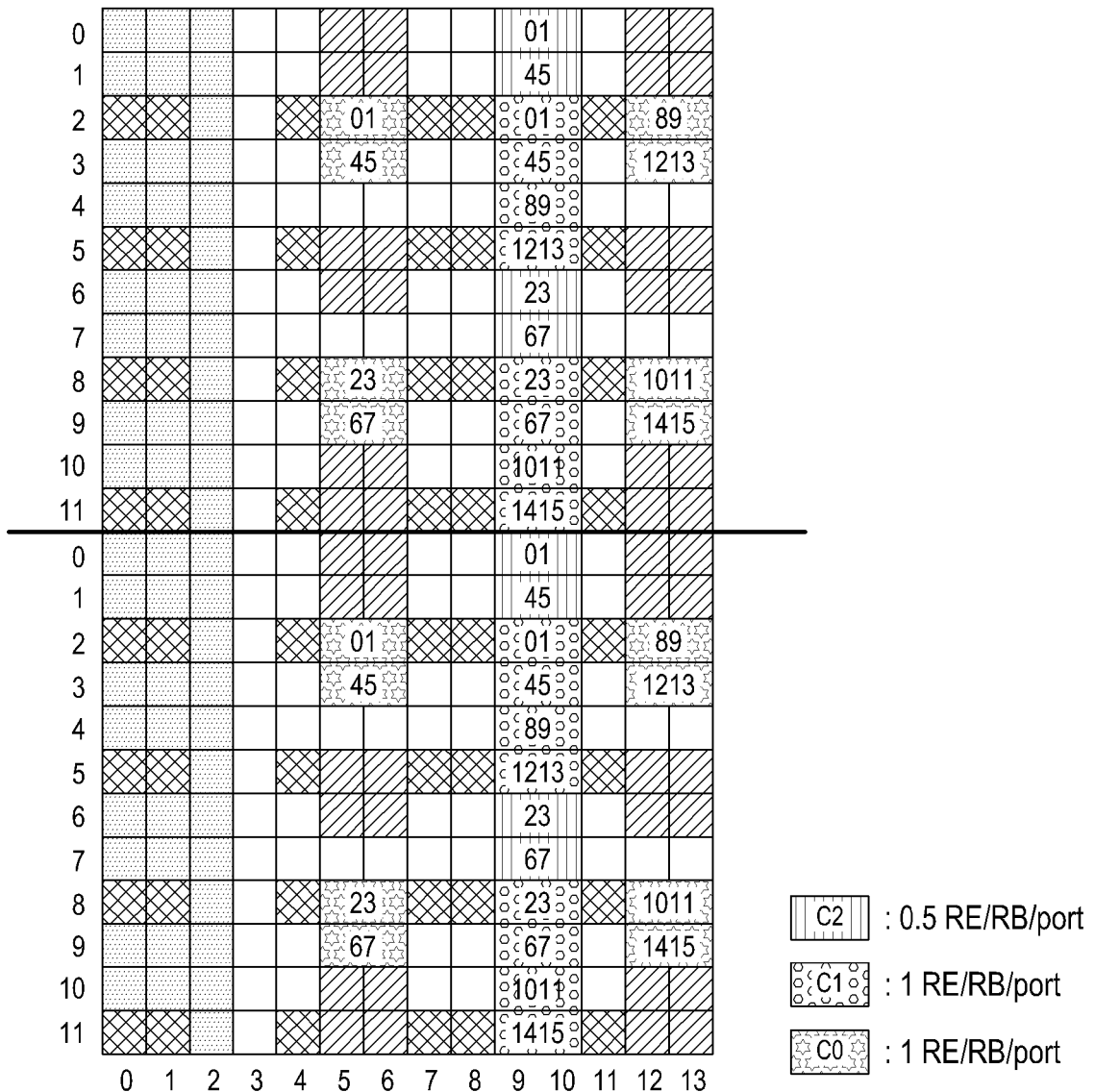
FIG. 41 is a view illustrating an example of simultaneously supporting all of a configuration supportive of 16 CSI-RS ports for RPBs and a configuration supportive of 16 CSI-RS ports obtained by adding two PRBs in a mobile communication system according to a second-ninth embodiment of the present disclosure.

FIG. 41 illustrates an example of simultaneously supporting the configuration of supporting 16 CSI-RS ports in the PRB and the configuration of supporting 16 CSI-RS ports to support 16 CSI-RS ports in a mobile communication system as per the second-ninth embodiment of the present disclosure.

As described above, one PRB consists of 40 CSI-RS REs in total. In the second-ninth embodiment of the present disclosure, in order to support 16 CSI-RS ports currently in 40 CSI-RS REs, 16 legacy CSI-RS ports are supported in one PRB for a particular configuration depending on the CSI-RS port configuration, and 16 CSI-RS ports may be measured through two PRBs in another particular configuration. In such case, one additional CSI-RS port configuration may be secured through two RBs in addition to securing two CSI-RS port configurations in one RB. Accordingly, rather than discarding the eight REs to support the 16 port CSI-RS, the number of cases of being able to perform multiplexing in the time and frequency configurations is increased. Further, although in the legacy CSI-RS, the reference signal density is always fixed to 1 RE/RB/port, it may use 0.5RE/RB/port via the CSI-RS port configuration. As such, if the reference signal density is reduced, the accuracy of channel estimation may be deteriorated, but the overhead due to the use of reference signal may be reduced.

In order to maximize the radio channel estimation performance through reference signals, the legacy 4, 8 port CSI-RSs have transmitted the CSI-RS ports using the same time resources under the same configurations. Accordingly, a power boosting effect, 3 dB for 4 port CSI-RS and 6 dB for 8 port CSI-RS, has been able to be achieved. However, the CSI-RS pattern of FIG. 35 may lead to 6 dB power boosting in configuration 0 and 9 dB power boosting in configurations 1 and 2. Accordingly, it has been designed so that configuration 1 achieves the maximum power boosting effect with all the RBs and configurations 1 and 2 share power boosting or losses in the number of ports per RB.

The resource configurations for 16 port CSI-RSs based on the pattern shown in FIG. 41 as per the second-ninth embodiment of the present disclosure may be made as shown in Table 24. Table 24 below represents an example of the CSI-RS resource configuration method (normal CP) as per second-ninth embodiment of the present disclosure.

TABLE 24

| CSI reference signal configuration | # of CSI-RS signals configured 16 | |
|---|---|---|
| | (k', l') | $n_s$ mod 2 |
| Frame 0 | (9, 5) | 0, 1 |
| structure 1 | (11, 2) | 1 |
| type 1 and 2  2 | (9, 2) | 1 |

Here, p is the port index, and the 0th antenna port is represented as 15. This means that as the antenna index increases, the port index also increases. In this case, for example, symbol a of the 16 port CSI-RSs transmitted through the lth time symbol and the kth frequency RE may be defined as shown in Equation 14 below.

[Equation 14]

$a_{k,l}^{(p)} = w_{l''} \cdot r_{l,n_s}(m')$

Figure 42:
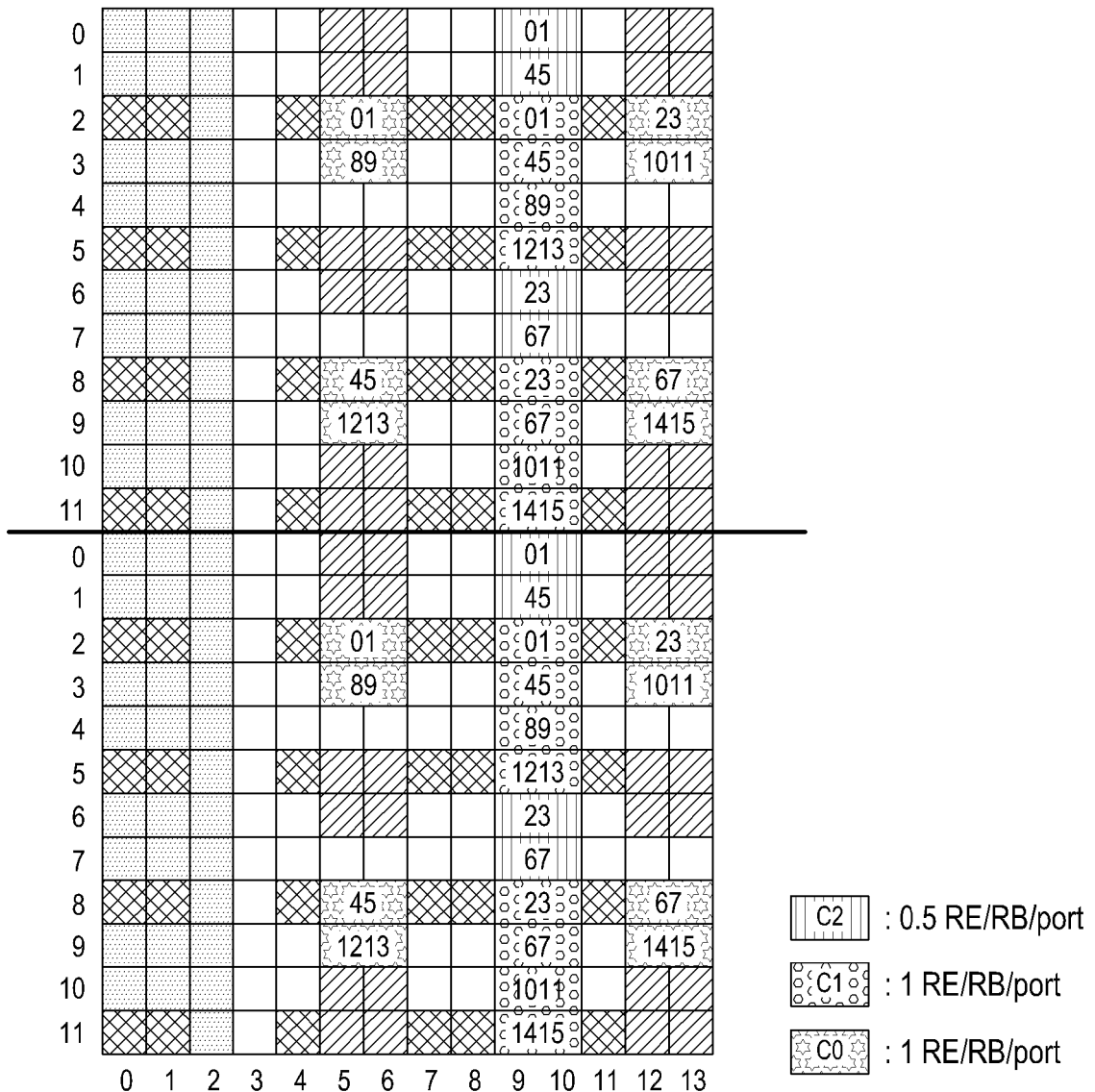
FIG. 42 is a view illustrating a CSI-RS pattern obtained by changing the position of the port of the CSI-RS pattern of FIG. 41.

Here, $k = k' + 12m + \begin{cases} -0 & \text{for } p \in \{15, 16, 17, 18\}, \text{ normal cyclic prefix} \\ -6 & \text{for } p \in \{19, 20, 21, 22\}, \text{ normal cyclic prefix} \\ -1 & \text{for } p \in \{23, 24, 25, 26\}, \text{ normal cyclic prefix} \\ -7 & \text{for } p \in \{27, 28, 29, 30\}, \text{ normal cyclic prefix} \\ \vdots & \end{cases}$ $l = l' +$ $\begin{cases} \vdots \\ l'', n_s \bmod 2 = 0 & \begin{array}{l}\text{for } p \in \{15, 16, 19, 20, 23, 24, 27, 28\}, \text{ CSI} \\ \text{reference signal configuration 0-2, normal cyclic} \\ \text{prefix} \end{array} \\ l'', n_s \bmod 2 = 1 & \begin{array}{l}\text{for } p \in \{17, 18, 21, 22, 25, 26, 29, 30\}, \text{ CSI} \\ \text{reference signal configuration 0-2, normal cyclic} \\ \text{prefix} \end{array} \\ \vdots \end{cases}$ $w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$ $l'' = 0, 1$ $m = 0, 1, \ldots, N_{RB}^{DL} - 1$ $m' = m + \left\lfloor \dfrac{N_{RB}^{max,DL} - N_{RB}^{DL}}{2} \right\rfloor$ In the case of configuration 0 in the pattern of FIG. 41 as per the second-ninth embodiment of the present disclosure, 0-7 ports and 8-15 ports are separately transmitted in the respective OFDM symbols. The current LTE Rel-10 8Tx codebook and Rel-12 4Tx codebook have been designed assuming that first four or two antennas are polarized at +45 degrees and subsequent four or two antennas are polarized at −45 degrees. If the codebooks to support the 16 CSI-RS ports are designed under the same principle, in case the 0-7 ports and 8-15 ports are transmitted through the same OFDM symbols, the beam selection experiences the same phase shift by the time difference and reflects only the phase shift difference by the frequency difference so that relatively smaller errors may be selected while the phase shift due to the time difference concentrates on the co-phrasing between antennas with different polarizations so that the errors for the corresponding portion may increase. Unlike this, in case transmission is performed through OFDM symbols on different times, phase shift occurs only in the OFDM symbols of some ports of the antennas having the same polarization, so that the same level of error may occur in the beam selection and co-phrasing determined by the UE. However, such pattern benefits reflecting on average the errors according to times to beam selection and co-phrasing within one PRB. The pattern of FIG. 42 is a variation in port position to the pattern of FIG. 41 to reflect such effect in the second-ninth embodiment of the present disclosure.

The CSI-RS pattern configuration for the CSI-RS pattern as per the second embodiment of the present disclosure has been described above based on FIGS. 20 to 42. Now described are a method and apparatus for measuring channel according to the second embodiment of the present disclosure based on FIGS. 43 to 46.

Figure 43:
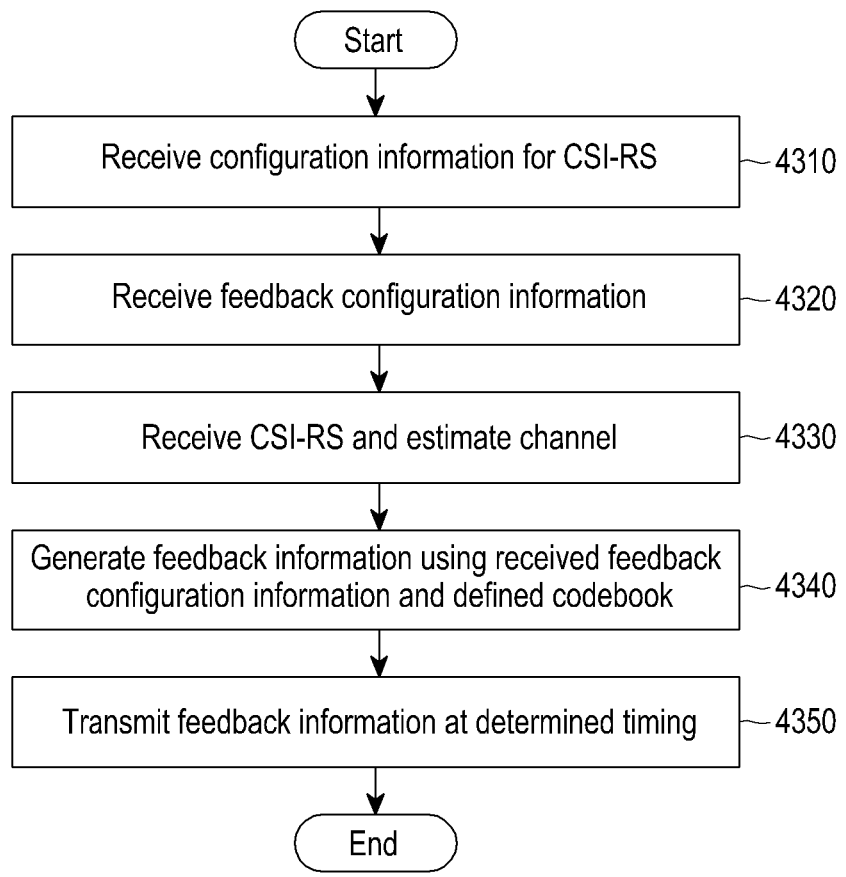
FIG. 43 is a view illustrating a method for estimating a channel by a UE according to a second embodiment of the present disclosure.

FIG. 43 illustrates a method for estimating a channel by a UE according to the second embodiment of the present disclosure.

Referring to FIG. 43, the UE receives configuration information for CSI-RS configuration as per the second embodiment of the present disclosure from the base station (4310). Here, the configuration information includes at least one of the number of ports of each CSI-RS, the timing and resource position where each CSI-RS is transmitted, and transmission power information based on the received configuration information.

The UE receives one feedback configuration information for at least one or more CSI-RSs generated based on the configuration information from the base station (4320).

Thereafter, the UE, upon receiving the CSI-RS configuration as per the second embodiment of the present disclosure from the base station, estimates the channel between the transmit antenna of the base station and the receive antenna of the UE based on the received feedback configuration information for the CSI-RS configuration (4330).

Figure 44:
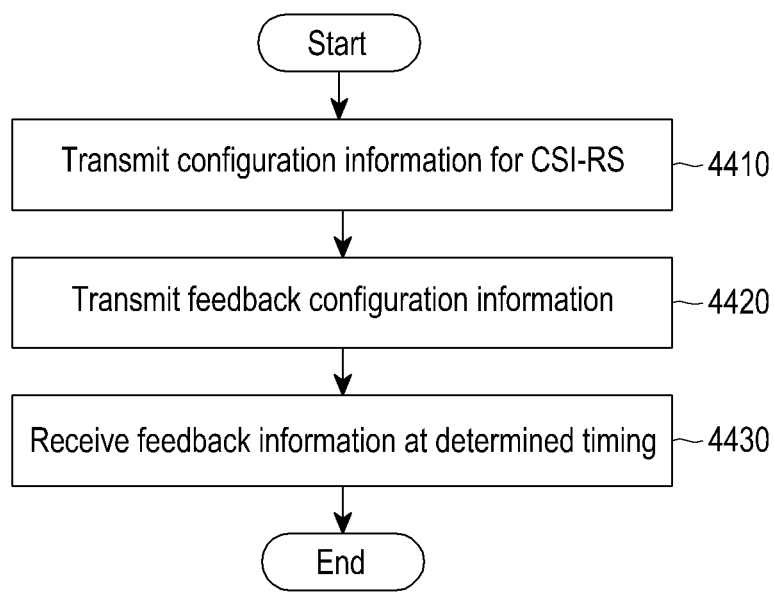
FIG. 44 is a view illustrating a method for estimating a channel by a base station according to the second embodiment of the present disclosure.

The UE generates feedback information rank, PMI, and CQI using a predefined codebook and the received feedback configuration information based on a virtual channel added between the CSI-RSs and the estimated channel (4340). Thereafter, the UE transmits the generated feedback information to the base station at the feedback timing included in the received feedback configuration information (2250), ending the process of generating and reporting channel feedback considering 2D array. FIG. 44 illustrates a method for estimating a channel by a base station according to a second embodiment of the present disclosure.

Referring to FIG. 44, the base station transmits configuration information for CSI-RS to measure channel as per the second embodiment of the present disclosure to the base station (4410). The configuration information includes at least one of the number of ports of each CSI-RS, the timing and resource position where each CSI-RS is transmitted, and transmission power information based on the received configuration information.

The base station transmits feedback configuration information for at least one or more CSI-RSs to the UE based on the configuration information (4420). Thereafter, the base station transmits a CSI-RS configuration as per the second embodiment of the present disclosure to the UE and receives feedback information from the UE at a predetermined timing (4430). At this time, the UE estimates the channel per antenna port and estimates an additional channel for a virtual resource based on the same. The UE generates feedback information based on a predefined codebook and the feedback configuration information received from the base station and transmits the feedback information to the base station. Accordingly, the base station receives the feedback information from the UE at a predetermined timing and uses the same to determine the channel status between the UE and the base station.

Figure 45:
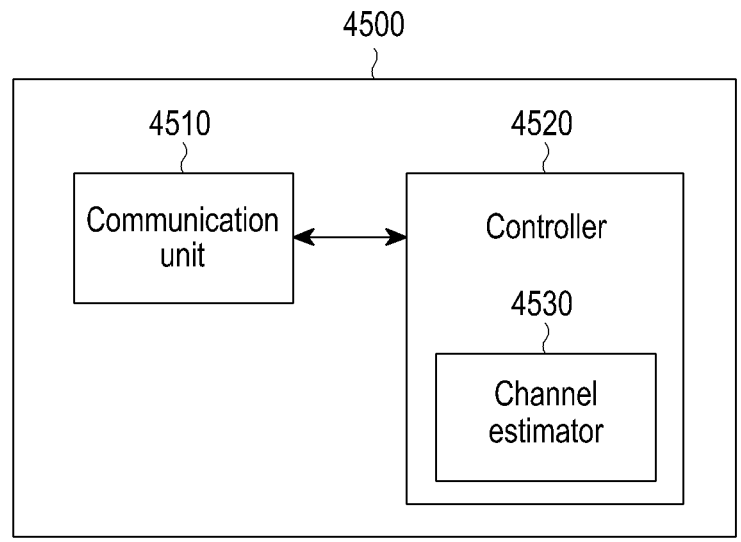
FIG. 45 is a view briefly illustrating an internal configuration of a UE for estimating a channel according to the second embodiment of the present disclosure.

FIG. 45 briefly illustrates an internal configuration of a UE for measuring channel as per the second embodiment of the present disclosure.

Referring to FIG. 45, the UE 4500 includes a communication unit 4510 and a controller 4520.

The communication unit 4510 performs the function of transmitting or receiving signals from the outside (e.g., a base station). Here, the communication unit 4510 may receive feedback configuration information from the base station and transmit feedback information to the base station under the control of the controller 4520.

The controller 4520 controls the state and operation of all the components of the UE 4500. Specifically, the controller 4520 generates feedback information based on the feedback configuration information received from the base station. Further, the controller 2420 controls the communication unit 4510 to feedback the generated feedback information to the base station according to the timing information contained in the feedback configuration information received from the base station. To that end, the controller 4520 may include a channel estimator 4530.

The channel estimator 4530 determines necessary feedback information through the feedback configuration information and the CSI-RS received from the base station and estimates the channel using the received CSI-RS based on the feedback information.

Although such an example is described in FIG. 45 that the UE 4500 includes the communication unit 4510 and the controller 4520, the UE 4500 may further include various components depending on functions performed thereon without limited thereto. For example, the UE 4500 may further include a display unit displaying the current state of the UE 4500, an input unit receiving signals such as performing functions from the user, and a storage unit storing data generated in the UE 4500. Further, although the channel estimator 4530 is shown to be included in the controller 4520, it is not necessarily limited thereto. The controller 4520 may control the communication unit 4510 to receive configuration information for each of at least one or more reference signal resources from the base station. Further, the controller 4520 may control the communication unit 4510 to measure the at least one or more reference signals and receive from the base station feedback configuration information to generate feedback information as per the measurement result. Further, the controller 4520 may measure at least one or more reference signals received via the communication unit 4510 and generate feedback information according to the feedback configuration information. The controller 4520 may control the communication unit 4510 to transmit the generated feedback information to the base station at a feedback timing as per the feedback configuration information. Further, the controller 4520 may receive a CSI-RS from the base station, generate feedback information based on the received CSI-RS, and transmit the generated feedback information to the base station. In this case, the controller 4520 may select each precoding matrix per antenna port group of the base station and further select an additional precoding matrix based on the relationship between the antenna port groups of the base station.

Further, the controller 4520 may receive a CSI-RS from the base station, generate feedback information based on the received CSI-RS, and transmit the generated feedback information to the base station. In this case, the controller 4520 may select one precoding matrix for all the antenna port groups of the base station. Further, the controller 4520 may receive feedback configuration information from the base station, receive a CSI-RS from the base station, generate feedback information based on the received feedback configuration information and CSI-RS, and transmit the generated feedback information to the base station. In this case, the controller 4520 may receive additional feedback configuration information based on the relationship between the antenna port groups and the feedback configuration information corresponding to each antenna port group of the base station.

Figure 46:
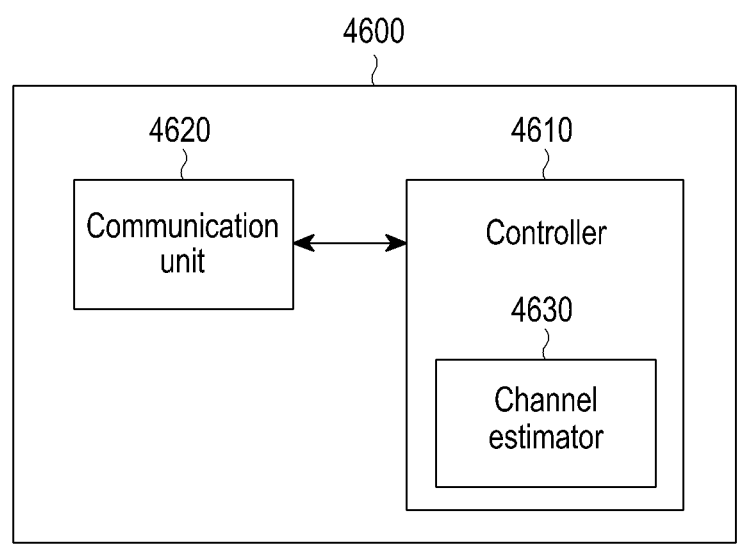
FIG. 46 is a view briefly illustrating an internal configuration of a base station for estimating a channel according to the second embodiment of the present disclosure.

FIG. 46 briefly illustrates an internal configuration of a base station for measuring channel according to the second embodiment of the present disclosure.

Referring to FIG. 46, the base station 4600 includes a controller 4610 and a communication unit 4620. The controller 4610 controls the state and operation of all the components of the base station 4600. Specifically, the controller 4610 allocates CSI-RS resources to the UE 4500 for the channel estimation of the UE 4500 and allocates feedback resources and feedback timing to the UE 4500. For this, the controller 4610 may further include a resource allocator 2630. Further, in order to prevent collision between feedbacks from several UEs, the base station 4600 transmits feedback configuration information containing a feedback timing to the UE 4500, receives configured feedback information at the feedback timing, and interprets the feedback information. The communication unit 4620 performs the function of communication data, reference signals, and feedback information with the UE 4500. Here, the communication unit 4620 transmits CSI-RSs to the UE 4500 through the allocated resources and receives feedback information for the channel information from the UE 4500 under the control of the controller 4610.

Further, although the resource allocator 4630 is shown to be included in the controller 4610, it is not necessarily limited thereto. The controller 4610 may control the communication unit 4620 to transmit the configuration information for each of at least one or more reference signals to the UE 4500 or generate at least one or more reference signals. Further, the controller 4610 may control the communication unit 4620 to transmit to the UE 4500 feedback configuration information to generate feedback information as per the measurement result. Further, the controller 4610 may control the communication unit 4620 to transmit the at least one or more reference signals to the UE 4500 and receive the feedback information transmitted from the UE 4500 at a feedback timing according to the feedback configuration information. Further, the controller 4610 may transmit the feedback configuration information to the UE 4500, transmit the CSI-RS to the UE 4500, and receive from the UE 4500 feedback information generated based on the feedback configuration information and the CSI-RS. In this case, the controller 4610 may transmit additional feedback configuration information based on the relationship between the antenna port groups and the feedback configuration information corresponding to each antenna port group of the base station 4600. Further, the controller 4610 may transmit to the UE 4500 the beamformed CSI-RS based on the feedback information and receive from the UE 4500 the feedback information generated based on the CSI-RS. According to the second embodiment of the present disclosure, it may be possible to prevent allocation of excessive feedback resources in transmitting CSI-RSs from the base station having a number of two-dimensional antenna array structure transmit antennas and the increase in channel estimation complexity of the UE 4500. The UE 4500 may effectively measure the channel of all of the many transmit antennas, configure the same in feedback information, and notify the same to the base station 4600.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for measuring a channel by a user equipment (UE) in a communication system, the method comprising:
   receiving configuration information for channel measurement from a base station;
   receiving a beamformed reference signal from the base station;
   measuring the channel using the beamformed reference signal based on the configuration information; and
   transmitting information about the measured channel to the base station,
   wherein the configuration information includes first information indicating whether measurement reset is triggered and second information about a first time period during which the channel is measured by the beamformed reference signal,
   wherein a resultant value of the channel measurement is initialized when the first time period starts, if the first information indicates that the measurement reset is triggered, and
   wherein the information about the measured channel corresponds to the measurement during a second time period including a previous initialization time point, if the first information indicates that the measurement reset is not triggered.

2. The method of claim 1, wherein the configuration information further includes information about at least one of a time when the measurement for the channel is initialized, information about a time when information about the measured channel is transmitted to the base station, and information about at least one of a position of a resource where the beamformed reference signal is transmitted and transmit power.

3. The method of claim 1, wherein the configuration information is periodically or aperiodically triggered for the UE.

4. The method of claim 3, wherein the configuration information is received through higher-layer signaling, downlink control information (DCI) for uplink data scheduling, and transmit power control (TPC) DCI.

5. The method of claim 3, wherein the configuration information is received through one of configuration information for the beamformed reference signal, a reference signal process, and a new transmission mode.

6. The method of claim 1, wherein the configuration information is information for supporting one reference signal port among 12, 16, and 32 reference signal ports.

7. A user equipment (UE) in a communication system, the UE comprising:
a transceiver transmitting and receiving data; and
a controller controlling the transceiver to:
receive configuration information for channel measurement from a base station,
receive a beamformed reference signal,
measure a channel using the beamformed reference signal based on the configuration information, and
transmit information about the measured channel to the base station,
wherein the configuration information includes first information indicating whether measurement reset is triggered and second information about a first time period during which the channel is measured by the beamformed reference signal and information about subframe offset indicating a number of subframes,
wherein a resultant value of the channel measurement is initialized when the first time period starts, if the first information indicates that the measurement reset is triggered, and
wherein the information about the measured channel corresponds to the measurement during a second time period including a previous initialization time point, if the first information indicates that the measurement reset is not triggered.

8. The UE of claim 7, wherein the configuration information further includes information about at least one of a time when the measurement for the channel is initialized, information about a time when information about the measured channel is transmitted to the base station, and information about at least one of a position of a resource where the beamformed reference signal is transmitted and transmit power.

9. A method for measuring a channel by a base station in a communication system, the method comprising:
transmitting configuration information for channel measurement to a user equipment (UE);
transmitting a beamformed reference signal to the UE; and
receiving information about a channel measured using the beamformed reference signal based on the configuration information from the UE,
wherein the configuration information includes first information indicating whether measurement reset is triggered and second information about a first time period during which the channel is measured by the beamformed reference signal,
wherein a resultant value of the channel measurement is initialized when the first time period starts, if the first information indicates that the measurement reset is triggered, and
wherein the information about the measured channel corresponds to the measurement during a second time period including a previous initialization time point, if the first information indicates that the measurement reset is not triggered.

10. The method of claim 9, wherein the configuration information further includes information about at least one of a time when the measurement for the channel is initialized, information about a time when information about the measured channel is transmitted to the base station, and information about at least one of a position of a resource where the beamformed reference signal is transmitted and transmit power.

11. The method of claim 9, wherein the configuration information is periodically or aperiodically triggered for the UE.

12. The method of claim 11, wherein the configuration information is received through higher-layer signaling, downlink control information (DCI) for uplink data scheduling, and transmit power control (TPC) DCI.

13. The method of claim 9, wherein the configuration information is information for supporting one reference signal port among 12, 16, and 32 reference signal ports.

14. A base station in a communication system, the base station comprising:
a transceiver transmitting and receiving data; and
a controller controlling the transceiver to transmit configuration information for channel measurement to a user equipment (UE) and transmit a beamformed reference signal to the UE, and controlling the transceiver to receive information about a channel measured using the beamformed reference signal based on the configuration information from the UE,
wherein the configuration information includes first information indicating whether measurement reset is triggered and second information about a first time period during which the channel is measured by the beamformed reference signal,
wherein a resultant value of the channel measurement is initialized when the first time period starts, if the first information indicates that the measurement reset is triggered, and
wherein the information about the measured channel corresponds to the measurement during a second time period including a previous initialization time point, if the first information indicates that the measurement reset is not triggered.

15. The base station of claim 14, wherein the configuration information further includes information about at least one of a time when the measurement for the channel is initialized, information about a time when information about the measured channel is transmitted to the base station, and information further includes information about at least one of a position of a resource where the beamformed reference signal is transmitted and transmit power.

16. The base station of claim 14, wherein the configuration information is periodically or aperiodically triggered for the UE.

17. The base station of claim 16, wherein the configuration information is received through higher-layer signaling, downlink control information (DCI) for uplink data scheduling, and transmit power control (TPC) DCI.

18. The method of claim 11, wherein the configuration information is received through one of configuration information about the beamformed reference signal, a reference signal process, and a new transmission mode.

19. The UE of claim 7, wherein the configuration information is periodically or aperiodically triggered for the UE.

20. The UE of claim 19, wherein the configuration information is received through higher-layer signaling, downlink control information (DCI) for uplink data scheduling, and transmit power control (TPC) DCI.

* * * * *